United States Patent
Gao et al.

(10) Patent No.: US 10,208,145 B2
(45) Date of Patent: Feb. 19, 2019

(54) CATALYST COMPONENT FOR OLEFIN POLYMERIZATION, AND CATALYST CONTAINING THE SAME

(71) Applicants: China Petroleum & Chemical Corporation, Beijing (CN); Beijing Research Institute of Chemical Industry, China Petroleum & Chemical Corporation, Beijing (CN)

(72) Inventors: Mingzhi Gao, Beijing (CN); Jun Wang, Beijing (CN); Haitao Liu, Beijing (CN); Jing Ma, Beijing (CN); Jianhua Chen, Beijing (CN); Jixing Ma, Beijing (CN); Xiaoxia Cai, Beijing (CN); Changxiu Li, Beijing (CN); Jianjun Hu, Beijing (CN); Xiaofan Zhang, Beijing (CN); Xianzhong Li, Beijing (CN); Zhihui Zhang, Beijing (CN); Ruilin Duan, Beijing (CN); Linna Yang, Beijing (CN); Changyou Ma, Beijing (CN)

(73) Assignees: China Petroleum & Chemical Corporation, Beijing (CN); Beijing Research Institute of Chemical Industry, China Petroteum & Chemical Corporation, Beijing (CN)

( * ) Notice: Subject to any disclaimer, the term of this patent is extended or adjusted under 35 U.S.C. 154(b) by 14 days.

(21) Appl. No.: 15/306,255

(22) PCT Filed: Apr. 24, 2015

(86) PCT No.: PCT/CN2015/077381
§ 371 (c)(1),
(2) Date: Oct. 24, 2016

(87) PCT Pub. No.: WO2015/161827
PCT Pub. Date: Oct. 29, 2015

(65) Prior Publication Data
US 2017/0073441 A1   Mar. 16, 2017

(30) Foreign Application Priority Data

Apr. 24, 2014 (CN) .......... 2014 1 0168507
Apr. 24, 2014 (CN) .......... 2014 1 0168586
Apr. 24, 2014 (CN) .......... 2014 1 0168633
Apr. 24, 2014 (CN) .......... 2014 1 0169052
Apr. 24, 2014 (CN) .......... 2014 1 0169176
Apr. 24, 2014 (CN) .......... 2014 1 0169910

(51) Int. Cl.
*C08F 4/64* (2006.01)
*C08F 110/06* (2006.01)

(52) U.S. Cl.
CPC .................. *C08F 110/06* (2013.01)

(58) Field of Classification Search
CPC .......... C08F 4/022; C08F 4/44; C08F 4/60013
See application file for complete search history.

(56) References Cited

U.S. PATENT DOCUMENTS

| 6,114,276 A | 9/2000 | Kong et al. | |
|---|---|---|---|
| 6,436,864 B1 * | 8/2002 | Tagge .................... | C08F 10/00 502/121 |
| 8,642,494 B2 * | 2/2014 | Haubruge ................ | D01F 6/06 502/123 |
| 2011/0034649 A1 * | 2/2011 | Standaert ............... | C08F 10/06 526/124.3 |
| 2017/0044280 A1 * | 2/2017 | Wang ..................... | C08F 4/649 |

FOREIGN PATENT DOCUMENTS

| CN | 1405192 A | 3/2003 | |
|---|---|---|---|
| CN | 1884311 A | 12/2006 | |
| CN | 101280031 A | 10/2008 | |
| CN | 101555317 A | 10/2009 | |
| CN | 101896509 A | 11/2010 | |
| CN | 102718897 A | 10/2012 | |
| JP | 3-43405 A * | 2/1991 | ............. C08F 4/658 |
| KR | 2003-0012095 | 2/2003 | |

OTHER PUBLICATIONS

International Search Report from the State Intellectual Property Office of the P.R. China for International Application No. PCT/CN2015/077381 dated Jul. 22, 2015.

* cited by examiner

*Primary Examiner* — Rip A Lee
(74) *Attorney, Agent, or Firm* — Finnegan, Henderson, Farabow, Garrett & Dunner, LLP

(57) ABSTRACT

The present invention provides a catalyst component for olefin polymerization, obtained by a reaction of magnesium, titanium, halogen and an internal electron donor, the internal electron donor comprising an imine compound as shown in Formula Z. The present invention also provides a preparation method of the catalyst component, and a catalyst for olefin polymerization containing the same. When the catalyst of the present invention is used for olefin polymerization reaction, the catalyst has a high activity, and a slow rate of activity decay, and the obtained polymer has a high isotacticity index, and a wide molecular weight distribution.

Formula Z

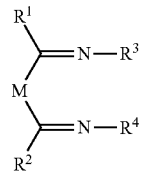

68 Claims, No Drawings

CATALYST COMPONENT FOR OLEFIN POLYMERIZATION, AND CATALYST CONTAINING THE SAME

CROSS-REFERENCE TO RELATED APPLICATIONS

The present application claims the priority of the following Chinese patent applications filed on Apr. 24, 2014, the entirety of which is incorporated herein by reference.

1. Chinese patent application CN 201410169176.X entitled "Method for preparing catalyst component for olefin polymerization, and catalyst containing the catalyst component";
2. Chinese patent application CN 201410168633.3 entitled "Catalyst component for olefin polymerization, and catalyst containing the same";
3. Chinese patent application CN 201410168507.8 entitled "Catalyst component for propene polymerization, and catalyst containing the same";
4. Chinese patent application CN 201410169910.2 entitled "Method for preparing catalyst component for olefin polymerization, and catalyst containing the catalyst component";
5. Chinese patent application CN 201410169052.1 entitled "Catalyst component for propene polymerization, and catalyst containing the same"; and
6. Chinese patent application CN 201410168586.2 entitled "Catalyst component for propene polymerization, and catalyst containing the same".

TECHNICAL FIELD

The present invention relates to a catalyst component for olefin polymerization and a catalyst containing the catalyst component, belonging to the technical field of petrochemical engineering.

TECHNICAL BACKGROUND

Generally, catalysts used for olefin polymerization can be classified into three categories: traditional Ziegler-Natta catalysts, metallocene catalysts, and non-metallocene catalysts. For traditional propene polymerization Ziegler-Natta catalysts, with the development of electron donor compounds in catalysts, olefin polymerization catalysts are also constantly undated. The development of catalysts has experienced the $1^{st}$ generation of $TiCl_3AlCl_3/AlEt_2Cl$ system, the $2^{nd}$ generation of $TiCl_3/AlEt_2Cl$ system, the $3^{rd}$ generation of $TiCl_4.ED.MgCl_2/AR_3.ED$ system using magnesium chloride as carriers, monoester or aromatic diester as internal electron donor, and silane as external electron donor, and the newly developed catalyst system using diether compounds and diester compounds as internal electron donors. The activity of catalysts for catalytic polymerization reaction and the isotacticity of the obtained polymers have been greatly improved. In existing technologies, titanium catalysts used for propene polymerization mainly use magnesium, titanium, halogen, and electron donor as basic components, wherein electron donor compounds are indispensable elements of catalyst components. Till now, many internal electron donor components have been disclosed, these components including, for example, monocarboxylic esters or polycarboxylic esters, acid anhydrides, ketones, monoethers or multiple ethers, alcohols, amines, and derivatives thereof, and so on, wherein commonly used ones are aromatic dicarboxylic esters such as di-n-butyl phthalate (DNBP) or diisobutyl phthalate (DIBP), and so on. Reference can be made to U.S. Pat. No. 4,784,983, U.S. Pat. No. 4,971,937 and European patent EP0728769 disclose components of catalysts used for olefin polymerization, wherein 1,3-diether compounds having two ether groups are used as electron donors, such compounds including, for example, 2-isopropyl-2-isopentyl-1,3-dimethoxy propane, 2,2-diisobutyl-1,3-dimethoxy propane, and 9,9-di(methoxymethyl) fluorene, etc. Later, aliphatic dicarboxylic ester compounds, such as succinate, malonic ester, glutarate, and so on, are disclosed (see WO98/56830, WO98/56834, WO01/57099, WO01/63231, and WO00/55215). The use of such electron donar compounds can not only improve the catalyst activity of a catalyst, but also enable an obtained polymer to have a wider molecular weight distribution.

However, it is still desired in the art to make further improvements on Ziegler-Natta catalysts and components thereof, so that the Ziegler-Natta catalysts can have a higher activity and better orientation ability, and the obtained polymers can have a wider molecular weight distribution.

SUMMARY OF THE INVENTION

The objective of the present invention is to provide a catalyst for olefin polymerization and a catalyst containing the same. The catalyst component uses an imine compound as the internal electron donor, preferably uses an imine compound with an additional compound as a composite internal electron donor. When the catalyst is used in olefin polymerization reaction, the catalyst has a high activity and orientation ability, and the obtained polymer has a wide molecular weight distribution.

To achieve the above objective, the present invention provides a catalyst component for olefin polymerization. The catalyst component comprises magnesium, titanium, halogen and an internal electron donor, said internal electron donor comprising an imine compound as shown in Formula Z,

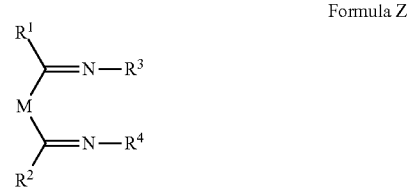

Formula Z wherein, $R^1$ and $R^2$ may be identical to or different from each other, and are independently selected from hydrogen, halogen atoms, hydroxyl, alkoxy, halogen atom substituted or unsubstituted $C_1$-$C_{20}$ alkyl, $C_3$-$C_{20}$ cycloalkyl, $C_2$-$C_{20}$ alkenyl, $C_2$-$C_{20}$ ester group, $C_6$-$C_{20}$ aryl, or $C_{10}$-$C_{20}$ fused aryl;

$R^3$ and $R^4$ may be identical to or different from each other, each independently selected from hydroxyl, $C_1$-$C_{20}$ alkyl, $C_2$-$C_{20}$ alkenyl, or $C_6$-$C_{20}$ aryl with or without a heteroatom, and each of the $C_1$-$C_{20}$ alkyl, the $C_2$-$C_{20}$ alkenyl and the $C_6$-$C_{20}$ aryl contains or does not contain a substituent group;

M is selected from one or more substituted or unsubstituted alkylene or aryl, fused aryl, heteroaryl, alkaryl, or arylalkyl. Preferably, M is selected from one or more substituted or unsubstituted alkylene or $C_6$-$C_{20}$ aryl, $C_{10}$-$C_{20}$ fused aryl, $C_5$-$C_{20}$ heteroaryl, $C_7$-$C_{20}$ alkaryl, or $C_7$-$C_{20}$ arylalkyl. When M is one or more substituted alkylene, the substituted atom is oxygen, sulfur, nitrogen, boron, silicon, phosphorus, or halogen atom. When M is $C_5$-$C_{20}$ heteroaryl, the heteroatom is oxygen, sulfur, nitrogen, boron, silicon, phosphorus, or halogen atom.

In one embodiment of the present invention, the catalyst component for olefin polymerization comprises magnesium, titanium, halogen, and an internal electron donor, the internal electron donor comprising an imine compound as shown in Formula I. In other words, the compound as shown in Formula Z can be represented by the compound as shown in Formula I, and M is selected from one or more substituted or unsubstituted alkylene.

According to the present invention, the structure of the imine compound as shown in Formula I is as follows:

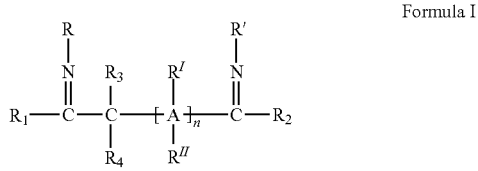

Formula I wherein, n is an integer ranging from 1 to 10.

A is carbon or a heteroatom selected from the group consisting of oxygen, sulfur, nitrogen, boron, and silicon. Preferably, A is carbon.

R and R' may be identical to or different from each other, each independently selected from hydroxyl, halogen atom substituted or unsubstituted $C_1$-$C_{20}$ alkyl, $C_2$-$C_{20}$ alkenyl, $C_6$-$C_{20}$ alkaryl, or $C_{10}$-$C_{20}$ fused aryl, preferably from halogen atom substituted or unsubstituted $C_1$-$C_8$ alkyl, $C_6$-$C_{20}$ alkaryl, or $C_{10}$-$C_{20}$ fused aryl, more preferably from methyl, ethyl, n-propyl, isopropyl, n-butyl, isobutyl, sec-butyl, tert-butyl, pentyl, hexyl, phenyl, halogenated phenyl, alkyl phenyl, naphthyl, or terphenyl.

$R_1$ and $R_2$ may be identical to or different from each other, each independently selected from halogen atom substituted or unsubstituted $C_1$-$C_{20}$ alkyl, $C_3$-$C_{20}$ cycloalkyl, $C_2$-$C_{20}$ alkenyl, $C_2$-$C_{20}$ ester group, $C_6$-$C_{20}$ aryl, or $C_{10}$-$C_{20}$ fused aryl, preferably from halogen atom substituted or unsubstituted $C_1$-$C_8$ alkyl, $C_6$-$C_{20}$ aryl, or $C_{10}$-$C_{20}$ fused aryl; each of $R^I$, $R^{II}$, $R_3$ and $R_4$ is independently selected from hydrogen, halogen atom substituted or unsubstituted $C_1$-$C_{20}$ alkyl, $C_3$-$C_{20}$ cycloalkyl, $C_2$-$C_{20}$ alkenyl, $C_2$-$C_{20}$ ester group, $C_6$-$C_{20}$ aryl, or $C_{10}$-$C_{20}$ fused aryl, preferably from hydrogen, halogen atom substituted or unsubstituted $C_1$-$C_8$ alkyl, $C_6$-$C_{20}$ aryl, or $C_{10}$-$C_{20}$ fused aryl; and one or more of $R_1$-$R_4$, and $R^I$ and $R^{II}$ can be bonded together to form a ring; $R_3$-$R_4$, and $R^I$ and $R^{II}$ can optionally contains one or more heteroatoms as a substitute of a carbon or hydrogen atom or both, the heteroatom being oxygen, sulfur, nitrogen, boron, silicon, phosphorus, or halogen atom.

Specific examples of the imine compound are as follows: 2,4-diphenyliminopentane, 2,4-di(2,6-diisopropylphenylimino)pentane, 2,4-dinaphthyliminopentane, 2,4-di(2,6-dimethylphenylimino)pentane, 2,4-dibutyliminopentane, 2,4-di(4-chlorophenylimino)pentane, 2,4-di(2,4-dichlorophenylimino)pentane, 2,4-di(4-trifluoromethylphenylimino)pentane, 3,5-diphenyliminoheptane, 3,5-di(2,6-diisopropylphenylimino)heptane, 3,5-di(2,6-dimethylphenylimino)heptane, 3,5-dibutyliminoheptane, 2,4-di(8-quinolylimino)pentane, 2,4-di(4-quinolylimino)pentane, 2,4-di(3-quinolylimino)pentane, 2,4-di(2-chloro-6-hydroxylphenylimino)pentane, 2,4-di(2,4,6-trimethylphenylimino)pentane, 1,1,1-trifluoro-2,4-di(2,6-diisopropylphenylimino)pentane, 1,1,1-trifluoro-2,4-di(2,6-dimethylphenylimino)pentane, 1,3-diphenyl-1,3-di(2,6-diisopropylphenylimino)propane, 1,3-diphenyl-1,3-di(2,6-dimethylphenylimino)propane, 1-phenyl-1,3-di(2,6-diisopropylphenylimino)butane, 1-phenyl-1,3-di(2,6-dimethylphenylimino)butane, 3-methyl-2,4-di(2,6-dimethylphenylimino)pentane, 3-ethyl-2,4-di(2,6-dimethylphenylimino)pentane, 3,5-diphenylimino-4-ethylheptane, 3,5-di(2,6-diisopropylphenylimino)-4-methylheptane, 3-ethyl-3,5-di(2,6-diisopropylphenylimino)heptane, 3-methyl-3,5-di(2,6-dimethylphenylimino)heptane, 3-ethyl-3,5-di(2,6-dimethylphenylimino)heptane, 2,4-dip-chlorophenyliminopentane, 2-phenylimino-4-(2,6-diisopropylphenylimino)pentane, 1-(2-furyl)-1,3-di(2,6-diisopropylphenylimino)-4,4,4-trifluorobutane, 1-(2-furyl)-1,3-di(8-quinolylimino)-4,4,4-trifluorobutane, 1-(2-furyl)-1,3-di(3-quinolylimino)-4,4,4-trifluorobutane, 1-(2-furyl)-1,3-di(2,6-dimethylphenylimino)-4,4,4-trifluorobutane, 2-phenylimino-4-(2,6-dimethylphenylimino)pentane, 2-phenylimino-4-p-chlorophenyliminopentane, 2,2,4,4,6,6-hexamethyl-2,4-di(2,6-diisopropylphenylimino)pentane, 2-p-chlorophenylimino-4-(2,6-diisopropylphenylimino)pentane, 2,2,4,4,6,6-hexamethyl-2,4-di(2,6-dimethylphenylimino)pentane, 2,2,4,4,6,6-hexamethyl-2,4-diphenyliminopentane, 2,2,4,4,6,6-hexamethyl-2,4-di(p-chlorophenylimino)pentane, 2,2,4,4,6,6-hexamethyl-2,4-di(3-quinolylimino)pentane, 2,2,4,4,6,6-hexamethyl-2,4-di(8-quinolylimino)pentane, 2-p-chlorophenylimino-4-(2,6-dimethylphenylimino)pentane, 1,3-diphenyl-1-phenylimino-3-(2,6-dimethylphenylimino)propane, 1,3-diphenyl-1-phenylimino-3-(2,6-diisopropylphenylimino)propane, 2-[1-(2,6-diisopropylphenylimino)ethyl]-1-(2,6-diisopropylphenylimino)cyclohexane, 2-[1-(2,6-dimethylphenylimino)ethyl]-1-(2,6-dimethylphenylimino)cyclohexane, 2-[1-(2,6-dichlorophenylimino)ethyl]-1-(2,6-diisopropylphenylimino)cyclohexane, 2-[1-(2,6-dimethylphenylimino)ethyl]-1-(2,6-diisopropylphenylimino)cyclohexane, 2-[1-(phenylimino)ethyl]-1-(2,6-diisopropylphenylimino)cyclohexane, 2-[1-(phenylimino)ethyl]-1-(2,6-dimethylphenylimino)cyclohexane.

In one embodiment of the present invention, the catalyst component for olefin polymerization comprises magnesium, titanium, halogen, and an internal electron donor, the internal electron donor comprising an imine compound as shown in Formula II, which can be represented by the compound as shown in Formula Z in which M is heteroaryl, and can be represented by the the compound as shown in Formula I in which n is 2, and $R_3$ and $R^I$ are bonded together to form a ring or $R^{II}$ and $R_4$ are bonded together to form a ring. Further, the imine compound can be represented by the compound as shown in Formula II.

According to the present invention, the structure of the compound as show in Formula II is:

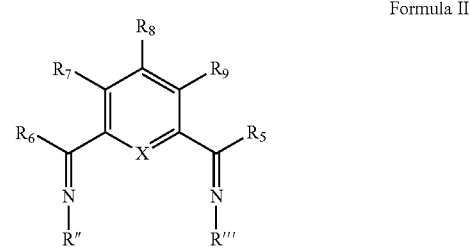

Formula II in Formula II, R" and R'" may be identical to or different from each other, and is selected from $C_1$-$C_{20}$ alkyl, $C_2$-$C_{20}$ alkenyl, or $C_6$-$C_{20}$ aryl with or without a heteroatom, each of which contains a substituent group or does not contain a substituent group which is selected from hydrocarbyl, hydroxyl, and halogen, the heteroatom being N; preferably in R" and R'", the $C_6$-$C_{20}$ aryl with a heteroatom is selected from pyridinyl, pyrrolyl, pyrimidyl, or quinolyl;

$R_5$-$R_9$ may be identical to or different from each other, and is selected from hydrogen, halogen atoms, hydroxyl, alkoxy, $C_1$-$C_{12}$ alkyl, $C_2$-$C_{12}$ alkenyl, or $C_6$-$C_{20}$ aryl, wherein each of the $C_1$-$C_{12}$ alkyl, the $C_2$-$C_{12}$ alkenyl, and the $C_6$-$C_{20}$ aryl contains or does not contain a substituent group;

X is carbon or nitrogen.

In one embodiment of the present invention, the compound as shown in Formula II is one or more selected from the group consisting of 2,6-di(2,6-dimethylphenylimino) ethylpyridine, 2,6-di(2,6-diisopropylphenylimino)ethylpyridine, 2,6-di(phenylimino)ethylpyridine, 2,6-di(2-naphthylimino)ethylpyridine, 2,6-di(1-naphthylimino) ethylpyridine, 2,6-di(butylimino)ethylpyridine, 2,6-di (hexylimino)ethylpyridine, 2,6-di(pentylimino) ethylpyridine, 2,6-di(octylimino)ethylpyridine, 2,6-di (benzylimino)ethylpyridine, 2,6-di(4-chlorophenylimino) ethylpyridine, 2,6-di(4-trifluoromethylphenylimino) ethylpyridine, 2,6-di(2-trifluoromethylphenylimino) ethylpyridine, 2,6-di(2-chloro-6-hydroxylphenylimino) ethylpyridine, 2,6-di(8-quinolylimino)ethylpyridine, 2,6-di (4-quinolylimino)ethylpyridine, 2,6-di(3-quinolylimino) ethylpyridine, 2,6-di(2,4,6-trimethylphenylimino) ethylpyridine, 2-(phenylimino)ethyl-6-(2,6-dimethylphenylimino)ethylpyridine, 2-(phenylimino)ethyl-6-(2,6-diisopropylphenylimino)ethylpyridine, 2-(phenylimino)ethyl-6-(p-chlorophenylimino)ethylpyridine, 2-(2,6-diisopropylphenylimino)ethyl-6-(2,6-dimethylphenylimino)ethylpyridine, 2-(p-chlorophenylimino)ethyl-6-(2,6-diisopropylphenylimino)ethylpyridine, 2-(2-hydroxyl-4-chlorophenylimino)ethyl-6-(p-chlorophenylimino)ethylpyridine, 2,6-di(2-hydroxylphenylimino)ethylpyridine, 2,6-di(2-ethylphenylimino)ethylpyridine, 2,6-di(4-ethylphenylimino)ethylpyridine, 2,6-di(2-propylphenylimino)ethylpyridine, 2,6-di(4-propylphenylimino)ethylpyridine, 2,6-di(2-butylphenylimino)ethylpyridine, 2,6-di(4-butylphenylimino)ethylpyridine, and 2,6-di(2,6-dimethylphenylimino)ethylbenzene, 2,6-di(2,6-diisopropylphenylimino)ethylbenzene.

According to the present invention, the internal electron donor further comprises an additional compound, which is one or more selected from the group consisting of monobasic or polybasic esters, anhydrides, ketones, monoethers or polyethers, alcohols, amines, and diol ester compounds.

In one embodiment of the present invention, the additional compound is a diether compound, preferably the diether compound being a compound as shown in Formula III,

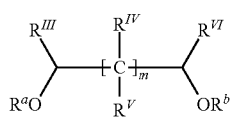

Formula III in Formula III, $R^{III}$-$R^{VI}$ may be identical to or different from each other, each of which is independently hydrogen, alkoxy, substituted amino, halogen atoms, $C_1$-$C_{20}$ hydrocarbyl, or $C_6$-$C_{20}$ aryl, and two or more of $R^{III}$-$R^{VI}$ can be bonded together to form a ring; $R^a$ and $R^b$ may be identical to or different from each other, and are $C_1$-$C_{20}$ hydrocarbyl; m is an integer ranging from 0 to 6. Preferably, $R^{IV}$ and $R^V$ are bonded together to form a ring, or $R^{III}$ and $R^{VI}$ are bonded together to form a ring.

In one embodiment, the diether compound is one or more selected from the group consisting of 2-isopropyl-1,3-dimethoxypropane, 2-butyl-1,3-dimethoxypropane, 2-cyclohexyl-1,3-dimethoxypropane, 2-benzyl-1,3-dimethoxypropane, 2-phenyl-1,3-dimethoxypropane, 2-(1-naphthyl)-1,3-dimethoxypropane, 2-isopropyl-2-isopentyl-1,3-dimethoxypropane, 2-isopropyl-2-isobutyl-1,3-dimethoxypropane, 2-isopropyl-2-butyl-1,3-dimethoxypropane, 2,2-dicyclopentyl-1,3-dibenzoyloxypropane, 2,2-dicyclohexyl-1,3-dimethoxypropane, 2,2-dibutyl-1,3-dimethoxypropane, 2,2-diisobutyl-1,3-dimethoxypropane, 2,2-diisopropyl-1,3-dimethoxypropane, 2,2-diethyl-1,3-dimethoxypropane, 2-ethyl-2-butyl-1,3-dimethoxypropane, 2,4-dimethoxypentane, 3-ethyl-2,4-dimethoxypentane, 3-methyl-2,4-dimethoxypentane, 3-propyl-2,4-dimethoxypentane, 3-isopropyl-2,4-dimethoxypentane, 3,5-dimethoxyheptane, 4-ethyl-3,5-dimethoxyheptane, 4-propyl-3,5-dimethoxyheptane, 4-isopropyl-3,5-dimethoxyheptane, 9,9-dimethoxymethylfluorene, 9,9-dimethoxymethyl-4-tert-butylfluorene, 9,9-dimethoxymethyl-4-propylfluorene, 9,9-dimethoxymethyl-1,2,3,4-tetrahydrofluorene, 9,9-dimethoxymethyl-1,2,3,4,5,6,7,8-octahydrofluorene, 9,9-dimethoxymethyl-2,3,6,7-diphenylpropylindene, 9,9-dimethoxymethyl-1,8-dichlorofluorene, 7,7-dimethoxymethyl-2,5-dinorbornadiene, 1,4-dimethoxybutane, 2,3-diisopropyl-1,4-dimethoxybutane, 2,3-dibutyl-1,4-dimethoxybutane, 1,2-dimethoxybenzene, 3-ethyl-1,2-dimethoxybenzene, 4-butyl-1,2-dimethoxybenzene, 1,8-dimethoxynaphthalene, 2-ethyl-1,8-dimethoxynaphthalene, 2-propyl-1,8-dimethoxynaphthalene, 2-butyl-1,8-dimethoxynaphthalene, 4-butyl-1,8-dimethoxynaphthalene, 4-isobutyl-1,8-dimethoxynaphthalene, 4-isopropyl-1,8-dimethoxynaphthalene, and 4-propyl-1,8-dimethoxynaphthalene.

In one embodiment of the present invention, the additional compound is a diol ester compound, and preferably the diol ester compound is selected from compounds as shown in Formula IV,

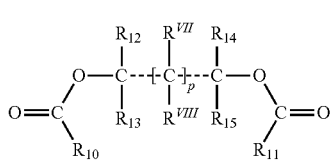

Formula IV in Formula IV, $R_{10}$ and $R_{11}$ may be identical to or different from each other, and are independently selected from halogen substituted or unsubstituted straight, branched, or cyclic $C_1$-$C_{20}$ hydrocarbyl; $R_{12}$-$R_{15}$ may be identical to or different from each other, and are independently selected from hydrogen, halogen atoms, hydroxyl, alkoxy, $C_1$-$C_{12}$ alkyl, $C_2$-$C_{12}$ alkenyl, or $C_6$-$C_{20}$ aryl, wherein each of the $C_1$-$C_{12}$ alkyl, the $C_2$-$C_{12}$ alkenyl, and the $C_6$-$C_{20}$ aryl contains or does not contain a substituent group, and two or more groups of $R_{12}$-$R_{15}$, $R^{VII}$ and $R^{VIII}$ can be bonded together to form an alicyclic ring or aromatic ring; $R^{VII}$ and $R^{VIII}$ may be identical to or different from each other, and are independently selected from hydrogen, or straight, branched or cyclic $C_1$-$C_{20}$ hydrocarbyl, and $R^{VII}$ and $R^{VIII}$ can be bonded together to form a ring; p is an integer ranging from 0 to 100.

In one embodiment, the diol ester compound is one or more selected from the group consisting of 2-isopropyl-1,3-dibenzoyloxypropane, 2-butyl-1,3-dibenzoyloxypropane, 2-cyclohexyl-1,3-dibenzoyloxypropane, 2-benzyl-1,3-dibenzoyloxypropane, 2-phenyl-1,3-dibenzoyloxypropane, 2-(1-naphthyl-1,3-dibenzoyloxypropane, 2-isopropyl-1,3-diacetoxylpropane, 2-isopropyl-2-isopentyl-1,3-dibenzoyloxypropane, 2-isopropyl-2-isobutyl-1,3-dibenzoyloxypropane, 2-isopropyl-2-isopentyl-1,3-dipropionyloxypropane, 2-isopropyl-2-butyl-1,3-dibenzoyloxypropane, 2-isopropyl-2-isopentyl-1-benzoyloxy-3-butyryloxypropane, 2-isopropyl-2-isopentyl-1-benzoyloxy-3-cinnamoyloxylpropane, 2-isopropyl-2-isopentyl-1-benzoyloxy-3-acetoxylpropane, 2,2-dicyclopentyl-1,3-dibenzoyloxypropane, 2,2-dicyclohexyl-1,3-dibenzoyloxypropane, 2,2-dibutyl-1,3-dibenzoyloxypropane, 2,2-diisobutyl-1,3-dibenzoyloxypropane, 2,2-diisopropyl-1,3-dibenzoyloxypropane, 2,2-diethyl-1,3-dibenzoyloxypropane, 2-ethyl-2-butyl-1,3-dibenzoyloxypropane, 2,4-dibenzoyloxypentane, 3-ethyl-2,4-dibenzoyloxypentane, 3-methyl-2,4-dibenzoyloxypentane, 3-propyl-2,4-dibenzoyloxypentane, 3-isopropyl-2,4-dibenzoyloxypentane, 2,4-di(2-propylbenzoyloxy)pentane, 2,4-di(4-propylbenzoyloxy)pentane, 2,4-di(2,4-dimethylbenzoyloxy)pentane, 2,4-di(2,4-dichlorobenzoyloxy)pentane, 2,4-di(4-chlorobenzoyloxy)pentane, 2,4-di(4-isopropylbenzoyloxy)pentane, 2,4-di(4-butylbenzoyloxy)pentane, 2,4-di(4-isobutylbenzoyloxy)pentane, 3,5-dibenzoyloxyheptane, 4-ethyl-3,5-dibenzoyloxyheptane, 4-propyl-3,5-dibenzoyloxyheptane, 4-isopropyl-3,5-dibenzoyloxyheptane, 3,5-di(4-propylbenzoyloxy)heptane, 3,5-di(4-isopropylbenzoyloxy)heptane, 3,5-di(4-isobutylbenzoyloxy)heptane, 3,5-di(4-butylbenzoyloxy)heptane, 2-benzoyloxy-4-(4-isobutylbenzoyloxy)pentane, 2-benzoyloxy-4-(4-butylbenzoyloxy)pentane, 2-benzoyloxy-4-(4-propylbenzoyloxy)pentane, 3-benzoyloxy-5-(4-isobutylbenzoyloxy)heptane, 3-benzoyloxy-5-(4-butylbenzoyloxy)heptane, 3-benzoyloxy-5-(4-propylbenzoyloxy)heptane, 9,9-dibenzoyloxymethylflouorene, 9,9-dipropionyloxymethylfluorene, 9,9-diisobutyryloxymethylfluorene, 9,9-dibutyryloxymethylfluorene, 9,9-dibenzoyloxymethyl-4-tert-butylfluorene, 9,9-dibenzoyloxymethyl-4-propylfluorene, 9,9-dibenzoyloxymethyl-1,2,3,4-tetrahydrofluorene, 9,9-dibenzoyloxymethyl-1,2,3,4,5,6,7,8-octahydrofluorene, 9,9-dibenzoyloxymethyl-2,3,6,7-diphenylpropylindene, 9,9-dibenzoyloxymethyl-1,8-dichlorofluorene, 7,7-dibenzoyloxymethyl-2,5-norbornadiene, 1,4-dibenzoyloxybutane, 2,3-diisopropyl-1,4-dibenzoyloxybutane, 2,3-dibutyl-1,4-dibenzoyloxybutane, 1,2-dibenzoyloxybenzene, 3-ethyl-1,2-dibenzoyloxybenzene, 4-butyl-1,2-dibenzoyloxybenzene, 1,2-di(n-butylbenzoyloxy)benzene, 1,2-di(isopropylbenzoyloxy)benzene, 3-n-propyl-1,2-dibenzoyloxybenzene, 3-isopropyl-1,2-dibenzoyloxybenzene, 3-isobutyl-1,2-dibenzoyloxybenzene, 3-n-propyl-1,2-di(n-propylbenzoyloxy)benzene, 3-propyl-1,2-di(n-butylbenzoyloxy)benzene, 3-isopropyl-1,2-di(n-propylbenzoyloxy)benzene, 3-isopropyl-1,2-di(n-butylbenzoyloxy)benzene, 3-isopropyl-1,2-di(isopropylbenzoyloxy)benzene, 3-isobutyl-1,2-di(n-propylbenzoyloxy)benzene, 3-isobutyl-1,2-di(n-butylbenzoyloxy)benzene, 3-isobutyl-1,2-di(isopropylbenzoyloxy)benzene, 3-propyl-1,2-di(n-propylbenzoyloxy)benzene, 1,8-dibenzoyloxynaphthalene, 2-ethyl-1,8-dibenzoyloxynaphthalene, 2-propyl-1,8-dibenzoyloxynaphthalene, 2-butyl-1,8-dibenzoyloxynaphthalene, 4-butyl-1,8-dibenzoyloxynaphthalene, 4-isobutyl-1,8-dibenzoyloxynaphthalene, 4-isopropyl-1,8-dibenzoyloxynaphthalene, and 4-propyl-1,8-dibenzoyloxynaphthalene.

In one embodiment of the present invention, the additional compound is a diester compound, and preferably the diester compound is selected from compounds as shown in Formula V,

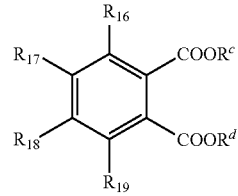

Formula V in Formula V, $R^c$ and $R^d$ may be identical to or different from each other, and are independently selected from straight, branched, or cyclic $C_1$-$C_{20}$ hydrocarbyl, which contains or does not contain a substituent group being selected from hydroxyl and halogen; $R_{16}$-$R_{19}$ may be identical to or different from each other, and are independently selected from hydrogen, halogen atoms, hydroxyl, alkoxy, $C_1$-$C_{12}$ alkyl, $C_2$-$C_{12}$ alkenyl, or $C_6$-$C_{20}$ aryl, wherein each of the $C_1$-$C_{12}$ alkyl, the $C_2$-$C_{12}$ alkenyl, and the $C_6$-$C_{20}$ aryl contains or does not contain a substituent group.

In one embodiment, the diester compound is one or more selected from the group consisting of diethyl phthalate, dipropyl phthalate, diisobutyl phthalate, di-n-butyl phthalate, di-n-pentyl phthalate, diisopentyl phthalate, dineopentyl phthalate, dihexyl phthalate, diheptyl phthalate, dioctyl phthalate, dinonyl phthalate, diisobutyl 2-methylphthalate, di-n-butyl 2-methylphthalate, diisobutyl 2-propylphthalate, di-n-butyl 2-propylphthalate, diisobutyl 2-butylphthalate, di-n-butyl 2-butylphthalate, diisobutyl 2-propylphthalate, di-n-butyl 2-propylphthalate, di-isobutyl 4-propylphthalate, di-n-butyl 4-butylphthalate, di-n-butyl 2-chlorophthalate, di-n-butyl 2-chlorophthalate, di-isobutyl 4-chlorophthalate, di-n-butyl 4-chlorophthalate, and di-n-butyl 4-methoxyphthalate.

In one embodiment of the present invention, when the internal electron donor comprises the compound as shown in Formula II and the additional compound, the weight content of the compound as shown in Formula II in the catalyst component is in a range from 0.01% to 20%, preferably from 1% to 15%, more preferably from 2% to 10%; the weight content of the additional compound in the catalyst component is in a range from 0.01% to 20%, preferably from 1% to 15%.

In a preferred embodiment of the present invention, the catalyst component comprises magnesium, halogen and an internal electron donor, wherein the internal electron donor is selected from a composite internal electron donor comprised of the imine compound i) as shown in Formula I or II and an additional compound. The additional compound is one or more selected from the group consisting of monobasic or polybasic esters, anhydrides, ketones, monoethers or polyethers, alcohols, amines, and dial ester compounds, as previously described.

The catalyst component as described above can be prepared by any one of the following methods.

Method 1 comprises the following steps:

1) reacting a magnesium compound with an organic alcohol compound to form an alcohol adduct; and 2) treating the alcohol adduct with a titanium compound, to obtain the catalyst component.

Method 2 comprises the following steps:

1) dissolving a magnesium compound into a solvent consisting of an organic epoxide compound and an organic phosphorus compound, and optionally adding an inert solvent, to form a mixture; and 2) adding a titanium compound to treat the mixture obtained in step 1), to obtain the catalyst component.

In both of the above method 1 and method 2, an internal electron donor is added in step 1) or 2). The internal electron donor comprises the imine compound as shown in Formula I, or a composite electron donor consisting of the compound as shown in Formula II and the additional compound.

In the above method 1, the organic alcohol compound is selected from $C_2$-$C_8$ monohydric alcohols.

In the above method 2, the organic epoxide compound is at least one selected from $C_2$-$C_8$ aliphatic olefin, dialkenes, halogenated aliphatic olefin, oxide of dialkenes, glycidyl ethers and inner ethers, preferably from ethylene oxide, propylene oxide, butylenes oxide, butadiene oxide, butadiene dioxide, epoxy chloropropane, methyl glycidyl ether, diglycidyl ether, and tetrahydrofuran. The organic phosphorus compound is at least one selected from the group consisting of trimethyl orthophosphate, triethyl orthophosphate, tributyl orthophosphate, triphenyl orthophosphate, trimethyl phosphite, triethyl phosphite, tributyl phosphite, and triphenylmethyl phosphate, In both of the above method 1 and method 2, the magnesium compound is at least one selected from the group consisting of magnesium dihalide, alkoxy magnesium, alkyl magnesium, hydrate or alcohol adduct of magnesium dihalide, or one of the derivatives formed by replacing a halogen atom of the magnesium dihalide molecular formula with an alkoxy or haloalkoxy group, or their mixture, preferably from magnesium dihalide, alcohol adduct of magnesium dihalide, and alkoxy magnesium.

In both of the above method 1 and method 2, the titanium compound is as shown in Formula of $TiB_q(OR_{20})_{4-q}$, in which $R_{20}$ is $C_1$-$C_{20}$ hydrocarbyl group, B is halogen, and q=0-4, preferably the titanium compound being at least one selected from the group consisting of titanium tetrachloride, titanium tetrabromide, titanium tetraiodide, tetrabutoxy titanium, tetraethoxy titanium, triethoxy titanium chloride, diethoxy titanium dichloride and ethoxy titanium trichloride.

The preparation of the amine compound as shown in Formula Z, I, or II is known. For example, it can be prepared by dissolving a aldehyde or ketone compound in an organic solvent, and then adding an amine to obtain an mixture, the mixture being refluxed under certain conditions (acidic or basic) for condensation to obtain a compound with the corresponding structure.

In specific examples of the present invention, when the internal electron donor is the imine compound as shown in Formula I, the methods can be used to prepare the catalyst component are described below.

Method i comprises the following steps.

1]. A magnesium halide alcohol adduct is dispersed in a dispersing agent to form an emulsion, followed by cooling, washing, and drying, to obtain spherical carriers of the magnesium halide alcohol adduct.

2]. A titanium compound is used to treat the above spherical carriers. After washing and drying, the catalyst component is obtained.

In the above method, the imine compound is added in step 1] or 2].

Preferably, in step 1], a melted alcohol adduct of magnesium halide is dispersed with stirring in the dispersing agent, followed by transferring to a cooling liquid to be cooled and shaped.

Preferably, in step 2], the spherical carriers are suspended in a precooled titanium compound, followed by temperature rise. During the temperature rise, an internal electron donor compound in addition to the imine compound is added, and then the titanium compound is added for treatment for one or more times. The molar ratio of the titanium compound to the alcohol of the magnesium halide ranges from 20 to 200, preferably from 30 to 60. The pre-cooling temperature is in a range from −30° C. to 0° C., preferably from −25° C. to −20° C. The temperature at the end of temperature rise is in a range from 80° C. to 136° C., preferably from 100° C. to 130° C.

In the obtained catalyst component, the titanium content is in a range of 1.5-6.0 wt %, the internal electron donor content is in a range of 2.0-20.0 wt %, the halogen content is in a range of 20-60 wt %, the magnesium content is in a range of 10-50 wt %, the inert solvent content is in a range of 0-6 wt %. Preferably the internal electron donor comprises 1-10 wt % of the imine compound and 1-10 wt % of an additional internal electron donor compound other than the imine compound. The catalyst component has a particle size of 5-300 micrometers, preferably 10-100 micrometers, and a specific surface area greater than 250 m²/g.

Further, the alcohol adduct of magnesium halide is represented by the formula of $MgX_2 \cdot nROH$, wherein R is $C_1$-$C_4$ alkyl, n is in a range of 1.5-3.5, and X is halogen, preferably chloro, bromo or iodo. The alcohol adduct of magnesium halide can be prepared by a reaction of a magnesium dihalide with an alcohol at a certain temperature, wherein the molar ratio of the alcohol to the alcohol adduct of magnesium halide is in a range from 1.5 to 5.5, preferably from 2.0 to 3.0.

Further, the dispersing agent is an inert hydrocarbon solvent, such as kerosene, paraffin oil, petrolatum oil, and/or white oil, etc. A surfactant or organosilicon compound can be selectively added. In one embodiment of the present invention, a combination of white oil and silicone oil is used as the dispersing agent.

Further, the cooling liquid is an inert hydrocarbon solvent with low point, such as petroleum ether, pentane, hexane, and/or heptane.

Further, the titanium compound is as shown in Formula of $TiB_q(OR_{20})_{4-q}$, in which $R_{20}$ is $C_1$-$C_{20}$ hydrocarbyl group, B is halogen, and q=0-4, preferably the titanium compound being at least one selected from the group consisting of titanium tetrachloride, titanium tetrabromide, titanium tetraiodide, tetrabutoxy titanium, tetraethoxy titanium, triethoxy titanium chloride, diethoxy titanium dichloride and ethoxy titanium trichloride.

Further, an inert solvent is used to wash the obtained spherical carriers and the catalyst component. The inert solvent comprises $C_1$-$C_{20}$ alkane, cycloalkane, aromatic hydrocarbon, or a mixture thereof.

Method ii comprises the steps of:

[1] mixing a magnesium compound with an organic alcohol compound, then adding a coprecipitation agent to react to form an alcohol adduct;

[2] adding the above alcohol adduct to a titanium compound solution, followed by filtering, to give first solid particles;

[3] adding the first solid particles to the titanium compound solution again, stirring and reacting, followed by filtering, to give second solid particles;

[4] washing the second solid particles with an inert solvent, followed by drying, to give the catalyst component;

wherein, an internal electron donor compound comprising the imine compound as shown in Formula I in optional steps [1]-[4].

In step [I] of the above method, preferably; the magnesium compound and the organic alcohol compound in a molar ratio of 2-5 are mixed with the inert solvent. After increasing the temperature to 120-150° C., the coprecipitation agent is added in a molar ratio of magnesium to coprecipitation agent of 5-10, and then reacted for 1-5 hours.

In step [2] of the above method, preferably, the alcohol adduct is added to the titanium compound solution in a molar ratio of titanium to magnesium of 20-50 at a temperature ranging from −15° C. to 40° C. Then the temperature is increased to 90-110° C. The reaction is performed at 100-130° C. for 1-3 hours. The solid particles are obtained by filtration.

In step [3] of the above method, preferably, the solid particles are added once again added to the titanium compound solution in a molar ratio of titanium to magnesium of 20-50, stirred and reacted at 100-130° C. for 1.5-3 hours. The solid particles are obtained by filtration.

Preferably, in step [2] or step [4], the internal electron donor compound comprising the imine compound as shown in Formula I is added in a molar ratio of internal electron donor compound to magnesium of 1-100. The reaction temperature at the time of the addition of the internal electron donor compound is in a range of 60-100° C., preferably 80-100° C.; the reaction time is in a range of 0.5-2 hours, preferably 0.5-1 hours. The weight content of the imine compound in the resultant catalyst component is in a range of 0.5-20%.

The magnesium compound is at least one selected from the group consisting of magnesium dihalide, alkoxy magnesium, alkyl magnesium, hydrate or alcohol adduct of magnesium dihalide, or one of the derivatives formed by replacing a halogen atom of the magnesium dihalide molecular formula with an alkoxy or haloalkoxy group, or their mixture, preferably from magnesium dihalide, alcohol adduct of magnesium dihalide, and alkoxy magnesium.

The organic alcohol compound is selected from $C_2$-$C_8$ monohydric alcohols. The coprecipitation agent is at least one selected from the group consisting of an organic anhydride, an organic-acid, ether, and ketone. The inert solvent is selected from the group consisting of $C_1$-$C_{20}$ alkane, cycloalkane and aromatic hydrocarbon.

The titanium compound is as shown in Formula $TiB_q(OR_{20})_{4-q}$, in which $R_{20}$ is $C_1$-$C_{20}$ hydrocarbyl group, B is halogen, and q=0-4. Preferably the titanium compound is at least one selected from the group consisting of titanium tetrachloride, titanium tetrabromide, titanium tetraiodide, tetrabutoxy titanium, tetraethoxy titanium, triethoxy titanium chloride, diethoxy titanium dichloride and ethoxy titanium trichloride.

Method iii comprises the following steps:

(1) dissolving a magnesium compound into a mixed solvent comprised of an organic epoxide compound, an organic phosphorus compound and an inert solvent to form an uniform solution, which is then mixed with a titanium compound, followed by precipitating a solid in the presence of a coprecipitation agent; and (2) treating the solid with an internal electron donor, so as to load the internal electron donor on the solid, to obtain the catalyst component.

The internal electron donor comprises the imine compound as shown in Formula I.

In step (1) of the above method, the magnesium compound is at least one selected from the group consisting of magnesium dihalide, alkoxy magnesium, alkyl magnesium, hydrate or alcohol adduct of magnesium dihalide, or one of the derivatives formed by replacing a halogen atom of the magnesium dihalide molecular formula with an alkoxy or haloalkoxy group, or their mixture, preferably from magnesium dihalide, alcohol adduct of magnesium dihalide, and alkoxy magnesium.

The organic epoxide is at least one selected from $C_2$-$C_8$ aliphatic olefin, dialkenes, halogenated aliphatic olefin, oxide of dialkenes, glycidyl ethers and inner ethers. Specifically, the organic epoxide is at least one selected from ethylene oxide, propylene oxide, butylenes oxide, butadiene oxide, butadiene dioxide, epoxy chloropropane, methyl glycidyl ether, diglycidyl ether, and tetrahydrofuran.

The organic phosphorus compound is at least one selected from the group consisting of trimethyl orthophosphate, triethyl orthophosphate, tributyl orthophosphate, triphenyl orthophosphate, trimethyl phosphite, triethyl phosphite, tributyl phosphite, and triphenylmethyl phosphate.

The titanium compound is as shown in Formula $TiB_q(OR_{20})_{4-q}$, in which $R_{20}$ is $C_1$-$C_{20}$ hydrocarbyl group, B is halogen, and q=0-4, preferably the titanium compound being at least one selected from the group consisting of titanium tetrachloride, titanium tetrabromide, titanium tetraiodide, tetrabutoxy titanium, tetraethoxy titanium, triethoxy titanium chloride, diethoxy titanium dichloride and ethoxy titanium trichloride.

The coprecipitation agent is at least one selected from the group consisting of an organic anhydride, an organic acid, ether, and ketone. The inert solvent is selected from the group consisting of $C_1$-$C_{20}$ alkane, cycloalkane and aromatic hydrocarbon, preferably from hexane, heptane, octane, decane, benzene, toluene, xylene, or derivative thereof.

In the above method, calculated based on per mole magnesium, the dosage of the organic epoxide compound is in a range of 0.2-10 mol, the dosage of the organic phosphorus compound is in a range of 0.1-3 mol, the dosage of the titanium compound is in a range of 1-15 mol, the dosage of the internal electron donor compound is in a range of 0.005-15 mol, the dosage of the coprecipitation agent is in a range of 0-5 mol. Preferably, in the internal electron donor compound, the dosage of the imine compound as shown in Formula I is in a range of 0.01-10 mol.

In the above methods i-iii, in addition to the compound as shown in Formula I, the internal electron donor of the catalyst component further comprises at least one compound selected from esters, ethers, ketones, and amines, preferably from diol ester compounds, diester compounds, diether compounds, or polybasic aliphatic/aromatic carboxylic acid esters, including the polybasic carboxylic acid esters disclosed in CN85100997, the content of which is incorporated to the present invention, are preferred.

The present invention also provides a catalyst for olefin polymerization, comprising a reactant of the following components:

a. the above catalyst component, which comprises the imine compound as shown in Formula or prepared by any one of the above methods i, ii, and iii;

b. an organoaluminium compound;

c. an unessential component organosilicon compound.

According to the present invention, calculated based on per mole titanium compound, the dosage ratio of the components is a:b:c−1 mol:20-800 mol:0-100 mol.

Further, the organoaluminium compound is represented by formula $AlR^e_r Y_{3-r}$, wherein $R^e$ is hydrogen or $C_1$-$C_{20}$ hydrocarbyl, Y is halogen, r is an integer and $0<r\leq3$. Specific example of the organoaluminium compound is selected from at least one trimethyl aluminium, triethyl aluminium, tri isobutyl aluminium, trioctyl aluminium, diethylaluminium chloride, diisobutylaluminium chloride, diethylaluminium chloride, diisobutylaluminium chloride, dichloroethyl aluminium, and dichloroethylaluminium, preferably from triethyl aluminium and/or triisobutyl aluminium.

In the above catalyst, for obtaining an olefin polymer with high stereoregularity, an external electron donor needs to be added, the external electron donor being, for example, an organosilicon compound which is as shown in Formula $R^f_g Si(OR^g)_{4-g}$, in which $0 \leq s \leq 3$, $R^f$ and $R^g$ are independently selected from alkyl, cycloalkyl, aryl, halogenated alkyl, or amino, and $R^f$ also can be halogen atom, or hydrogen atom. Preferably, the organosilicon compound is at least one selected from the following organosilicon compounds: trimethylmethoxysilicane, trimethylethyoxylsilicane, trimethylphenoxysilicane, dimethyldimethoxysilicane, dimethyldiethyoxylsilicane, cyclohexylmethyldiethyoxylsilicane, methylcyclohexyldimethoxysilicane, diphenyl dimethoxysilicane, diphenyl diethyoxylsilicane, phenyl triethyoxylsilicane, phenyl trimethoxysilicane, and vinyltrimethoxysilicane, preferably selected from cyclohexylmethyldimethoxysilicane and diisopropyldimethoxysilicane.

The present invention also provides a prepolymerization catalyst for olefin polymerization, comprising a prepolymer obtained by the prepolymerization of the above solid catalyst component with olefin. Preferably, multiple of the prepolymerization is 0.1-1000 g prepolymer/g solid catalyst component. The olefin is preferably ethylene or propene. Prepolymerization can be performed in gas phase or liquid phase according to the known technique. The steps of prepolymerization as a part of the process of continuous polymerization can be performed on line, and also can be separately performed in batches.

The olefin polymerization of the present invention is carried out in the presence of the above catalyst component, the above catalyst or the above prepolymerization catalyst. The olefin polymerization reaction is carried out according to known polymerization methods, in gas phase or liquid phase or a combination of both. The olefin is preferably ethylene or propene.

The present invention farther provides a catalyst, comprising the following components a) and b), and optional component c):

a) the above catalyst component, which is a composite internal electron donor consisting of the compound as shown in Formula II and an additional compound;

b) a cocatalyst organoaluminium compound, and c) an external electron donor organosilicon compound.

The above catalyst can be prepared by the following methods.

Method i' comprises the following steps. A magnesium halide is dissolved into a uniform solution comprised of an organic epoxide compound and an organic phosphorus compound. An inert solvent can also be added therein. The above uniform solution is mixed with a titanium tetrahalide or a derivative thereof. When a coprecipitation agent exists in the reaction system, a solid precipitates. The compounds as shown in Formula I and Formula II are loaded on the solid, which is then successively treated with a titanium tetrahalide or an inert solvent, and the compound as shown in Formula I, to obtain a solid catalyst which comprises titanium, magnesium, halogen, electron donor and so on.

Method ii' comprises the following steps. A magnesium halide or an organic magnesium compound, an alcohol compound, and a titanate or titanium halide compound are fully mixed in an inert solvent. The resulting mixture is first heated and then cooled to form spherical carriers alkoxymagnesium or alkoxy magnesium chloride, or the resulting mixture is added with an inert solvent to form a uniform alcohol adduct solution. The above carriers or uniform solution is mixed with titanium tetrahalide or a derivative thereof, and kept at low temperature for a period of time. After the temperature is increased by heating, the compounds as shown in Formula I and II are added to the resulting mixture, which is then treated with a titanium tetrahalide or an inert solvent. Finally the resulting mixture is filtered, washed, and dried to obtain a solid catalyst which comprises titanium, magnesium, halogen, electron donor and so on.

Method iii' comprises the following steps. A magnesium halide is dissolved into a uniform solution comprised of an organic epoxide compound and an organic phosphorus compound. An inert solvent can also be added therein. The compounds as shown in Formula I and Formula II are added to the uniform solution. The above solution is then mixed with a titanium tetrahalide or a derivative thereof, and kept at low temperature for a period of time. After the temperature is increased by heating, the resulting mixture is treated with a titanium tetrahalide or an inert solvent. Finally the resulting mixture is filtered, washed, and dried to obtain a solid catalyst which comprises titanium, magnesium, halogen, electron donor and so on.

Method iiii' comprises the following steps. A magnesium halide is dissolved into a uniform solution comprised of an organic epoxide compound and an organic phosphorus compound. An inert solvent can also be added therein. The above uniform solution is mixed with a titanium tetrahalide or a derivative thereof. When a coprecipitation agent exists in the reaction system, a solid precipitates. The compounds as shown in Formula II are loaded on the solid, which is then successively treated with a titanium tetrahalide, an inert solvent, and the compound as shown in Formula I. Finally the resulting mixture is filtered, washed, and dried to obtain a solid catalyst which comprises titanium, magnesium, halogen, electron donor and so on.

The present invention has the following features.

1. Use of the compound used in the present invention in preparation of a supporting-type catalyst or in olefin polymerization reaction has not been reported in literature. A conventional non-metallocene catalyst for olefin polymerization contains an amine transition metal complex with strong bond strength. As a result, in the process of polymerization, it is required to use a strong cocatalyst (such as methylaluminoxane (MAO) etc.), which has a single active center in the polymerization. In contrast, the imine compound used in the present invention retains a carbon-nitrogen double bond in the molecule structure, which has a low bond energy combining with a metal during the formation of the catalyst. Therefore the imine compound can play the role of the internal electron donor. Meanwhile, in the catalyst system in which the internal electron donor is loaded on $MgCl_2$, the imine compound not only coordinates with metal Ti, but also may coordinate with metal Mg, thus producing multi-active centers during the process of polymerization reaction. Hence, from polymerization mechanism, the two catalysts are essentially different.

2. When the catalyst of the present invention is used for olefin polymerization reaction, the catalyst has a high activity, a good hydrogen response, and a slow rate of activity delay, and the obtained polymer has an adjustable isotacticity, and a wide molecular weight distribution.

DETAILED DESCRIPTION OF THE EMBODIMENTS

The present invention will be explained in detail below in combination with the embodiments. It should be noted that the embodiments are provided for illustrating, rather than restricting the present invention.

The following testing methods were adopted.

Isotacticity (I.I) of polypropylene was measured by boiling heptane extraction;

Melt index of (MI) of polypropylene was measured based on ASTMD1238-99 standard;

Molecular weight distribution (Mw/Mn) of polypropylene was measured by a gel permeation chromatograph manufactured by Waters company, with 1,2,4-trichlorobenzene as solvent, and styrene as standard sample;

Nuclear magnetic resonance analysis about the polypropylene was conducted by measuring $^1$H-NMR of the polymer with a Bruke dmx 300 MHz NMR spectrometer at a temperature of 275 K, with deuterated chloroform as solvent, TMS as internal standard.

(A) Synthesis of Internal Electron Donors

(1A) Synthesis of Imine Compounds as Shown in Formula I

Example 1A-1

Synthesis of Compound 2,4-diphenylimino pentane 2 g of acetylacetone, 80 mL of isopropanol, and 0.2 mL of glacial acetic acid were placed into a three-neck 250 mL flask replaced by nitrogen gas, and were mixed uniformly by stirring at room temperature, followed by, at room temperature, a slow addition of 20 mL of isopropanol solution containing 3.86 g aniline. The resulting mixture was stirred and reacted for 1 hour, heated to 90° C. to perform a reflux reaction for 12 hours. The reaction solution was then concentrated under reduced pressure, and purified by chromatographic separation, to obtain a product of 3.02 g (the yield was 60%). $^1$H-NMR (δ, ppm, TMS, CDCl$_3$): 7.96-7.86 (6H, m, ArH), 7.65-7.46 (4H, m, ArH), 3.02-3.25 (2H, s, CH$_2$), 1.16-1.30 (3H, s, CH$_3$), 0.98-1.12 (3H, s, CH$_3$); mass spectrum, FD-mass spectrometry: 250.

Example 1A-2

Synthesis of Compound 2,4-di-p-chlorophenylimino pentane 1 g of acetylacetone, 50 mL of ethanol, and 10 mL of benzene were placed into a three-neck 250 mL flask replaced by nitrogen gas, and were mixed uniformly by stirring at room temperature, followed by, at room temperature, a slow addition of 40 mL of ethanol solution containing 2.58 g p-chloroaniline. The resulting mixture was stirred and reacted for 2 hours, heated to 100° C. to perform a reflux reaction for 24 hours. The reaction solution was then concentrated under reduced pressure, and purified by chromatographic separation, to obtain a product of 2.38 g (the yield was 57%). $^1$H-NMR (δ, ppm, TMS, CDCl$_3$): 7.96-7.86 (4H, m, ArH), 7.38-7.56 (4H, m, ArH), 3.05-3.28 (2H, s, CH$_2$), 1.16-1.30 (3H, s, CH$_3$), 0.98-1.12 (3H, s, CH$_3$); mass spectrum, FD-mass spectrometry: 318.

Example 1A-3

Synthesis of Compound 2,4-di(2,6-diisopropylphenylimino)pentane 1 g of acetylacetone, 40 mL of isopropanol, and 0.2 ml, of glacial acetic acid were placed into a three-neck flask replaced by nitrogen gas, and were mixed uniformly by stirring at room temperature, followed by, at room temperature, a slow addition of 50 mL of isopropanol solution containing 3.68 g of 2, 6-diisopropyl aniline. The resulting mixture was stirred and reacted for 1 hour, heated to 100° C. to perform a reflux reaction for 26 hours. The reaction solution was then concentrated under reduced pressure, and purified by chromatographic separation, to obtain a light yellow liquid of 2.08 g (the yield was 67%). $^1$H-NMR (δ, ppm, TMS, CDCl$_3$): 7.63-7.46 (3H, m, ArH), 3.25-3.38 (6H, m, CH 和 CH$_2$), 1.21-1.38 (27H, m, CH$_3$), 0.98-1.12 (3H, m, CH$_3$); mass spectrum, FD-mass spectrometry: 418.

Example 1A-4

Synthesis of Compound 2,4-di(2,6-dimethylphenylimino)pentane 1 g of acetylacetone, 80 mL of isopropanol, and 0.2 mL of glacial acetic acid were placed into a three-neck flask replaced by nitrogen gas, and were mixed uniformly by stirring at room temperature, followed by, at room temperature, a slow addition of 30 mL of isopropanol solution containing 2.46 g of 2,6-dimethyl aniline. The resulting mixture was stirred and reacted for 0.5 hour, heated to 90° C. to perform a reflux reaction for 24 hours. The reaction solution was then concentrated under reduced pressure, and purified by chromatographic separation, to obtain a light yellow liquid of 2.72 g (the yield was 67%). $^1$H-NMR (δ, ppm, TMS, CDCl$_3$): 7.72-7.53 (3H, m, ArH), 3.25-3.31 (2H, m, CH$_2$), 2.31-2.54 (12H, m, CH$_3$), 1.20-1.35 (3H, m, CH$_3$), 0.98-1.12 (3H, m, CH$_3$); mass spectrum, FD-mass spectrometry: 306.

Example 1A-5

Synthesis of Compound 2,4-di(2,4,6-trimethylphenylimino)pentane 1 g of acetylacetone, 40 mL of anhydrous ethanol, and 0.5 ml, of glacial acetic acid were placed into a three-neck flask replaced by nitrogen gas, and were mixed uniformly by stirring at room temperature, followed by, at room temperature, a slow addition of 50 mL of ethanol solution containing 2.73 g of 2,4,6-trimethyl aniline. The resulting mixture was stirred and reacted for 1 hour, heated to 100° C. to perform a reflux reaction for 36 hours. The reaction solution was then concentrated under reduced pressure, and purified by chromatographic separation, to obtain a product of 2.07 g (the yield was 62%), $^1$H-NMR (δ, ppm, TMS, CDCl$_3$): 7.86-7.66 (4H, m, ArH), 3.16-3.28 (2H, m, CH$_2$), 2.30-2.52 (18H, m,

Example 1A-6

Synthesis of Compound 1-phenyl-1,3-di(2,4,6-trimethylphenylimino)butane 0.82 g of benzoylacetone, 80 mL of isopropanol, and 0.3 mL of glacial acetic acid were placed into a three-neck 250 mL flask replaced by nitrogen gas, and were mixed uniformly by stirring at room temperature, followed by, at room temperature, a slow addition of 20 mL of isopropanol solution containing 2.86 g of 2,4,6-trimethyl aniline. The resulting mixture was stirred and reacted for 2 hours, heated to 90° C. to perform a reflux reaction for 48 hours. After the reaction solution was cooled, a yellow solid was obtained. The solid was recrystallized with ethanol to obtain a light yellow crystal of 1.3 g (the yield was 66%). $^1$H-NMR ($\delta$, ppm, TMS, CDCl$_3$): 7.96-7.80 (5H, m, ArH), 7.68-7.56 (4H, m, ArH), 3.23-3.36 (2H, s, CH$_2$), 2.28-2.42 (18H, m, CH$_3$), 1.08-1.28 (3H, m, CH$_3$); mass spectrum, FD-mass spectrometry: 396.

Example 1A-7

Synthesis of Compound 1-phenyl-1,3-di(2,6-diisopropylphenylimino)butane 0.82 g of benzoylacetone, 60 mL of isopropanol, and 0.5 mL of formic acid were placed into a three-neck 250 mL flask replaced by nitrogen gas, and were mixed uniformly by stirring at room temperature, followed by, at room temperature, a slow addition of 40 mL of isopropanol solution containing 1.85 g of 2,6-diisopropyl aniline. The resulting mixture was stirred and reacted for 2 hours, heated to 90° C. to perform a reflux reaction for 36 hours. After the reaction solution was concentrated under reduced pressure, a yellow solid was obtained. The solid was recrystallized with ethanol to obtain a white crystal of 1.6 g (the yield was 61%). $^1$H-NMR ($\delta$, ppm, TMS, CDCl$_3$): 7.96-7.82 (7H, m, ArH), 7.66-7.46 (4H, m, ArH), 3.20-3.43 (6H, m, CH 和 CH$_2$), 1.20-1.38 (24H, m, CH$_3$), 0.98-1.12 (3H, m, CH$_3$); mass spectrum, FD-mass spectrometry: 480.

Example 1A-8

Synthesis of compound 1,3-diphenyl-1,3-di(2,6-diisopropylphenylimino)propane 1.12 g of benzoylmethane, 80 mL of isopropanol, and 0.5 mL of acetic acid were placed into a three-neck 250 mL flask replaced by nitrogen gas, and were mixed uniformly by stirring at room temperature, followed by, at room temperature, a slow addition of 20 mL of isopropanol solution containing 1.8 g of 2,6-diisopropyl aniline. The resulting mixture was stirred and reacted for 2 hours, heated to 90° C. to perform a reflux reaction for 48 hours, and then cooled to room temperature. After the reaction solution was concentrated under reduced pressure, a yellow solid was obtained. The solid was recrystallized with ethanol to obtain a light yellow crystal of 1.65 g (the yield was 61%). $^1$H-NMR ($\delta$, ppm, TMS, CDCl$_3$): 7.96-7.76 (12H, m, ArH), 7.66-7.46 (4H, m, ArH), 3.21-3.36 (6H, m, CH 和 CH$_2$), 1.13-1.36 (24H, m, CH$_3$); mass spectrum, FD-mass spectrometry: 542.

Example 1A-9

Synthesis of Compound 1,3-diphenyl-1,3-di(2,6-dimethylphenylimino)propane 1.12 g of benzoylmethane, 80 mL of isopropanol, and 0.5 mL of formic acid were placed into a three-neck 250 mL flask replaced by nitrogen gas, and were mixed uniformly by stirring at room temperature, followed by, at room temperature, a slow addition of 20 mL of isopropanol solution containing 1.3 g of 2,6-dimethyl aniline. The resulting mixture was stirred and reacted for 2 hours, heated to 90° C. to perform a reflux reaction for 24 hours, and then cooled to room temperature. After the reaction solution was concentrated under reduced pressure, a yellow solid was obtained. The solid was recrystallized with ethanol to obtain a light yellow crystal of 1.39 g (the yield was 65%), $^1$H-NMR ($\delta$, ppm, TMS, CDCl$_3$): 7.96-7.67 (12H, m, ArH), 7.66-7.48 (4H, m, ArH), 3.21-3.25 (2H, s, CH$_2$), 2.11-2.23 (12H, m, CH$_3$); mass spectrum, FD-mass spectrometry: 430.

Example 1A-10

Synthesis of Compound 1-phenyl-1,3-di(2,6-dimethylphenylimino)butane 0.81 g of benzoylacetone, 60 ml of isopropanol, and 0.5 mL of formic acid were placed into a three-neck 250 mL flask replaced by nitrogen gas, and were mixed uniformly by stirring at room temperature, followed by, at room temperature, a slow addition of 30 mL of isopropanol solution containing 1.3 g of 2,6-dimethyl aniline. The resulting mixture was stirred and reacted for 2 hours, heated to 90° C. to perform a reflux reaction for 18 hours. After the reaction solution was concentrated under reduced pressure, a white solid was obtained. The solid was recrystallized with ethanol to obtain a white crystal of 1.12 g (the yield was 61%), $^1$H-NMR ($\delta$, ppm, TMS, CDCl$_3$): 7.96-7.76 (5H, m, ArH), 7.66-7.46 (3H, m, ArH), 2.12-2.23 (2H, m, CH$_2$), 2.12-2.23 (2H, m, CH$_2$), 2.26-2.38 (12H, m, CH$_3$), 2.01-2.02 (2H, s, CH$_2$), 1.01-1.12 (3H, m, CH$_3$); mass spectrum, FD-mass spectrometry: 368.

Example 1A-11

Synthesis of Compound 3,5-di(2,6-diisopropylphenylimino)heptane 1.28 g of 3,5-heptadione, 80 mL of isopropanol, and 0.5 mL of acetic acid were placed into a three-neck 250 mL flask replaced by nitrogen gas, and were mixed uniformly by stirring at room temperature, followed by, at room temperature, a slow addition of 20 mL of isopropanol solution containing 3.68 g of 2,6-diisopropyl aniline. The resulting mixture was stirred and reacted for 2 hours, heated to 90° C. to perform a reflux reaction for 36 hours. After the reaction solution was concentrated under reduced pressure, a yellow solid was obtained. The solid was purified with a column to obtain a Sight yellow liquid of 2.36 g (the yield was 53%). $^1$H-NMR ($\delta$, ppm, TMS, CDCl$_3$): 7.46-7.78 (6H, m, ArH), 3.21-3.36 (4H, m, CH), 2.12-2.23 (2H, m, CH$_2$), 1.58-1.86

(CH$_3$), 1.23-1.34 (3H, m, CH$_3$), 0.98-1.14 (3H, m, CH$_3$); mass spectrum, FD-mass spectrometry: 334.

(4H, m, CH$_2$), 1.26-1.38 (24H, m, CH$_3$), 0.97-1.21 (6H, m, CH$_3$); mass spectrum, FD-mass spectrometry: 446.

Example 1A-12

Synthesis of Compound 2-(2-naphthylimino)-4-(4-trifluorophenylimino)pentane 1.1 g of acetylacetone, 100 mL of methylbenzene, and 0.35 g of p-methylbenzenesulfonic acid were placed into a three-neck flask replaced by nitrogen gas, and were mixed uniformly by stirring at room temperature, followed by, at room temperature, a slow addition of 1.43 g of 2-naphthylamine. The resulting mixture was heated to 130° C. to perform a reflux reaction for 30 hours with water being separated. After the mixture was cooled to room temperature, 1.62 g of 4-trifluoromethyl aniline was added, followed by a reflux reaction for 36 hours with water being separated. The reactant solution was concentrated under reduced pressure to remove the solvent. The residue was washed with a saturated solution of sodium bicarbonate, extracted for three times with 50 mL of anhydrous ether. The organic phases were mixed together, and dried with anhydrous sodium sulfate. The solvent was removed. The primary product was recrystallized with ethanol, to obtain a product of 2.16 g (the yield was 58%). $^1$H-NMR (δ, ppm, TMS, CDCl$_3$): 8.02-8.16 (3H, m, ArH), 7.86-7.70 (9H, m, ArH), 2.01-2.16 (2H, s, CH$_2$), 1.21-1.35 (3H, m, CH$_3$), 0.98-1.14 (3H, m, CH$_3$); mass spectrum, FD-mass spectrometry: 368.

Example 1A-13

Synthesis of Compound 2,4-di(2,6-diisopropylphenylimino)-1,1,1-trifluoropentane 1.54 g of 1,1,1-trifluoro-2,4-pentanedione, 100 mL of methylbenzene, and 0.35 g of p-methylbenzenesulfonic acid were placed into a three-neck flask replaced by nitrogen gas, and were mixed uniformly by stirring at room temperature, followed by, at room temperature, a slow addition of 1.78 g of 2,6-diisopropyl aniline. The resulting mixture was heated to 130° C. to perform a reflux reaction for 30 hours with water being separated. After the mixture was cooled to room temperature, 1.78 g of 2,6-diisopropyl aniline was added, followed by a reflux reaction for 36 hours with water being separated. The reaction solution was concentrated under reduced pressure to remove the solvent. The residue was washed with a saturated solution of sodium bicarbonate, extracted for three times with 50 mL of anhydrous ether. The organic phases were mixed together, and dried with anhydrous sodium sulfate. The solvent was removed. The primary product was purified with a column to obtain a solid light yellow product of 2.83 g (the yield was 60%). $^1$H-NMR (δ, ppm, TMS, CDCl$_3$): 8.02-8.16 (3H, m, ArH), 7.76-7.68 (6H, m, ArH), 3.21-3.36 (4H, m, CH), 2.01-2.16 (2H, s, CH$_2$), 1.22-1.34 (24H, m, CH$_3$), 0.98-1.14 (3H, m, CH$_3$); mass spectrum, FD-mass spectrometry: 472.

Example 1A-14

Synthesis of Compound 1-(2-furyl)-4,4,4-trifluoro-1,3-di(2,6-diisopropylphenylimino)butane 2.06 g of 1-(2-furyl)-4,4,4-trifluoro-1,3-butanedione, 100 mL of methylbenzene, and 0.32 g of p-methylbenzenesulfonic acid were placed into a three-neck flask replaced by nitrogen gas, and were mixed uniformly by stirring at room temperature, followed by, at room temperature, a slow addition of 3.68 g of 2,6-diisopropyl aniline. The resulting mixture was heated to 130° C. to perform a reflux reaction for 72 hours with water being separated. After the reaction solution was concentrated under reduced pressure to remove the solvent. The residue was washed with a saturated solution of sodium bicarbonate, extracted for three times with 50 mL of anhydrous ether. The organic phases were mixed together, and dried with anhydrous sodium sulfate. The solvent was removed. The primary product was purified with a column to obtain a solid light yellow product of 2.07 g (the yield was 60%). $^1$H-NMR (δ, ppm, TMS, CDCl$_3$): 8.02-8.16 (2H, m, ArH), 7.46-7.58 (4H, m, ArH), 7.06-7.24 (3H, m, ArH), 3.21-3.36 (4H, m, CH), 1.22-1.34 (12H, m, CH$_3$), 1.08-1.14 (12H, m, CH$_3$); mass spectrum, FD-mass spectrometry: 524.

Example 1A-15

Synthesis of Compound 2-[1-(2,6-diisopropylphenylimino)ethyl]-1-(2,6-diisopropylphenylimin)cyclohexane 3.4 g of 2-acetylcyclohexanone, 100 mL of methylbenzene, and 0.32 g of p-methylbenzenesulfonic acid were placed into a three-neck flask replaced by nitrogen gas, and were mixed uniformly by stirring at room temperature, followed by a slow addition of 3.68 g of 2,6-diisopropyl aniline. A reflux reaction was run for 62 hours with water being separated. The reaction solution was concentrated under reduced pressure to remove the solvent. The residue was washed with a saturated solution of sodium bicarbonate, extracted for three times with 50 mL of anhydrous ether. The organic phases were mixed together, and dried with anhydrous sodium sulfate. The solvent was removed. The primary product was purified with a column to obtain a light yellow liquid of 2.37 g (the yield was 52%), $^1$H-NMR (δ, ppm, TMS, CDCl$_3$): 7.46-7.58 (2H, m, ArH), 7.06-7.24 (4H, m, ArH), 3.21-3.36 (4H, m, CH), 1.65-1.70 (1H, m, CH), 1.37-1.40 (6H, m, CH$_2$), 1.22-1.34 (12H, m, CH$_3$), 1.08-1.14 (12H, m, CH$_3$); mass spectrum, FD-mass spectrometry: 458.

Example 1A-16

Synthesis of Compound 2-[1-(2,6-dimethylphenylimino)ethyl]-1-(2,6-dimethylphenylimino)cyclohexane 1.4 g of 2-acetylcyclohexanone, 100 mL of methylbenzene, and 0.32 g of p-methylbenzenesulfonic acid were placed into a three-neck flask replaced by nitrogen gas, and were mixed uniformly by stirring at room temperature, followed by a slow addition of 2.5 g of 2,6-dimethyl aniline. The resulting mixture was heated to 130° C. to perform a reflux reaction for 62 hours with water being separated. The reaction solution was concentrated under reduced pressure to remove the solvent. The residue was washed with a saturated solution of sodium bicarbonate, extracted for three times with 50 mL of anhydrous ether. The organic phases were mixed together, and dried with anhydrous sodium sulfate. The solvent was removed. The primary product was purified with a column to obtain a light yellow liquid of 2.37 g (the yield was 52%), $^1$H-NMR (δ, ppm, TMS, CDCl$_3$): 7.46-7.58 (2H, m, ArH), 7.06-7.24 (4H, m, ArH), 4.62-4.66 (0.5H, s, NH), 2.37-2.46 (12H, m, CH$_3$), 1.65-1.70 (0.5H, m, CH), 1.38-1.43 (4H, m, CH$_2$), 1.22-1.34 (4H, m, CH$_2$), 0.98-1.04 (3H, s, CH$_3$); mass spectrum, FD-mass spectrometry: 346.

(B) Preparation of Solid Catalyst Components and Olefin Polymerization Reaction

(1B) Solid Catalyst Components Containing Imine Compounds as Shown in Formula I Example 1B-1

(1) Preparation of a Solid Catalyst Component 36.5 mL of anhydrous ethanol and 2.1.3 g of anhydrous magnesium chloride were placed into a 250 mL first reactor provided therein with a reflux condenser, a mechanical agitator, and a thermometer, and fully replaced by nitrogen. The mixture was stirred and heated to lead to a complete dissolution of magnesium chloride, then added with 75 mL of white oil and 75 mL of silicone oil, and kept at 120° C. for a certain time. 112.5 mL of white oil and 112.5 mL of silicone oil were placed in advance into a 500 mL second reactor provided therein with a homogenizer, and preheated to 120° C. The previous mixture was pressed rapidly into a second reactor. The resulting mixture in the second reactor was kept at 120° C. and stirred at a speed of 3500 rmp for 3 minutes, and was transferred to a third reactor while being stirred. A third rector was added with 1600 mL of hexane in advance and was cooled to −25° C. During transfer of the mixture into the third reactor, the temperature in the reactor was not higher than 0° C. The resulting mixture in the third reactor was subjected to suction filtration, and was washed with hexane and dried in vacuum to obtain spheric particles of an alcohol adduct of magnesium chloride of 41 g. After the obtained particles were screened, carriers (100-400 mesh) were taken for analysis. The analysis showed that the component of the carriers was MgCl$_2$.2.38C$_2$H$_5$OH.

7 g of the above MgCl$_2$.2.38C$_2$H$_5$OH spheric carriers was measured and added slowly into a reaction flask which was provided therein in advance with 100 mL of titanium tetrachloride and pre-cooled to −20° C. The resulting mixture in the reactor were heated gradually to 40° C., followed by an addition of DNBP (di-n-butyl phthalate; 0.003 mol) and imine compound 2,4-di(2,6-diisopropylphenylimino)pentane of Formula I (0.003 mol). The resulting mixture was heated continuously to 100° C. in 1 hour, kept for 2 hours, and then subjected to suction filtration. The mixture was again added with 100 ml of TiCl$_4$, then heated to 120° C. in 1 hour, kept for 2 hours, and subjected to suction filtration. After that, the mixture was washed with 60 mL of hexane for several times until the filtrate contained no chloridion. The filter cake was dried in vacuum to obtain a solid catalyst component.

(2) Polymerization of Propylene 2.5 mL of AlEt$_3$, and 0.1 mmol of cyclohexyl methyl dimethoxy silane (CHMMS) were placed into a stainless reactor having a volume of 5 L and replaced fully by propylene gas, and was then added with 8-10 mg of the above prepared solid catalyst component, and 1.2 NL of hydrogen gas. 2.5 L of liquid propylene was introduced into the resulting mixture. The mixture was heated to 70° C. and maintained at 70° C. for 1 hour, followed by cooling, and pressure releasing, so that a polypropylene (PP) powder could be obtained. See Table 1 for specific polymerization data.

Example 1B-2

Steps of the present example were the same as those of example 1B-1, except that DNBP (di-n-butyl phthalate) was substituted with 2,4-dibenzoyloxypentane. See Table 1 for results.

Example 1B-3

Steps of the present example were the same as those of example 1B-2, except that 2,4-di(2,6-diisopropylphenylimino)pentane was substituted with 2,4-di(2,6-dimethylphenylimino)pentane. See Table 1 for results.

Example 1B-4

Steps of the present example were the same as those of example 1B-2, except that 2,4-di(2,6-diisopropylphenylimino)pentane was substituted with 1-phenyl-1,3-di(2,6-dimethylphenylimino)butane. See Table 1 for results.

Example 1B-5

Steps of the present example were the same as those of example 1B-2, except that 2,4-di(2,6-diisopropylphenylimino)pentane was substituted with 1-phenyl-1,3-di(2,6-diisopropylphenylimino)butane. See Table 1 for results.

Example 1B-6

Steps of the present example were the same as those of example 1B-2, except that 2,4-di(2,6-diisopropylphenylimino)pentane was substituted with 1,3-diphenyl-1,3-di(2,6-diisopropylphenylimino)propane. See Table 1 for results.

Example 1B-7

Steps of the present example were the same as those of example 1B-2, except that 2,4-di(2,6-diisopropylphenylimino)pentane was substituted with 1,3-diphenyl-1,3-di(2,6-dimethylphenylimino)propane. See Table 1 for results.

Example 1B-8

Steps of the present example were the same as those of example 1B-2, except that 2,4-di(2,6-diisopropylphenylimino)pentane was substituted with 2,4-di(2,4,6-trimethylphenylimino)pentane. See Table 1 for results.

Example 1B-9

Steps of the present example were the same as those of example 1B-2, except that 2,4-di(2,6-diisopropylphenylimino)pentane was substituted with 2,4-di(2,6-diisopropylphenylimino)-1,1,1-trifluoropentane. See Table 1 for results.

Example 1B-10

Steps of the present example were the same as those of example 1B-2, except that 2,4-di(2,6-diisopropylphenylimino)pentane was substituted with 1-(2-furyl)-4,4,4-trifluoro-1,3-di(2,6-diisopropylphenylimino)butane. See Table 1 for results.

Example 1B-11

Steps of the present example were the same as those of example 1B-1, except that DNBP (di-n-butyl phthalate) was substituted with 2-isopropyl-2-isopentyl-1,3-dimethoxy propane. See Table 1 for results.

Example 1B-12

Steps of the present example were the same as those of example 1B-2, except that 2,4-di(2,6-diisopropylphenylimino)pentane was substituted with 2-[1-(2,6-diisopropylphenylimino)]-1-(2,6-diisopropylphenylimino)cyclohexane. See Table 1 for results.

Example 1B-13

(1) Preparation of a Solid Catalyst Component $MgCl_2.2.38C_2H_5OH$ spheric particles were prepared in the same way as shown in step (1) of example 1B-1.

7 g of the above $MgCl_2.2.38C_2H_5OH$ spheric carriers was measured and added slowly into a reaction flask which was provided therein in advance with 100 mL of titanium tetrachloride and pre-cooled to −20° C. The resulting mixture in the reactor were heated gradually to 40° C., followed by an addition of 2,4-dibenzoyloxypentane (0.003 mol). The resulting mixture was heated continuously to 100° C. in 1 hour, kept for 2 hours, and then subjected to suction filtration. The mixture was again added with 100 mL of $TiCl_4$, then heated to 120° C. in 1 hour, kept for 2 hours, and subjected to suction filtration. After that, the mixture was added with 80 mL of methylbenzene and imine compound 2,4-di(2,6-diisopropylphenylimino)pentane (0.006 mol), washed with 60 mL of hexane for several times until the filtrate contained no chloridion. The filter cake was dried in vacuum to obtain a solid catalyst component.

(2) Polymerization of Propylene

Propylene polymerization was carried out in the same way as shown in step (2) of example 1B-1. See Table 1 for specific polymerization data.

Example 1B-14

Steps of the present example were the same as those of example 1B-2, except that the time of the polymerization reaction was extended to 2 hours. See Table 1 for results.

Example 1B-15

Steps of the present example were the same as those of example 1B-2, except that the time of the polymerization reaction was extended to 3 hours. See Table 1 for results.

Example 1B-16

Steps of the present example were the same as those of example 1B-2, except that the adding amount of hydrogen was changed to 7.2 NL. See Table 1 for results.

Example 1B-17

Steps of the present example were the same as those of example 1B-3, except that the time of the polymerization reaction was extended to 2 hours. See Table 1 for results.

Example 1B-18

Steps of the present example were the same as those of example 1B-12, except that the time of the polymerization reaction was extended to 2 hours. See Table 1 for results.

Example 1B-19

Steps of the present example were the same as those of example 1B-3, except that the time of the polymerization reaction was extended to 3 hours. See Table 1 for results.

Example 1B-20

Steps of the present example were the same as those of example 1B-12, except that the time of the polymerization reaction was extended to 3 hours. See Table 1 for results.

Example 1B-23

Steps of the present example were the same as those of example 1B-12, except that the adding amount of hydrogen was changed to 7.2 NL. See Table 1 for results.

Example 1B-22

Steps of the present example were the same as those of example 1B-1, except that the adding amount of hydrogen was changed to 7.2 NL. See Table 1 for results.

Comparative Example 1B'-1

(1) Preparation of a Solid Catalyst Component $MgCl_2.2.38C_2H_5OH$ spheric particles were prepared in the same way as shown in step (1) of example 1B-1.

7 g of the above $MgCl_2.2.38C_2H_5OH$ spheric carriers was measured and added slowly into a reaction flask which was provided therein in advance with 100 mL of titanium tetrachloride and pre-cooled to −20° C. The resulting mixture in the reactor were heated gradually to 40° C., followed by an addition of DNBP (di-n-butyl phthalate; 0.006 mol). The resulting mixture was heated continuously to 100° C. in 1 hour, kept for 2 hours, and then subjected to suction filtration. The mixture was again added with 100 mL of $TiCl_4$, then heated to 320° C. in 1 hour, kept for 2 hours, and subjected to suction filtration. After that, the mixture was washed with 60 mL of hexane for several times until the filtrate contained no chloridion. The filter cake was dried in vacuum to obtain a solid catalyst component.

(2) Polymerization of Propylene

Propylene polymerization was carried out in the same way as shown in step (2) of example 1B-1. See Table 1 for specific polymerization data.

Comparative Example 1B'-2

2.5 mL of $AlEt_3$, and 5 ml of cyclohexyl methyl dimethoxy silane (CHMMS) enabling Al/Si(mol)=25 were placed into a stainless reactor having a volume of 5 L and replaced fully by propylene gas, and was then added with 8-10 mg of the solid catalyst component prepared in comparative example 1B'-1, and 7.2 NL of hydrogen gas, 2.5 L of liquid propylene was introduced into the resulting mixture. The mixture was heated to 70° C. and maintained at 70° C. for 1 hour, followed by cooling, and pressure releasing, so that a PP powder could be obtained. See Table 1 for specific polymerization data.

TABLE 1

| Examples | Catalyst activity (Kg polymer/g catalyst) | Polymer isotacticity (%) | Melt index (g/10 min) | Molecular weight distribution Mw/Mn |
|---|---|---|---|---|
| 1B-1 | 40.7 | 97.6 | 3.2 | 6.9 |
| 1B-2 | 43.8 | 97.3 | 3.3 | 8.6 |
| 1B-3 | 41.1 | 97.2 | 3.2 | 8.6 |
| 1B-4 | 38.5 | 97.1 | 3.2 | 8.4 |
| 1B-5 | 39.6 | 97.3 | 3.3 | 8.6 |
| 1B-6 | 41.2 | 97.2 | 3.9 | 8.9 |
| 1B-7 | 41.3 | 97.1 | 3.9 | 8.8 |
| 1B-8 | 39.8 | 96.8 | 3.2 | 8.7 |
| 1B-9 | 41.1 | 96.6 | 3.9 | 8.8 |
| 1B-10 | 38.6 | 96.8 | 3.1 | 7.6 |
| 1B-11 | 39.8 | 97.3 | 1.7 | 6.8 |
| 1B-12 | 42.6 | 96.8 | 6.3 | 6.6 |
| 1B-13 | 45.7 | 97.6 | 3.9 | 8.8 |
| 1B-14 | 72.5 | 96.8 | 3.5 | nd |
| 1B-15 | 89.8 | 96.7 | 3.8 | nd |
| 1B-16 | 52.7 | 95.5 | 45.0 | nd |
| 1B-17 | 67.6 | 97.6 | 3.2 | nd |
| 1B-18 | 66.5 | 97.5 | 3.2 | nd |
| 1B-19 | 89.3 | 97.5 | 3.3 | nd |
| 1B-20 | 83.9 | 97.7 | 3.3 | nd |
| 1B-21 | 53.3 | 95.3 | 38.2 | nd |
| 1B-22 | 38.4 | 95.4 | 47.6 | nd |
| Comparative Example 1B'-1 | 38.6 | 97.5 | 3.9 | 3.9 |
| Comparative example 1B'-2 | 51.2 | 95.2 | 32.5 | nd |

Note:
"nd" in the above Table means that related measurement was not conducted.

As can be seen from Table 1, in a same rich hydrogen atmosphere, compared with comparative example 1B'-2, examples 1B-16, 1B-21, and 1B-22 can result in a polymer with a higher melt index, which indicates that the catalyst containing the imine compound has a good hydrogen response. The results of polymerization conducted under conventional conditions show that a polymer prepared with the obtained catalyst has a relatively wide molecular weight distribution, and the polymer thus is more suitable for the production of high impact polymer products.

(2B) Solid Catalyst Components Containing Imine Compounds as Shown in Formula I

Example 2B-1

(1) Preparation of a Solid Catalyst Component

Under a nitrogen atmosphere, 4.8 g of anhydrous magnesium chloride, 19.5 g of isooctanol, and 19.5 g of decane were placed into a 500 mL reactor provided therein with an agitator, then heated to 130° C. to react for 1.5 hours until a complete dissolution of magnesium chloride. After an addition of 1.1 g phthalic anhydride, the mixture was kept at 130° C. to react for 1 hour to obtain an alcohol adduct of magnesium chloride, which was then cooled to room temperature. Under a nitrogen atmosphere, the above alcohol adduct was added into 120 mL of titanium tetrachloride solution which was precooled to −22° C. The resulting mixture was heated slowly to 100° C., and added with 2,4-dibenzoyloxypentane (0.003 mol) and 2,4-di(2,6-diisopropylphenylimino)pentane with said structure (0.003 mol). The mixture was heated and kept at 110° C. for 2 hours, followed by an immediate filtration. The mixture was then added with 120 mL of titanium tetrachloride solution, heated to 110° C. to react for 1 hour, and filtered. The resulting mixture was added with 80 mL of methylbenzene, and 2.66 g of tributyl phosphate, and kept at 90° C. for 0.5 hour. Solid particles were washed with anhydrous hexane for four times, and dried to obtain a solid catalyst component.

(2) Polymerization of Propylene 2.5 mL of AlEt$_3$, and 0.1 mmol of cyclohexyl methyl dimethoxy silane (CHMMS) were placed into a stainless reactor having a volume of 5 L and replaced by propylene gas, and was then added with 8-10 mg of the above prepared solid catalyst component, and 1.2 NL of hydrogen gas. 2.5 L of liquid propylene was introduced into the resulting mixture. The mixture was heated to 70° C. and maintained at 70° C. for 1 hour, followed by cooling, and pressure release, so that a PP powder could be obtained. See Table 2 for specific polymerization data.

Example 2B-2

Steps of the present example were the same as those of example 2B-1, except that 2,4-di(2,6-diisopropylphenylimino)pentane was substituted with 2-[1-(2,6-diisopropylphenylimino)ethyl]-1-(2,6-diisopropylphenylimino)cyclohexane. See Table 2 for results.

Example 2B-3

Steps of the present example were the same as those of example 2B-1, except that 2,4-di(2,6-diisopropylphenylimino)pentane was substituted with 1-phenyl-1,3-di(2,6-dimethylphenylimino)butane. See Table 2 for results.

Example 2B-4

Steps of the present example were the same as those of example 2B-1, except that 2,4-di(2,6-diisopropylphenylimino)pentane was substituted with 1-phenyl-1,3-di(2,6-diisopropylphenylimino)butane. See Table 2 for results.

Example 2B-5

Steps of the present example were the same as those of example 2B-1, except that 2,4-di(2,6-diisopropylphenylimino)pentane was substituted with 1,3-diphenyl-1,3-di(2,6-diisopropylphenylimino)propane. See Table 2 for results.

Example 2B-6

Steps of the present example were the same as those of example 2B-1, except that 2,4-di(2,6-diisopropylphenylimino)pentane was substituted with 2,4-di(2,4,6-trimethylphenylimino)pentane. See Table 2 for results.

Example 2B-7

Steps of the present example were the same as those of example 2B-1, except that 2,4-dibenzoyloxypentane was substituted with DNBP (di-n-butyl phthalate). See Table 2 for results.

Example 2B-8

Steps of the present example were the same as those of example 2B-1, except that 2,4-dibenzoyloxypentane was substituted with 2-isopropyl-2-isopentyl-1,3-dimethoxy propane. See Table 2 for results.

Example 2B-9

Steps of the present example were the same as those of example 2B-1, except that 2,4-di(2,6-diisopropylphenylimino)pentane was substituted with 2-[1-(2,6-diisopropylphenylimino)]-1-(2,6-diisopropylphenylimino)cyclohexane. See Table 2 for results.

Example 2B-10

(1) Preparation of a Solid Catalyst Component

Under a nitrogen atmosphere, 4.8 g of anhydrous magnesium chloride, 19.5 g of isooctanol, and 19.5 g of decane were placed into a 500 mL reactor provided therein with an agitator, then heated to 130° C. to react for 1.5 hours until a complete dissolution of magnesium chloride. After an addition of 1.1 g phthalic anhydride, the mixture was kept at 130° C. to react for 1 hour to obtain an alcohol adduct of magnesium chloride, which was then cooled to room temperature. Under a nitrogen atmosphere, the above alcohol adduct was added into 120 mL of titanium tetrachloride solution which was precooled to −22° C. The resulting mixture was heated slowly to 100° C., and added with 2,4-dibenzoyloxypentane (0.006 mol). The mixture was heated and kept at 110° C. for 2 hours, followed by an immediate filtration. The mixture was then added with 120 mL of titanium tetrachloride solution, heated to 110° C. to react for 1 hour, and filtered. The resulting mixture was added with 80 mL of methylbenzene, and 2,4-di(2,6-diisopropylphenylimino)pentane (0.006 mol) with said structure, and kept at 90° C. for 0.5 hour. Solid particles were washed with anhydrous hexane for four times, and dried to obtain a solid catalyst component.

(2) Polymerization of Propylene

Propylene polymerization was carried out in the same way as shown in step (2) of example 2B-1. See Table 2 for specific polymerization data.

Example 2B-11

Steps of the present example were the same as those of example 2B-10, except that 2,4-di(2,6-diisopropylphenylimino)pentane was substituted with 2,4-di(2,6-dimethylphenylimino)pentane. See Table 2 for results.

Example 2B-12

Steps of the present example were the same as those of example 2B-1, except that the time of the polymerization reaction was extended to 2 hours. See Table 2 for results.

Example 2B-13

Steps of the present example were the same as those of example 2B-1, except that the time of the polymerization reaction was extended to 3 hours. See Table 2 for results.

Example 2B-14

Steps of the present example were the same as those of example 2B-1, except that the adding amount of hydrogen was changed to 7.2 NL. See Table 2 for results.

Example 2B-15

Steps of the present example were the same as those of example 2B-4, except that the time of the polymerization reaction was extended to 2 hours. See Table 2 for results.

Example 2B-16

Steps of the present example were the same as those of example 2B-10, except that the time of the polymerization reaction was extended to 2 hours. See Table 2 for results.

Example 2B-17

Steps of the present example were the same as those of example 2B-4, except that the time of the polymerization reaction was extended to 3 hours. See Table 2 for results.

Example 4B-18

Steps of the present example were the same as those of example 2B-10, except that the time of the polymerization reaction was extended to 3 hours. See Table 2 for results.

Example 2B-19

Steps of the present example were the same as those of example 2B-10, except that the adding amount of hydrogen was changed to 7.2 NL. See Table 2 for results.

Comparative Example 2B'-1

(1) Preparation of a Solid Catalyst Component

Under a nitrogen atmosphere, 4.8 g of anhydrous magnesium chloride, 19.5 g of isooctanol, and 19.5 g of decane were placed into a 500 mL reactor provided therein with an agitator, then heated to 130° C. to react for 1.5 hours until a complete dissolution of magnesium chloride. After an addition of 1.1 g phthalic anhydride, the mixture was kept at 130° C. to react for 1 hour to obtain an alcohol adduct of magnesium chloride, which was then cooled to room temperature. Under a nitrogen atmosphere, the above alcohol adduct was added into 120 mL of titanium tetrachloride solution which was precooled to −22° C. The resulting mixture was heated slowly to 100° C., and added with DNBP (di-n-butyl phthalate; 0.006 mol). The mixture was heated and kept at 110° C. for 2 hours, followed by an immediate filtration. The mixture was then added with 120 mL of titanium tetrachloride solution, heated to 110° C. to react for 1 hour, and filtered. The resulting mixture was added with 80 mL of methyl benzene, and 2.66 g of tributyl phosphate (0.006 mol) with said structure, and kept at 90° C. for 0.5 hour. Solid particles were washed with anhydrous hexane for four times, and dried to obtain a solid catalyst component.

(2) Polymerization of Propylene

Propylene polymerization was carried out in the same way as shown in step (2) of example 2B-15. See Table 2 for specific polymerization data.

Comparative Example 2B'-2

Steps of the present comparative example were the same as those of comparative example 2B'-1, except that the adding amount of hydrogen was changed to 7.2 NL. See Table 2 for results.

TABLE 2

| Examples | Catalyst activity (Kg polymer/g catalyst) | Polymer isotacticity (%) | Melt index (g/10 min) | Molecular weight distribution Mw/Mn |
|---|---|---|---|---|
| 2B-1 | 43.8 | 97.6 | 3.3 | 8.7 |
| 2B-2 | 41.1 | 97.7 | 3.2 | 8.4 |
| 2B-3 | 38.5 | 97.5 | 3.0 | 8.2 |
| 2B-4 | 39.6 | 97.6 | 3.3 | 8.6 |
| 2B-5 | 43.2 | 97.4 | 3.3 | 8.8 |
| 2B-6 | 44.3 | 97.5 | 3.2 | 8.5 |
| 2B-7 | 50.4 | 97.9 | 1.2 | 7.8 |
| 2B-8 | 39.8 | 97.7 | 6.4 | 6.4 |
| 2B-9 | 41.0 | 96.9 | 3.2 | 8.5 |
| 2B-10 | 37.8 | 96.8 | 3.1 | 8.4 |
| 2B-11 | 40.7 | 96.8 | 3.2 | 8.5 |
| 2B-12 | 75.2 | 95.8 | 2.5 | — |
| 2B-13 | 90.1 | 96.7 | 2.8 | — |
| 2B-14 | 53.7 | 96.5 | 45.0 | — |
| 2B-15 | 68.7 | 97.4 | 3.1 | — |
| 2B-16 | 67.6 | 97.5 | 3.2 | — |
| 2B-17 | 88.7 | 97.2 | 3.2 | — |
| 2B-18 | 79.6 | 97.7 | 3.9 | — |
| 2B-19 | 53.0 | 95.3 | 48.0 | — |
| Comparative Example 2B'-1 | 44.6 | 97.6 | 3.7 | 4.5 |
| Comparative Example 2B'-2 | 51.7 | 95.6 | 33.2 | — |

Note:
"—" in the above Table means that related measurement was not conducted.

As can be seen from Table 2, in a same rich hydrogen atmosphere, compared with comparative example 2B'-2, examples 2B-14 and 2B-19 can result in a polymer with a higher melt index, which indicates that the catalyst containing the imine compound has a good hydrogen response. The results of polymerization conducted under conventional conditions show that a polymer prepared with the obtained catalyst has a relatively wide molecular weight distribution, and the polymer thus is more suitable for the production of high impact polymer products.

(3B) Solid Catalyst Components Containing Imine Compounds as Shown in Formula I

Example 3B-1

(1) Preparation of a Solid Catalyst Component 4.8 g of magnesium chloride, 95 mL of methylbenzene, 4 mL of epoxy chloropropane, and 12.5 ml, of tributyl phosphate (TBP) were placed one by one into a reactor fully replaced by high-purity nitrogen gas. The obtained mixture was stirred and heated to be kept at 50° C. for 2.5 hours. After a complete dissolution of the solid, 1.4 g of phthalic anhydride was added into the obtained solution. The solution was kept for 1 hour, cooled to a temperature below −25° C., added with $TiCl_4$ within 1 hour, and slowly heated to 80° C. to gradually precipitate a solid. Then, 0.003 mol of 2,4-dibenzoyloxypentane and 0.003 mol of 2,4-di(2,6-diisopropylphenylimino)pentane with said structure were added. The obtained mixture was kept for 1 hour, then filtered thermally, added with 150 mL of methylbenzene, and washed twice to obtain a solid. The mixture was added with 100 mL of methylbenzene, stirred for 30 minutes, heated to 110° C., washed for three times with each time lasting for 10 minutes, again added with 60 mL of hexane, and washed twice to obtain a solid (solid component) of 7.9 g, containing 3.7% Ti, 20.8% Mg, and 51.5% Cl.

(2) Polymerization of Propylene 2.5 mL of $AlEt_3$, and 5 mL of cyclohexyl methyl dimethoxy silane (CHMMS) were placed into a stainless reactor having a volume of 5 L and replaced fully by propylene gas, and was then added with 10 mg of the above prepared solid component, and 1.2 NL of hydrogen gas. 2.5 L of liquid propylene was introduced into the resulting mixture. The mixture was heated to 70° C. and maintained at 70° C. for 1 hour, followed by cooling, pressure releasing, and discharging, so that a PP resin could be obtained. See Table 3 for specific data.

Example 3B-2

Steps of the present example were the same as those of example 3B-1, except that 2,4-di(2,6-diisopropylphenylimino)pentane was substituted with 2,4-di(2,6-dimethylphenylimino)pentane. See Table 3 for results.

Example 3B-3

Steps of the present example were the same as those of example 3B-1, except that 2,4-di(2,6-diisopropylphenylimino)pentane was substituted with 1-phenyl-1,3-di(2,6-dimethylphenylimino)butane. See Table 3 for results.

Example 3B-4

Steps of the present example were the same as those of example 3B-1, except that 2,4-di(2,6-diisopropylphenylimino)pentane was substituted with 1-phenyl-1,3-di(2,6-diisopropylphenylimino)butane. See Table 3 for results.

Example 3B-5

Steps of the present example were the same as those of example 3B-1, except that 2,4-di(2,6-diisopropylphenylimino)pentane was substituted with 1,3-diphenyl-1,3-di(2,6-diisopropylphenylimino)propane. See Table 3 for results.

Example 3B-6

Steps of the present example were the same as those of example 3B-1, except that 2,4-di(2,6-diisopropylphenylimino)pentane was substituted with 1,3-diphenyl-1,3-di(2,6-dimethylphenylimino)propane. See Table 3 for results.

Example 3B-7

Steps of the present example were the same as those of example 3B-1, except that 2,4-di(2,6-diisopropylphenylimino)pentane was substituted with 2,4-di(2,4,6-trimethylphenylimino)pentane. See Table 3 for results.

Example 3B-8

Steps of the present example were the same as those of example 3B-1, except that 2,4-di(2,6-diisopropylphenylimino)pentane was substituted with 1-trifluoromethyl-2,4-di(2,6-diisopropylphenylimino)pentane. See Table 3 for results.

Example 3B-9

Steps of the present example were the same as those of example 3B-1, except that 2,4-di(2,6-diisopropylphenylimino)pentane was substituted with 1-(2-furyl)-4,4,4-trifluoro-1,3-di(2,6-diisopropylphenylimino)butane. See Table 3 for results.

Example 3B-10

Steps of the present example were the same as those of example 3B-1, except that 2,4-dibenzoyloxypentane was substituted with DNBP (di-n-butyl phthalate). See Table 3 for results.

Example 3B-11

Steps of the present example were the same as those of example 3B-1, except that 2,4-dibenzoyloxypentane was substituted with 2-isopropyl-2-isopentyl-1,3-dimethoxy propane. See Table 3 for results.

Example 3B-12

Steps of the present example were the same as those of example 3B-1, except that 2,4-di(2,6-diisopropylphenylimino)pentane was substituted with 2-[1-(2,6-diisopropylphenylimino)]-1-(2,6-diisopropylphenylimino)cyclohexane. See Table 3 for results.

Example 3B-13

Steps of the present example were the same as those of example 3B-1, except that 2,4-di(2,6-diisopropylphenylimino)pentane was substituted with 2-[1-(2,6-dimethylphenylimino)]-1-(2,6-dimethylphenylimino)cyclohexane. See Table 3 for results.

Example 3B-14

(1) Preparation of a Solid Catalyst Component 4.8 g of magnesium chloride, 95 mL of methylbenzene, 4 ml of epoxy chloropropane, and 12.5 mL of tributyl phosphate (TBP) were placed one by one into a reactor fully replaced by high-purity nitrogen gas. The obtained mixture was stirred and heated to be kept at 50° C. for 2.5 hours. After a complete dissolution of the solid, 1.4 g of phthalic anhydride was added into the obtained solution. The solution was kept for 1 hour, cooled to a temperature below −25° C., added with $TiCl_4$ within 1 hour, and slowly heated to 80° C. to gradually precipitate a solid. Then, 0.006 mol of 2,4-dibenzoyloxypentane was added. The obtained mixture was kept for 1 hour, then filtered thermally, added with 150 mL of methylbenzene, and washed twice to obtain a solid. The mixture was added with 100 mL of methylbenzene, stirred for 30 minutes, heated to 110° C., washed for three times with each time lasting for 10 minutes. The mixture was again added with 60 mL of hexane and 0.006 mol of 2,4-di(2,6-diisopropylphenylimino)pentane with said structure, stirred for 30 minutes, added with 60 mL of hexane, and washed twice to obtain a solid (solid component) of 7.9 g, containing 3.5% Ti, 21.8% Mg, and 50.8% Cl.

(2) Polymerization of Propylene

Propylene polymerization was carried out in the same way as shown in example 3B-1. See Table 3 for specific polymerization data.

Example 3B-15

Steps of the present example were the same as those of example 3B-1, except that the time of the polymerization reaction was extended to 2 hours. See Table 3 for results.

Example 3B-16

Steps of the present example were the same as those of example 3B-1, except that the time of the polymerization reaction was extended to 3 hours. See Table 3 for results.

Example 3B-17

Steps of the present example were the same as those of example 3B-1, except that the adding amount of hydrogen was changed to 7.2 NL. See Table 3 for results.

Example 3B-18

Steps of the present example were the same as those of example 3B-2, except that the time of the polymerization reaction was extended to 2 hours. See Table 3 for results.

Example 3B-19

Steps of the present example were the same as those of example 3B-6, except that the time of the polymerization reaction was extended to 2 hours. See Table 3 for results.

Example 3B-20

Steps of the present example were the same as those of example 3B-2, except that the time of the polymerization reaction was extended to 3 hours. See Table 3 for results.

Example 3B-21

Steps of the present example were the same as those of example 3B-6, except that the time of the polymerization reaction was extended to 3 hours. See Table 3 for results.

Example 3B-22

Steps of the present example were the same as those of example 3B-2, except that the adding amount of hydrogen was changed to 7.2 NL. See Table 3 for results.

Comparative Example 3B'-1

(1) Preparation of a Solid Catalyst Component 4.8 g of magnesium chloride, 95 mL of methylbenzene, 4 mL of epoxy chloropropane, and 12.5 mL of tributyl phosphate (TBP) were placed one by one into a reactor fully replaced by high-purity nitrogen gas. The obtained mixture was stirred and heated to be kept at 50° C. for 2.5 hours. After a complete dissolution of the solid, 1.4 g of phthalic anhydride was added into the obtained solution. The solution was kept for 1 hour, cooled to a temperature below −25° C., added with $TiCl_4$ within 1 hour, and slowly heated to 80° C. to gradually precipitate a solid. Then, 0.003 mol of 2,4-dibenzoyloxypentane was added. The obtained mixture was kept for 1 hour, then filtered thermally, added with 350 mL of methylbenzene, and washed twice to obtain a solid. The mixture was added with 100 mL of methylbenzene, stirred for 30 minutes, heated to 110° C., washed for three times with each time lasting for 10 minutes. The mixture was again added with 60 mL of hexane, and washed twice to obtain a solid (solid component) of 7.9 g, containing 2.7% Ti, 21.5% Mg, and 50.2% Cl.

(2) Polymerization of Propylene 2.5 mL of $AlEt_3$, and 5 mL of cyclohexyl methyl dimethoxy silane (CHMMS) enabling Al/Si (mol)=25 were placed into a stainless reactor having a volume of 5 L and replaced fully by propylene gas, and was then added with 10 mg of the above prepared solid component, and 1.2 NL of hydrogen gas, 2.5 L of liquid propylene was introduced into the resulting mixture. The mixture was heated to 70° C. and maintained at 70° C. for 1 hour, followed by cooling, pressure releasing, and discharging, so that a PP resin could be obtained. See Table 3 for specific data.

Comparative Example 3B'-2

(1) Preparation of a Solid Catalyst Component 4.8 g of magnesium chloride, 95 mL of methylbenzene, 4 mL of epoxy chloropropane, and 12.5 mL of tributyl phosphate (TBP) were placed one by one into a reactor fully replaced by high-purity nitrogen gas. The obtained mixture was stirred and heated to be kept at 50° C. for 2.5 hours. After a complete dissolution of the solid, 1.4 g of phthalic anhydride was added into the obtained solution. The solution was kept for 1 hour, cooled to a temperature below −25° C., added with $TiCl_4$ within 1 hour, and slowly heated to 80° C. to gradually precipitate a solid. Then, 0.003 mol of 2,4-dibenzoyloxypentane was added. The obtained mixture was kept for 1 hour, then filtered thermally, added with 150 mL of methylbenzene, and washed twice to obtain a solid. The mixture was added with 100 mL of methylbenzene, stirred for 30 minutes, heated to 110° C., and washed for three times with each time lasting for 10 minutes. The mixture was added with 60 mL of hexane, and stirred for 30 minutes. The mixture was again added with 60 mL of hexane, and washed for three times to obtain a solid (solid component) of 7.4 g, containing 2.4% Ti, 22% Mg, and 50.6% Cl.

(2) Polymerization of Propylene 2.5 mL of $AlEt_3$, and 5 mL of cyclohexyl methyl dimethoxy silane (CHMMS) enabling Al/Si (mol)=25 were placed into a stainless reactor having a volume of 5 L and replaced fully by propylene gas, and was then added with 10 mg of the above prepared solid component, and 17.2 NL of hydrogen gas. 2.5 L of liquid propylene was introduced into the resulting mixture. The mixture was heated to 70° C. and maintained at 70° C. for 1 hour, followed by cooling, pressure releasing, and discharging, so that a PP resin could be obtained. See Table 3 for specific data.

TABLE 3

| Examples | Catalyst activity (Kg polymer/g catalyst) | Polymer isotacticity (%) | Melt index (g/10 min) | Molecular weight distribution Mw/Mn |
|---|---|---|---|---|
| 3B-1 | 47.8 | 98.1 | 1.3 | 7.8 |
| 3B-2 | 44.1 | 97.6 | 1.2 | 7.6 |
| 3B-3 | 38.8 | 97.8 | 1.0 | 7.6 |
| 3B-4 | 39.7 | 98.0 | 1.1 | 8.0 |
| 3B-5 | 40.2 | 97.9 | 0.9 | 8.1 |
| 3B-6 | 41.6 | 98.1 | 0.9 | 8.0 |
| 3B-7 | 39.6 | 97.8 | 1.1 | 7.9 |
| 3B-8 | 40.1 | 97.6 | 0.9 | 7.7 |
| 3B-9 | 37.6 | 97.6 | 1.0 | 7.8 |
| 3B-10 | 40.0 | 97.7 | 1.7 | 6.7 |
| 3B-11 | 38.6 | 97.8 | 6.2 | 6.6 |
| 3B-12 | 45.6 | 98.1 | 0.9 | 8.1 |
| 3B-13 | 41.7 | 97.9 | 1.0 | 8.2 |
| 3B-14 | 44.7 | 97.6 | 1.2 | — |
| 3B-15 | 70.5 | 97.6 | 1.5 | 7.9 |
| 3B-16 | 89.8 | 98.0 | 1.1 | — |
| 3B-17 | 53.4 | 95.2 | 30.0 | — |
| 3B-18 | 65.9 | 97.7 | 1.2 | — |
| 3B-19 | 68.6 | 97.8 | 1.2 | — |
| 3B-20 | 87.3 | 98.0 | 1.2 | — |
| 3B-21 | 89.2 | 97.9 | 1.2 | |
| 3B-22 | 53.3 | 95.6 | 25.5 | |
| Comparative Example 3B'-1 | 43.3 | 97.9 | 1.0 | 6.8 |
| Comparative Example 3B'-2 | 46.7 | 97.2 | 20.4 | — |

Note:
"—" in the above Table means that related measurement was not conducted.

As can be seen from Table 3, in a same rich hydrogen atmosphere, compared with comparative example 3B'-2, examples 3B-17 and 3B-22 can result in a polymer with a higher melt index, which indicates that the catalyst containing the imine compound has a good hydrogen response. The results of polymerization conducted under conventional conditions show that a polymer prepared with the obtained catalyst has a relatively wide molecular weight distribution, and the polymer thus is more suitable for the production of high impact polymer products.

(A) Synthesis of Infernal Electron Donors (2A) Synthesis of Imine Compounds as Shown in Formula II Example 2A-1

Synthesis of compound 2,6-di(phenylimino)ethylpyridine 1.63 g of 2,6-diacetylpyridine, 80 mL of isopropanol, and 0.2 mL of glacial acetic acid were placed into a three-neck 250 mL flask replaced by nitrogen gas, and were mixed uniformly by stirring at room temperature, followed by, at room temperature, a slow addition of 20 mL of isopropanol solution containing 1.56 g aniline. The resulting mixture was stirred and reacted for 2 hours, heated to perform a reflux reaction for 48 hours. The reaction solution was then concentrated under reduced pressure, and purified by chromatographic separation, to obtain a product of 2.16 g (the yield was 69%). $^1$H-NMR ($\delta$, ppm, TMS, $CDCl_3$): 8.41-8.46 (2H, m, ArH), 7.96 (1H, m, ArH), 7.05-7.26 (10H, m, ArH), 2.20-2.30 (6H, s, $CH_3$); mass spectrum, FD-mass spectrometry: 313.

Example 2A-2

Synthesis of Compound 2,6-di(p-chlorophenylimino)ethylpyridine 1.63 g of 2,6-diacetylpyridine, 80 mL of isopropanol, and 0.2 mL of glacial acetic acid were placed into a three-neck 250 mL flask replaced by nitrogen gas, and were mixed uniformly by stirring at room temperature, followed by, at room temperature, a slow addition of 40 mL of isopropanol solution containing 2.44 g p-chloroaniline. The resulting mixture was stirred and reacted for 2 hours, heated to perform a reflux reaction for 60 hours. The reaction solution was then concentrated under reduced pressure, and purified by chromatographic separation, to obtain a product of 2.16 g (the yield was 69%). $^1$H-NMR ($\delta$, ppm, TMS, $CDCl_3$):

8.31-8.38 (2H, m, ArH), 7.96 (1H, m, ArH), 7.12-7.46 (8H, m, ArH), 2.20-2.30 (6H, s, CH$_3$); mass spectrum, FD-mass spectrometry: 381.

Example 2A-3

Synthesis of Compound 2,6-di(2,6-diisopropylphenylimino)ethylpyridine 1.63 g of 2,6-diacetylpyridine, 80 mL of isopropanol, and 0.3 mL of glacial acetic acid were placed into a three-neck 250 mL flask replaced by nitrogen gas, and were mixed uniformly by stirring at room temperature, followed by, at room temperature, a slow addition of 20 mL of isopropanol solution containing 3.56 g of 2,6-diisopropyl aniline. The resulting mixture was stirred and reacted for 2 hours, heated to perform a reflux reaction for 72 hours. The reaction solution was then concentrated under reduced pressure, and purified by chromatographic separation, to obtain a product of 3.61 g (the yield was 75%). $^1$H-NMR (δ, ppm, TMS, CDCl$_3$); 8.28-8.45 (2H, m, ArH), 7.96 (1H, m, ArH), 7.05-7.36 (6H, m, ArH), 2.76-2.82 (4H, m, CH), 2.18-2.27 (6H, s, CH$_3$), 1.13-1.37 (24H, m, CH$_3$); mass spectrum, FD-mass spectrometry: 481.

Example 2A-4

Synthesis of Compound 2,6-di(2,6-dimethylphenylimino)ethylpyridine 1.63 g of 2,6-diacetylpyridine, 80 mL of isopropanol, and 0.3 mL of glacial acetic acid were placed into a three-neck 250 mL flask replaced by nitrogen gas, and were mixed uniformly by stirring at room temperature, followed by, at room temperature, a slow addition of 20 mL of isopropanol solution containing 2.45 g of 2,6-dimethyl aniline. The resulting mixture was stirred and reacted for 2 hours, heated to perform a reflux reaction for 60 hours. The reaction solution was then concentrated under reduced pressure, and purified by chromatographic separation, to obtain a product of 2.58 g (the yield was 70%), $^1$H-NMR (δ, ppm, TMS, CDCl$_3$): 8.31-8.42 (2H, m, ArH), 7.93 (1H, m, ArH), 7.06-7.27 (6H, m, ArH), 2.21-2.27 (6H, s, CH$_3$), 2.01-2.18 (12H, m, CH$_3$); mass spectrum, FD-mass spectrometry: 369.

Example 2A-5

Synthesis of Compound 2,4,6-di(trimethylphenylimino)ethylpyridine 1.63 g of 2,6-diacetylpyridine, 80 mL of isopropanol, and 0.3 ml of glacial acetic acid were placed into a three-neck 250 mL flask replaced by nitrogen gas, and were mixed uniformly by stirring at room temperature, followed by, at room temperature, a slow addition of 20 mL of isopropanol solution containing 2.72 g of 2,4,6-trimethyl aniline. The resulting mixture was stirred and reacted for 2 hours, and heated to perform a reflux reaction for 48 hours. The reaction solution was then concentrated under reduced pressure, and purified by chromatographic separation, to obtain a product of 2.7 g (the yield was 68%). $^1$H-NMR (δ, ppm, TMS, CDCl$_3$): 8.34-8.45 (2H, m, ArH), 7.88 (1H, m, ArH), 7.02-7.24 (4H, m, ArH), 2.32-2.41 (12H, m, CH$_3$), 2.21-2.27 (6H, s, CH$_3$), 2.02-2.06 (6H, s, CH$_3$); mass spectrum, FD-mass spectrometry: 397.

Example 2A-6

Synthesis of Compound 2,4,6-di(2-naphthylimino)ethylpyridine 1.63 g of 2,6-diacetylpyridine, 80 mL of isopropanol, and 0.3 mL of glacial acetic acid were placed into a three-neck 250 mL flask replaced by nitrogen gas, and were mixed uniformly by stirring at room temperature, followed by, at room temperature, a slow addition of 20 mL of isopropanol solution containing 2.88 g of 2-naphthylamine. The resulting mixture was stirred and reacted for 2 hours, and heated to perform a reflux reaction for 72 hours. The reaction solution was then concentrated under reduced pressure, and purified by chromatographic separation, to obtain a product of 2.7 g (the yield was 68%). $^1$H-NMR (δ, ppm, TMS, CDCl$_3$): 8.14-8.35 (3H, m, ArH), 7.88-7.74 (8H, m, ArH), 7.18-7.22 (6H, m, ArH), 2.20-2.25 (6H, s, CH$_3$); mass spectrum, FD-mass spectrometry: 413.

Example 2A-7

Synthesis of Compound 2,6-di(benzylimino)ethylpyridine 1.63 g of 2,6-diacetylpyridine, 80 mL of isopropanol, and 0.22 g of p-methylbenzenesulfonic acid were placed into a three-neck 250 mL flask replaced by nitrogen gas, and were mixed uniformly by stirring at room temperature, followed by, at room temperature, a slow addition of 20 mL of isopropanol solution containing 2.5 g of benzylamine. The resulting mixture was stirred and reacted for 2 hours, and heated to perform a reflux reaction for 68 hours. The reaction solution was then concentrated under reduced pressure, and purified by chromatographic separation, to obtain a product of 2.38 g (the yield was 70%). $^1$H-NMR (δ, ppm, TMS, CDCl$_3$): 8.24-8.38 (2H, m, ArH), 7.82-7.95 (3H, m, ArH), 7.08-7.22 (8H, m, ArH), 2.56-2.62 (4H, s, CH$_2$), 2.20-2.28 (6H, s, CH$_3$); mass spectrum, FD-mass spectrometry: 341.

Example 2A-8

Synthesis of Compound 2,6-di(8-quinolylimino)ethylpyridine 1.63 g of 2,6-diacetylpyridine, 70 mL of isopropanol, and 0.22 g of p-methylbenzenesulfonic acid were placed into a three-neck 250 mL flask replaced by nitrogen gas, and were mixed uniformly by stirring at room temperature, followed by, at room temperature, a slow addition of 35 mL of isopropanol solution containing 2.92 g of 8-amino quinoline. The resulting mixture was stirred and reacted for 2 hours, and heated to perform a reflux reaction for 72 hours. The reaction solution was then concentrated under reduced pressure, and purified by chromatographic separation, to obtain a product of 2.66 g (the yield was 64%). $^1$H-NMR (δ, ppm, TMS, CDCl$_3$): 8.36-8.58 (4H, m, ArH), 7.82-7.95 (3H, m, ArH), 7.08-7.22 (8H, m, ArH), 2.20-2.28 (6H, s, CH$_3$); mass spectrum, FD-mass spectrometry: 415.

(4B) Solid Catalyst Component Containing Imide Compounds as Shown in Formula II and Formula III Example 4B-1

(1) Preparation of a Solid Catalyst Component phate (TBP) were placed one by one into a reactor fully replaced by high-purity nitrogen gas. The obtained mixture was stirred and heated to be kept at 50° C. for 2.5 hours. After a complete dissolution of the solid, 1.4 g of phthalic anhydride was added into the obtained solution. The solution was kept for 1 hour, cooled to a temperature below −25° C., added with $TiCl_4$ within 1 hour, and slowly heated to 80° C. to gradually precipitate a solid. Then, 2-isopropyl-2-isopentyl-1,3-dimethoxy propane (0.003 mol) and 2,6-di(2,6-diisopropylphenylimino)ethylpyridine with said structure (0.003 mol) were added. The obtained mixture was kept for 1 hour, then filtered thermally, added with 150 mL of methylbenzene, and washed twice to obtain a solid. The mixture was added with 100 mL of methylbenzene, stirred for 30 minutes, heated to 110° C., washed for three times with each time lasting for 10 minutes, again added with 60 mL of hexane, and washed twice to obtain a solid (solid component) of 7.9 g, containing 3.7% Ti, 24.8% Mg, and 51.3% Cl.

(2) Polymerization of Propylene 2.5 mL of $AlEt_3$, and 5 mL of cyclohexyl methyl dimethoxy silane (CHMMS) enabling Al/Si (mol)=25 were placed into a stainless reactor having a volume of 5 L and replaced fully by propylene gas, and was then added with 10 mg of the above prepared solid component, and 1.2 NL of hydrogen gas. 2.5 L of liquid propylene was introduced into the resulting mixture. The mixture was heated to 70° C. and maintained at 70° C. for 1 hour, followed by cooling, pressure releasing, and discharging, so that a PP resin could be obtained. See Table 4 for specific data.

Example 4B-2

Steps of the present example were the same as those of example 4B-1, except that 2,6-di(2,6-diisopropylphenylimino)ethylpyridine was substituted with 2,6-di(2,6-dimethylphenylimino)ethylpyridine. See Table 4 for results.

Example 4B-3

Steps of the present example were the same as those of example 4B-1, except that 2,6-di(2,6-diisopropylphenylimino)ethylpyridine was substituted with 2,6-di(8-dimethylphenylimino)ethylpyridine. See Table 4 for results.

Example 4B-4

Steps of the present example were the same as those of example 4B-1, except that 2,6-di(2,6-diisopropylphenylimino)ethylpyridine was substituted with 2,6-di(8-quinolylimino)ethylpyridine. See Table 4 for results.

Example 4B-5

Steps of the present example were the same as those of example 4B-1, except that 2-isopropyl-2-isopentyl-1,3-dimethoxypropane was substituted with 2,2-dibutyl-1,3-dimethoxypropane. See Table 4 for results.

Example 4B-6

(1) Preparation of a Solid Catalyst Component 4.8 g of magnesium chloride, 95 mL of methylbenzene, 4 mL of epoxy chloropropane, and 12.5 mL of tributyl phosphate (TBP) were placed one by one into a reactor fully replaced by high-purity nitrogen gas. The obtained mixture was stirred and heated to be kept at 50° C. for 2.5 hours. After a complete dissolution of the solid, 1.4 g of phthalic anhydride was added into the obtained solution. The solution was kept for 1 hour, cooled to a temperature below −25° C., added with $TiCl_4$ within 1 hour, and slowly heated to 80° C. to gradually precipitate a solid. Then, 2-isopropyl-2-isopentyl-1,3-dimethoxy propane (0.006 mol) was added. The obtained mixture was kept for 1 hour, then filtered thermally, added with 150 mL of methylbenzene, and washed twice to obtain a solid. The mixture was added with 100 mL of methylbenzene, stirred for 30 minutes, heated to 110° C., and washed for three times with each time lasting for 10 minutes. The mixture was added with 60 mL of hexane and 2,6-di(2,6-diisopropylphenylimino)ethylpyridine with said structure (0.006 mol), and stirred for 30 minutes. The mixture was again added with 60 mL of hexane, and washed twice to obtain a solid (solid component) of 7.9 g, containing 3.5% Ti, 22% Mg, and 50.6% Cl.

(2) Polymerization of Propylene

Propylene polymerization was carried out in the same way as shown in step (2) of example 4B-1. See Table 4 for specific polymerization data.

Example 4B-7

(1) Preparation of a Solid Catalyst Component 300 mL of $TiCl_4$ was placed into a reactor replaced by high-purity nitrogen, cooled to −20° C., and was added with 7 g of alcohol adduct of magnesium chloride (see patent CN1330086A). The resulting mixture was stirred and heated in stages. When the mixture was heated to 40° C., 2-isopropyl-2-isopentyl-1,3-dimethoxypropane (0.003 mol), and 2,6-di(2,6-diisopropylphenylimino)ethylpyridine (0.003 mol) were added. The resulting mixture was kept for 2 hours, filtered, added with 100 mL of $TiCl_4$, heated to 110° C., and treated for three times. After that, the mixture was added with 60 mL of hexane, and washed for three times to obtain a solid (catalyst component) of 7.1 g, containing 3.6% Ti, 28.2% Mg, and 52.4% Cl.

(2) Polymerization of Propylene

Propylene polymerization was carried out in the same way as shown in step (2) of example 4B-1. See Table 4 for specific polymerization data.

Example 4B-8

300 mL of $TiCl_4$ was placed into a reactor replaced by high-purity nitrogen, cooled to −20° C., and was added with 7 g of magnesium ethylate. The resulting mixture was stirred and heated in stages. When the mixture was heated to 40° C. 2-isopropyl-2-isopentyl-1,3-dimethoxy propane (0.003 mol), and 2,6-di(2,6-dimethylphenylimino)ethylpyridine (0.003 mol) were added. The resulting mixture was kept for 3 hours, filtered, added with 100 mL of $TiCl_4$, heated to 110° C., and treated for three times. After that, the mixture was added with 60 mL of hexane, and washed for three times to obtain a solid (catalyst component) of 6.7 g, containing 3.2% Ti, 23.6% Mg, and 49.5% Cl.

(2) Polymerization of Propylene

Propylene polymerization was carried out in the same way as shown in step (2) of example 4B-1. See Table 4 for specific polymerization data.

Example 4B-9

(1) Preparation of a Solid Catalyst Component 4.8 g of magnesium chloride, 95 mL of methylbenzene, 4 mL of epoxy chloropropane, and 12.5 mL of tributyl phos 300 mL of Ti(OEt)$_4$ was placed into a reactor replaced by high-purity nitrogen, cooled to −20° C., and was added with 7 g of alcohol adduct of magnesium chloride (see patent CN1330086A). The resulting mixture was stirred and heated in stages. When the mixture was heated to 40° C., 2-iso-propyl-2-isopentyl-1,3-dimethoxy propane (0.006 mol) was added. The resulting mixture was kept for 2 hours, filtered, added with 100 mL of TiCl$_4$ and 2,6-di(2,6-diisopropylphenylimino)ethylpyridine with said structure (0.006 mol). The mixture was stirred for 1 hour, heated to 110° C., and treated for three times with titanium. After that, the mixture was added with 60 mL of hexane, and washed for three times to obtain a solid (catalyst component) of 6.3 g, containing 3.8% Ti, 24.8% Mg, and 58.6% Cl.

(2) Polymerization of Propylene

Propylene polymerization was carried out in the same way as shown in step (2) of example 4B-1. See Table 4 for specific polymerization data.

Example 4B-10

Steps of the present example were the same as those of example 4B-1, except that the time of the polymerization reaction was extended to 2 hours. See Table 4 for results.

Example 4B-11

Steps of the present example were the same as those of example 4B-1, except that the time of the polymerization reaction was extended to 3 hours. See Table 4 for results.

Example 4B-12

Steps of the present example were the same as those of example 4B-5, except that the time of the polymerization reaction was extended to 2 hours. See Table 4 for results.

Example 4B-13

Steps of the present example were the same as those of example 4B-5, except that the time of the polymerization reaction was extended to 3 hours. See Table 4 for results.

Example 4B-14

Steps of the present example were the same as those of example 4B-2, except that the adding amount of hydrogen was changed to 7.2 NL. See Table 4 for results.

Comparative Example 4B'-1

(1) Preparation of a Solid Catalyst Component 4.8 g of magnesium chloride, 95 mL of methylbenzene, 4 mL of epoxy chloropropane, and 12.5 mL of tributyl phosphate (TBP) were placed one by one into a reactor fully replaced by high-purity nitrogen gas. The obtained mixture was stirred and heated to be kept at 50° C. for 2.5 hours. After a complete dissolution of the solid, 1.4 g of phthalic anhydride was added into the obtained solution. The solution was kept for 1 hour, cooled to a temperature below −25° C., added with TiCl$_4$ within 1 hour, and slowly heated to 80° C. to gradually precipitate a solid. Then, 2-isopropyl-2-isopentyl-1,3-dimethoxy propane (0.006 mol) was added. The obtained mixture was kept for 1 hour, then filtered thermally, added with 150 mL of methylbenzene, and washed twice to obtain a solid. The mixture was added with 100 mL of methylbenzene, heated to 110° C., and washed for three times with each time lasting for 10 minutes. The mixture was added with 60 mL of hexane and stirred for 30 minutes. The mixture was again added with 60 mL of hexane, and washed twice to obtain a solid (solid component) of 7.4 g, containing 2.4% Ti, 24.6% Mg, and 55.6% Cl.

(2) Polymerization of Propylene 2.5 mL of AlEt$_3$, and 5 mL of cyclohexyl methyl dimethoxy silane (CHMMS) enabling Al/Si (mol)=25 were placed into a stainless reactor having a volume of 5 L and replaced fully by propylene gas, and was then added with 10 mg of the above prepared solid component, and 1.2 NL of hydrogen gas. 2.5 L of liquid propylene was introduced into the resulting mixture. The mixture was heated to 70° C. and maintained at 70° C. for 1 hour, followed by cooling, pressure releasing, and discharging, so that a PP resin could be obtained. See Table 4 for specific data.

TABLE 4

| Examples | Catalyst activity (Kg polymer/g catalyst) | Polymer isotacticity (%) | Melt index (g/10 min) | Molecular weight distribution Mw/Mn |
|---|---|---|---|---|
| Example 4B-1 | 51.9 | 97.8 | 2.5 | 6.6 |
| Example 4B-2 | 38.3 | 97.7 | 2.4 | 7.1 |
| Example 4B-3 | 46.8 | 97.8 | 2.5 | 6.4 |
| Example 4B-4 | 46.3 | 97.8 | 2.8 | 7.3 |
| Example 4B-5 | 36.9 | 97.9 | 2.4 | 7.2 |
| Example 4B-6 | 43.8 | 96.8 | 3.2 | 7.2 |
| Example 4B-7 | 53.2 | 98.1 | 6.0 | 8.1 |
| Example 4B-8 | 47.8 | 98.2 | 5.9 | 8.2 |
| Example 4B-9 | 55.1 | 98.3 | 5.7 | 8.2 |
| Example 4B-10 | 65.3 | 97.6 | 2.5 | 7.1 |
| Example 4B-11 | 89.5 | 98.1 | 2.3 | nd- |
| Example 4B-12 | 60.8 | 97.9 | 2.7 | nd |
| Example 4B-13 | 88.7 | 98.0 | 2.8 | nd |
| Example 4B-14 | 65.6 | 95.2 | 96.8 | nd |
| Comparative Example 4B'-1 | 38.3 | 98.1 | 6.3 | 5.7 |

In example 4B-1, compounds of both Formula II and Formula III were used as composite internal electron donors, while in comparative example 4B'-1, only the compound of Formula III was used as internal electron donor, other conditions being the same. As can be seen from Table 4, the catalysts obtained from the examples have a higher activity and better orientation ability, and the obtained polymers have a higher isotacticity and wider molecular weight distribution. Besides, compared with the catalyst in comparative example 4B'-1, the catalyst provided by the present invention is slow in decay of activity, and has a better hydrogen response.

(5B) Solid Catalyst Component Containing Compounds as Shown in Formula II and Formula IV Example 5B-1

(1) Preparation of a Solid Catalyst Component 4.8 g of magnesium chloride, 95 mL of methylbenzene, 4 mL of epoxy chloropropane, and 12.5 mL of tributyl phosphate (TBP) were placed one by one into a reactor fully replaced by high-purity nitrogen gas. The obtained mixture was stirred and heated to be kept at 50° C. for 2.5 hours. After a complete dissolution of the solid, 1.4 g of phthalic anhydride was added into the obtained solution. The solution was kept for 1 hour, cooled to a temperature below −25° C. added with $TiCl_4$ within 1 hour, and slowly heated to 80° C. to gradually precipitate a solid. Then, 2,4-dibenzoyloxypentane (0.003 mol) and 2,6-di(2,6-diisopropylphenylimino)ethylpyridine with said structure (0.003 mol) were added. The obtained mixture was kept for 1 hour, then filtered thermally, added with 150 mL of methylbenzene, and washed twice to obtain a solid. The mixture was added with 100 mL of methylbenzene, stirred for 30 minutes, heated to 110° C., washed for three times with each time lasting for 10 minutes, again added with 60 mL of hexane, and washed twice to obtain a solid (solid component) of 7.9 g, containing 3.6% Ti, 25.4% Mg, and 50.1% Cl.

(2) Polymerization of Propylene 2.5 mL of $AlEt_3$, and 5 mL of cyclohexyl methyl dimethoxy silane (CHMMS) enabling Al/Si (mol)=25 were placed into a stainless reactor having a volume of 5 L and replaced fully by propylene gas, and was then added with 10 mg of the above prepared solid component, and 1.2 NL of hydrogen gas. 2.5 L of liquid propylene was introduced into the resulting mixture. The mixture was heated to 70° C. and maintained at 70° C. for 1 hour, followed by cooling, pressure releasing, and discharging, so that a PP resin could be obtained. The activity was 50600 g/g Cat, and the isotacticity of the obtained polymer was 97.8%. See Table 5 for specific data.

Example 5B-2

Steps of the present example were the same as those of example 5B-1, except that 2,6-di(2,6-diisopropylphenylimino)ethylpyridine was substituted with 2,6-di(2,6-dimethylphenylimino)ethylpyridine. See Table 5 for results.

Example 5B-3

Steps of the present example were the same as those of example 5B-1, except that 2,6-di(2,6-diisopropylphenylimino)ethylpyridine was substituted with 2,6-di(2,4,6-trimethylphenylimino)ethylpyridine. See Table 5 for results.

Example 5B-4

Steps of the present example were the same as those of example 5B-1, except that 2,6-di(2,6-diisopropylphenylimino)ethylpyridine was substituted with 2,6-di(8-quinolylimino)ethylpyridine. See Table 5 for results.

Example 5B-5

Steps of the present example were the same as those of example 5B-1, except that 2,6-di(2,6-diisopropylphenylimino)ethylpyridine was substituted with 2,6-di(2-naphthylimino)ethylpyridine. See Table 5 for results.

Example 5B-6

Steps of the present example were the same as those of example 5B-1, except that 2,4-dibenzoyloxypentane was substituted with 3-ethyl-2,4-dibenzoyloxypentane. See Table 5 for results.

Example 5B-7

(1) Preparation of a Solid Catalyst Component 4.8 g of magnesium chloride, 95 mL of methylbenzene, 4 ml of epoxy chloropropane, and 12.5 mL of tributyl phosphate (TBP) were placed one by one into a reactor fully replaced by high-purity nitrogen gas. The obtained mixture was stirred and heated to be kept at 50° C. for 2.5 hours. After a complete dissolution of the solid. 1.4 g of phthalic anhydride was added into the obtained solution. The solution was kept for 1 hour, cooled to a temperature below −25° C., added with $TiCl_4$ within 1 hour, and slowly heated to 80° C. to gradually precipitate a solid. Then, 2,4-dibenzoyloxypentane (0.006 mol) was added. The obtained mixture was kept for 1 hour, then filtered thermally, added with 150 ml, of methylbenzene, and washed twice to obtain a solid. The mixture was added with 100 mL of methylbenzene and 2,6-di(2,6-diisopropylphenylimino)ethylpyridine with said structure (0.006 mol), stirred for 30 minutes, added with 60 mL of hexane, and washed twice to obtain a solid (solid component) of 7.9 g, containing 3.8% Ti, 20.2% Mg, and 51.8% Cl.

(2) Polymerization of Propylene

Propylene polymerization was carried out in the same way as shown in step (2) of example 5B-1. See Table 5 for specific polymerization data.

Example 5B-8

Steps of the present example were the same as those of example 5B-1, except that the time of the polymerization reaction was extended to 2 hours. See Table 5 for results.

Example 5B-9

Steps of the present example were the same as those of example 5B-1, except that the time of the polymerization reaction was extended to 3 hours. See Table 5 for results.

Example 5B-10

Steps of the present example were the same as those of example 5B-5, except that the time of the polymerization reaction was extended to 2 hours. See Table 5 for results.

Example 5B-11

Steps of the present example were the same as those of example 5B-5, except that the time of the polymerization reaction was extended to 3 hours. See Table 5 for results.

Example 5B-12

Steps of the present example were the same as those of example 5B-2, except that the adding amount of hydrogen was changed to 7.2 NL. See Table 5 for results.

Comparative Example 5B'-1

(1) Preparation of a Solid Catalyst Component 4.8 g of magnesium chloride, 95 mL of methylbenzene, 4 mL of epoxy chloropropane, and 12.5 mL of tributyl phosphate (TBP) were placed one by one into a reactor fully replaced by high-purity nitrogen gas. The obtained mixture was stirred and heated to be kept at 50° C. for 2.5 hours. After a complete dissolution of the solid, 1.4 g of phthalic anhydride was added into the obtained solution. The solution was kept for 1 hour, cooled to a temperature below −25° C., added with TiCl$_4$ within 1 hour, and slowly heated to 80° C. to gradually precipitate a solid. Then, 2,4-dibenzoyloxypentane (0.003 mol) was added. The obtained mixture was kept for 1 hour, then filtered thermally, added with 150 mL of methylbenzene, and washed twice to obtain a solid. The mixture was added with 100 mL of methylbenzene, heated to 110° C., and washed for three times with each time lasting for 10 minutes. The mixture was added with 60 mL of hexane and stirred for 30 minutes. The mixture was again added with 60 mL of hexane, and washed for three times to obtain a solid (solid component) of 7.4 g, containing 2.4% Ti, 22% Mg, and 50.6% Cl.

(2) Polymerization of Propylene 2.5 ml, of AlEt$_3$, and 5 mL of cyclohexyl methyl dimethoxy silane (CHMMS) enabling Al/Si (mol)=25 were placed into a stainless reactor having a volume of 5 L and replaced fully by propylene gas, and was then added with 10 mg of the above prepared solid component, and 1.2 NL of hydrogen gas. 2.5 L of liquid propylene was introduced into the resulting mixture. The mixture was heated to 70° C. and maintained at 70° C. for 1 hour, followed by cooling, pressure releasing, and discharging, so that a PP resin could be obtained. See Table 5 for specific data.

Comparative Example 5B'-2

Steps of the present comparative example were the same as those of comparative example 5B'-1, except that the adding amount of hydrogen was changed to 7.2 NL. See Table 5 for results.

TABLE 5

| Examples | Catalyst activity (Kg polymer/g catalyst) | Polymer isotacticity (%) | Melt index (g/10 min) | Molecular weight distribution Mw/Mn |
|---|---|---|---|---|
| Example 5B-1 | 50.6 | 97.8 | 0.8 | 7.6 |
| Example 5B-2 | 37.7 | 97.7 | 0.9 | 7.8 |
| Example 5B-3 | 46.0 | 97.8 | 1.1 | 8.0 |
| Example 5B-4 | 45.6 | 97.8 | 0.8 | 7.7 |
| Example 5B-5 | 36.5 | 97.9 | 0.9 | 7.9 |
| Example 5B-6 | 44.7 | 96.8 | 1.2 | 8.2 |
| Example 5B-7 | 52.1 | 98.1 | 1.0 | 8.3 |
| Example 5B-8 | 65.9 | 97.7 | 1.2 | 8.1 |
| Example 5B-9 | 89.5 | 98.1 | 1.0 | 8.0 |
| Example 5B-10 | 60.8 | 97.8 | 1.2 | 8.1 |
| Example 5B-11 | 85.7 | 97.6 | 1.1 | 8.1 |
| Example 5B-12 | 62.0 | 95.2 | 33.8 | — |
| Comparative Example 5B'-1 | 44.3 | 97.9 | 2.4 | 6.9 |
| Comparative Example 5B'-2 | 45.7 | 97.8 | 20.4 | — |

In example 5B-1, compounds of both Formula II and Formula IV were used as composite internal electron donors, while in comparative example 5B'-1, only the compound of Formula IV was used as internal electron donor, other conditions being the same. As can be seen from Table 5, the catalysts obtained from the examples have a higher activity and better orientation ability, and the obtained polymers have a higher isotacticity and wider molecular weight distribution. Besides, compared with the catalysts in comparative examples, the catalysts provided by the present invention are slow in decay of activity, and have a better hydrogen response.

(6B) Solid Catalyst Component Containing Compounds as Shown in Formula II and Formula V Example 6B-1

(1) Preparation of a Solid Catalyst Component 4.8 g of magnesium chloride, 95 mL of methylbenzene. 4 mL of epoxy chloropropane, and 12.5 mL of tributyl phosphate (TBP) were placed one by one into a reactor fully replaced by high-purity nitrogen gas. The obtained mixture was stirred and heated to be kept at 50° C. for 2.5 hours. After a complete dissolution of the solid, 1.4 g of phthalic anhydride was added into the obtained solution. The solution was kept for 1 hour, cooled to a temperature below −25° C., added with TiCl$_4$ within 1 hour, and slowly heated to 80° C. to gradually precipitate a solid. Then, DNBP (di-n-butyl phthalate; 0.003 mol) and 2,6-di(2,6-diisopropylphenylimino)ethylpyridine with said structure (0.003 mol) were added. The obtained mixture was kept for 1 hour, then filtered thermally. The mixture was added with 150 mL of methylbenzene, and washed twice to obtain a solid. After that, the mixture was added with 100 mL of methylbenzene, stirred for 30 minutes, heated to 110° C., washed for three times with each time lasting for 10 minutes, again added with 60 mL of hexane, and washed twice to obtain a solid (solid component) of 7.9 g, containing 3.7% Ti, 22.8% Mg, and 50.8% Cl.

(2) Polymerization of Propylene 2.5 mL of AlEt$_3$, and 5 mL of cyclohexyl methyl dimethoxy silane (CHMMS) enabling Al/Si (mol)=25 were placed into a stainless reactor having a volume of 5 L and replaced fully by propylene gas, and was then added with 10 mg of the above prepared solid component, and 1.2 NL of hydrogen gas. 2.5 L of liquid propylene was introduced into the resulting mixture. The mixture was heated to 70° C. and maintained at 70° C. for 1 hour, followed by cooling, pressure releasing, and discharging, so that a PP resin could be obtained. The activity was 50600 g/g Cat, and the isotacticity of the obtained polymer was 97.8%. See Table 6 for specific data.

Example 6B-2

Steps of the present example were the same as those of example 6B-1, except that 2,6-di(2,6-diisopropylphenylimino)ethylpyridine was substituted with 2,6-di(2,6-dimethylphenylimino)ethylpyridine. See Table 6 for results.

Example 6B-3

Steps of the present example were the same as those of example 6B-1, except that 2,6-di(2,6-diisopropylphenylimino)ethylpyridine was substituted with 2,6-di(2,4,6-trimethylphenylimino)ethylpyridine. See Table 6 for results.

Example 6B-4

Steps of the present example were the same as those of example 6B-1, except that 2,6-di(2,6-diisopropylphenylimino)ethylpyridine was substituted with 2,6-di(8-quinolylimino)ethylpyridine. See Table 6 for results.

Example 6B-5

Steps of the present example were the same as those of example 6B-1, except that DNBP (di-n-butyl phthalate) was substituted with DIBP (diisobutyl phthalate). See Table 6 for results.

Example 6B-6

(1) Preparation of a Solid Catalyst Component 4.8 g of magnesium chloride, 95 mL of methylbenzene, 4 mL of epoxy chloropropane, and 12.5 mL of tributyl phosphate (TBP) were placed one by one into a reactor fully replaced by high-purity nitrogen gas. The obtained mixture was stirred and heated to be kept at 50° C. for 2.5 hours. After a complete dissolution of the solid, 1.4 g of phthalic anhydride was added into the obtained solution. The solution was kept for 1 hour, cooled to a temperature below −25° C., added with $TiCl_4$ within 1 hour, and slowly heated to 80° C. to gradually precipitate a solid. Then, DNBP (di-n-butyl phthalate; 0.006 mol) was added. The obtained mixture was kept for 1 hour, and then filtered thermally. The mixture was added with 150 mL of methylbenzene, and washed twice to obtain a solid. After that, the mixture was added with 100 mL of methylbenzene, stirred for 30 minutes, heated to 110° C., and washed for three times with each time lasting for 10 minutes. The mixture was again added with 60 mL of hexane and 2,6-di(2,6-diisopropylphenylimino)ethylpyridine with said structure (0.006 mol), stirred for 30 minutes, added with 60 mL of hexane, and washed twice to obtain a solid (solid component) of 7.9 g, containing 3.5% Ti, 24.2% Mg, and 50.6% Cl.

(2) Polymerization of Propylene

Propylene polymerization was carried out in the same way as shown in step (2) of example 6B-1. See Table 6 for specific polymerization data.

Example 6B-7

(1) Preparation of a Solid Catalyst Component 300 mL of $TiCl_4$ was placed into a reactor replaced by high-purity nitrogen, cooled to −20° C., and was added with 7 g of alcohol adduct of magnesium chloride (see patent CN1330086A). The resulting mixture was stirred and heated in stages. When the mixture was heated to 40° C., DNBP (di-n-butyl phthalate; 0.003 mol) and 2,6-di(2,6-diisopropylphenylimino)ethylpyridine (0.003 mol) were added. The resulting mixture was kept for 2 hours, filtered, added with 100 ml, of $TiCl_4$, heated to 110° C., and treated for three times. After that, the mixture was added with 60 mL of hexane, and washed for three times to obtain a solid (catalyst component) of 7.1 g, containing 3.5% Ti, 25.2% Mg, and 51.6% Cl.

(2) Polymerization of Propylene

Propylene polymerization was carried out in the same way as shown in step (2) of example 6B-1. See Table 6 for specific polymerization data.

Example 6B-8

(1) Preparation of a Solid Catalyst Component 300 mL of $TiCl_4$ was placed into a reactor replaced by high-purity nitrogen, cooled to <20° C., and was added with 7 g of magnesium ethylate. The resulting mixture was stirred and heated in stages. When the mixture was heated to 40° C., DNBP (di-n-butyl phthalate; 0.003 mol), and 2,6-di(2,6-dimethylphenylimino)ethylpyridine with said structure (0.003 mol) were added. The resulting mixture was kept for 3 hours, filtered, added with 100 mL of $TiCl_4$, heated to 130° C., and treated for three times. After that, the mixture was added with 60 mL of hexane, and washed for three times to obtain a solid (catalyst component) of 6.7 g, containing 3.2% Ti, 26.6% Mg, and 56.2% Cl.

(2) Polymerization of Propylene

Propylene polymerization was carried out in the same way as shown in step (2) of example 6B-1. See Table 6 for specific polymerization data.

Example 6B-9

(1) Preparation of a Solid Catalyst Component 300 mL of $Ti(OEt)_4$ was placed into a reactor replaced by high-purity nitrogen, cooled to −20° C., and was added with 7 g of alcohol adduct of magnesium chloride (see patent CN1330086A). The resulting mixture was stirred and heated in stages. When the mixture was heated to 40° C., DNBP (di-n-butyl phthalate; 0.006 mol). The resulting mixture was kept for 2 hours and filtered. Then, 100 mL of $TiCl_4$ and 2,6-di(2,6-diisopropylphenylimino)ethylpyridine with said structure (0.006 mol) were added. The resulting mixture was stirred for 1 hour, heated to 110° C., and treated for three times. After that, the mixture was added with 60 mL of hexane, and washed for three times to obtain a solid (catalyst component) of 6.3 g, containing 3.7% Ti, 23.8% Mg, and 48.6% Cl.

(2) Polymerization of Propylene

Propylene polymerization was carried out in the same way as shown in step (2) of example 6B-1. See Table 6 for specific polymerization data.

Example 6B-10

Steps of the present example were the same as those of example 6B-1, except that the time of the polymerization reaction was extended to 2 hours. See Table 6 for results.

Example 6B-11

Steps of the present example were the same as those of example 6B-1, except that the time of the polymerization reaction was extended to 3 hours. See Table 6 for results.

Example 6B-12

Steps of the present example were the same as those of example 6B-5, except that the time of the polymerization reaction was extended to 2 hours. See Table 6 for results.

Example 6B-13

Steps of the present example were the same as those of example 6B-5, except that the time of the polymerization reaction was extended to 3 hours. See Table 6 for results.

Example 6B-14

Steps of the present example were the same as those of example 6B-2, except that the adding amount of hydrogen was changed to 7.2 NL. See Table 6 for results.

Example 6B-15

Steps of the present example were the same as those of example 6B-1, except that DNBP (di-n-butyl phthalate) was substituted with 2,3-diisobutyl succinic acid diethyl ester. See Table 6 for results.

Example 6B-16

Steps of the present example were the same as those of example 6B-1, except that DNBP (di-n-butyl phthalate) was substituted with 2-isobutyl propandioic acid diethyl ester. See Table 6 for results.

Comparative Example 6B'-1

(1) Preparation of a Solid Catalyst Component 4.8 g of magnesium chloride, 95 mL of methylbenzene, 4 mL of epoxy chloropropane, and 12.5 mL of tributyl phosphate (TBP) were placed one by one into a reactor fully replaced by high-purity nitrogen gas. The obtained mixture was stirred and heated to be kept at 50° C. for 2.5 hours. After a complete dissolution of the solid, 1.4 g of phthalic anhydride was added into the obtained solution. The solution was kept for 1 hour, cooled to a temperature below −25° C., added with $TiCl_4$ within 1 hour, and slowly heated to 80° C. to gradually precipitate a solid. Then, DNBP (di-n-butyl phthalate; 0.006 mol) was added. The obtained mixture was kept for 1 hour, then filtered thermally, added with 150 mL of methylbenzene, and washed twice to obtain a solid. The mixture was added with 100 mL of methylbenzene, heated to 110° C., and washed for three times with each time lasting for 10 minutes. The mixture was added with 60 mL of hexane and stirred for 30 minutes. The mixture was again added with 60 mL of hexane, and washed for three times to obtain a solid (solid component) of 7.4 g, containing 2.3% Ti, 22.6% Mg, and 51.4% Cl.

(2) Polymerization of Propylene 2.5 mL of $AlEt_3$, and 5 mL of cyclohexyl methyl dimethoxy silane (CHMMS) enabling Al/Si (mol)=25 were placed into a stainless reactor having a volume of 5 L and replaced fully by propylene gas, and was then added with 10 mg of the above prepared solid component, and 1.2 NL of hydrogen gas. 2.5 L of liquid propylene was introduced into the resulting mixture. The mixture was heated to 70° C. and maintained at 70° C. for 1 hour, followed by cooling, pressure releasing, and discharging, so that a PP resin could be obtained. See Table 6 for specific data.

TABLE 6

| Examples | Catalyst activity (Kg polymer/g catalyst) | Polymer isotacticity (%) | Melt index (g/10 min) | Molecular weight distribution Mw/Mn |
|---|---|---|---|---|
| Example 6B-1 | 48.6 | 97.8 | 2.8 | 7.0 |
| Example 6B-2 | 36.7 | 97.8 | 1.9 | 6.1 |
| Example 6B-3 | 44.3 | 97.8 | 2.0 | 6.4 |
| Example 6B-4 | 46.5 | 97.9 | 1.8 | 7.0 |
| Example 6B-5 | 36.5 | 97.9 | 1.9 | 6.3 |
| Example 6B-6 | 44.2 | 96.8 | 2.2 | 6.9 |
| Example 6B-7 | 52.3 | 98.1 | 6.0 | 6.3 |
| Example 6B-8 | 48.0 | 98.2 | 5.9 | 7.3 |
| Example 6B-9 | 55.1 | 98.3 | 5.7 | 7.2 |
| Example 6B-10 | 67.1 | 97.9 | 2.4 | 6.7 |
| Example 6B-11 | 90.5 | 98.1 | 2.1 | 6.8 |
| Example 6B-12 | 62.8 | 97.9 | 2.3 | 7.2 |
| Example 6B-13 | 86.6 | 97.7 | 2.3 | 7.4 |
| Example 6B-14 | 62.6 | 95.2 | 33.4 | — |
| Example 6B-15 | 45.8 | 97.8 | 3.5 | 12.8 |
| Example 6B-16 | 39.7 | 97.6 | 3.7 | 13.5 |
| Comparative Example 6B'-1 | 32.5 | 98.0 | 2.2 | 3.8 |

In example 6B-1, compounds of both Formula II and Formula V were used as composite internal electron donors, white in comparative example 6B'-1, only the compound of Formula V was used as internal electron donor, other conditions being the same. As can be seen from Table 6, the catalysts obtained from the examples have a higher activity and better orientation ability, and the obtained polymers have a higher isotacticity and wider molecular weight distribution. Besides, compared with the catalyst in the comparative example, the catalyst provided by the present invention is slow in decay of activity, and has a better hydrogen response.

It should be noted that the examples above are provided only for illustrating the present invention, rather than restricting the present invention. Amendments can be made to the present invention based on the disclosure of the claims and within the scope and spirit of the present invention. While the above descriptions about the present invention involve particular methods, materials, and implementing examples, it does not means that the present invention is limited to the presently disclosed examples. On the contrary, the present invention can be extended to other methods and applications having same functions as those of the present invention.

The invention claimed is:

1. A catalyst component for olefin polymerization, comprising magnesium, titanium, halogen and an internal electron donor, said internal electron donor comprising an imine compound as shown in Formula Z,

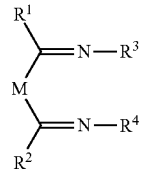

Formula Z wherein, $R^1$ and $R^2$ may be identical to or different from each other, each independently selected from hydrogen, halogen atoms, hydroxyl, alkoxy, halogen atom substituted or unsubstituted $C_1$-$C_{20}$ alkyl, $C_3$-$C_{20}$ cycloalkyl, $C_2$-$C_{20}$ alkenyl, $C_2$-$C_{20}$ ester group, $C_6$-$C_{20}$ aryl, or $C_{10}$-$C_{20}$ fused aryl;

$R^3$ and $R^4$ may be identical to or different from each other, each independently selected from hydroxyl, $C_1$-$C_{20}$ alkyl, $C_2$-$C_{20}$ alkenyl, or $C_6$-$C_{20}$ aryl with or without a heteroatom, and each of the $C_1$-$C_{20}$ alkyl, the $C_2$-$C_{20}$ alkenyl and the $C_6$-$C_{20}$ aryl contains or does not contain a substituent group;

M is selected from one or more substituted alkylene, wherein the alkylene is substituted by oxygen, sulfur, nitrogen, boron, silicon, phosphorus, or halogen atom, substituted or unsubstituted arylene, substituted or unsubstituted fused arylene, substituted or unsubstituted heteroarylene, substituted or unsubstituted alkarylene, or substituted or unsubstituted arylalkylene.

2. The catalyst component according to claim 1, wherein M is selected from one or more substituted or unsubstituted $C_6$-$C_{20}$ arylene, substituted or unsubstituted $C_{10}$-$C_{20}$ fused arylene, substituted or unsubstituted $C_5$-$C_{20}$ heteroarylene, substituted or unsubstituted $C_7$-$C_{20}$ alkarylene, or substituted or unsubstituted $C_7$-$C_{20}$ arylalkylene.

3. The catalyst component according to claim 2, wherein M is $C_5$-$C_{20}$ heteroarylene, in which the heteroatom is oxygen, sulfur, nitrogen, boron, silicon, phosphorus, or halogen atom.

4. The catalyst component according to claim 1, wherein the internal electron donor comprises a compound as shown in Formula II,

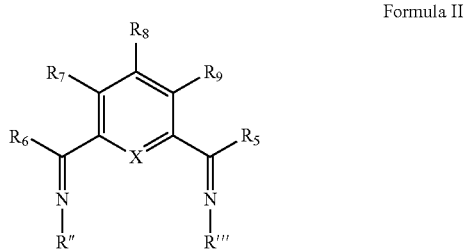

Formula II wherein, in Formula II, R" and R'" may be identical to or different from each other, and are selected from $C_1$-$C_{20}$ alkyl, $C_2$-$C_{20}$ alkenyl, or $C_6$-$C_{20}$ aryl with or without a heteroatom, each of which contains a substituent group or does not contain a substituent group which is selected from hydrocarbyl, hydroxyl, or halogen, the heteroatom being N;

$R_5$-$R_9$ may be identical to or different from each other, and are selected from hydrogen, halogen atoms, hydroxyl, alkoxy, $C_1$-$C_{12}$ alkyl, $C_2$-$C_{12}$ alkenyl, or $C_6$-$C_{20}$ aryl, wherein each of the $C_1$-$C_{12}$ alkyl, the $C_2$-$C_{12}$ alkenyl, and the $C_6$-$C_{20}$ aryl contains or does not contain a substituent group;

X is CH or N.

5. The catalyst component according to claim 4, wherein in the compound as shown in Formula II, in R" and R'", the $C_6$-$C_{20}$ aryl with a heteroatom is selected from pyridinyl, pyrrolyl, pyrimidyl, or quinolyl.

6. The catalyst component according to claim 4, wherein the compound as shown in Formula II is one or more selected from the group consisting of 2,6-di(2,6-dimethylphenylimino)ethylpyridine, 2,6-di(2,6-diisopropylphenylimino)ethylpyridine, 2,6-di(phenylimino)ethylpyridine, 2,6-di(2-naphthylimino)ethylpyridine, 2,6-di(1-naphthylimino)ethylpyridine, 2,6-di(butylimino)ethylpyridine, 2,6-di(hexylimino)ethylpyridine, 2,6-di(pentylimino)ethylpyridine, 2,6-di(octylimino)ethylpyridine, 2,6-di(benzylimino)ethylpyridine, 2,6-di(4-chlorophenylimino)ethylpyridine, 2,6-di(4-trifluoromethylphenylimino)ethylpyridine, 2,6-di(2-trifluoromethylphenylimino)ethylpyridine, 2,6-di(2-chloro-6-hydroxylphenylimino)ethylpyridine, 2,6-di(8-quinolylimino)ethylpyridine, 2,6-di(4-quinolylimino)ethylpyridine, 2,6-di(3-quinolylimino)ethylpyridine, 2,6-di(2,4,6-trimethylphenylimino)ethylpyridine, 2-(phenylimino)ethyl-6-(2,6-dimethylphenylimino)ethylpyridine, 2-(phenylimino)ethyl-6-(2,6-diisopropylphenylimino)ethylpyridine, 2-(phenylimino)ethyl-6-(p-chlorophenylimino)ethylpyridine, 2-(2,6-diisopropylphenylimino)ethyl-6-(2,6-dimethylphenylimino)ethylpyridine, 2-(p-chlorophenylimino)ethyl-6-(2,6-diisopropylphenylimino)ethylpyridine, 2-(2-hydroxyl-4-chlorophenylimino)ethyl-6-(p-chlorophenylimino)ethylpyridine, 2,6-di(2-hydroxylphenylimino)ethylpyridine, 2,6-di(2-ethylphenylimino)ethylpyridine, 2,6-di(4-ethylphenylimino)ethylpyridine, 2,6-di(2-propylphenylimino)ethylpyridine, 2,6-di(4-propylphenylimino)ethylpyridine, 2,6-di(2-butylphenylimino)ethylpyridine, 2,6-di(4-butylphenylimino)ethylpyridine, and 2,6-di(2,6-dimethylphenylimino)ethylbenzene, 2,6-di(2,6-diisopropylphenylimino)ethylbenzene.

7. The catalyst component according to claim 1, wherein the internal electron donor further comprises an additional compound, which is one or more selected from the group consisting of monobasic or polybasic esters, anhydrides, ketones, monoethers or polyethers, alcohols, amines, and diol ester compounds.

8. The catalyst component according to claim 7, wherein the additional compound is a diether compound as shown in Formula III,

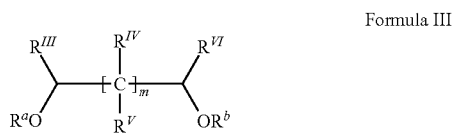

Formula III wherein, in Formula III, $R^{III}$-$R^{VI}$ may be identical to or different from each other, each of which is independently hydrogen, alkoxy, substituted amino, halogen atoms, $C_1$-$C_{20}$ hydrocarbyl, or $C_6$-$C_{20}$ aryl, and two or more of $R^{III}$-$R^{VI}$ may be bonded together to form a ring; $R^a$ and $R^b$ may be identical to or different from each other, and are $C_1$-$C_{20}$ hydrocarbyl; m is an integer ranging from 0 to 6.

9. The catalyst component according to claim 8, wherein in Formula III, $R^{IV}$ and $R^V$ are bonded together to form a ring, or $R^{III}$ and $R^{VI}$ are bonded together to form a ring.

10. The catalyst component according to claim 8, wherein the diether compound as shown in Formula III is one or more selected from the group consisting of 2-isopropyl-1,3-dimethoxypropane, 2-butyl-1,3-dimethoxypropane, 2-cyclohexyl-1,3-dimethoxypropane, 2-benzyl-1,3-dimethoxypropane, 2-phenyl-1,3-dimethoxypropane, 2-(1-naphthyl)-1,3-dimethoxypropane, 2-isopropyl-2-isopentyl-1,3-dimethoxypropane, 2-isopropyl-2-isobutyl-1,3-dimethoxypropane, 2-isopropyl-2-butyl-1,3-dimethoxypropane, 2,2-dicyclopentyl-1,3-dibenzoyloxypropane, 2,2-dicyclohexyl-1,3-dimethoxypropane, 2,2-dibutyl-1,3-dimethoxypropane, 2,2-diisobutyl-1,3-dimethoxypropane, 2,2-diisopropyl-1,3-dimethoxypropane, 2,2-diethyl-1,3-dimethoxypropane, 2-ethyl-2-butyl-1,3-dimethoxypropane, 2,4-dimethoxypentane, 3-ethyl-2,4-dimethoxypentane, 3-methyl-2,4-dimethoxypentane, 3-propyl-2,4-dimethoxypentane, 3-isopropyl-2,4-dimethoxypentane, 3,5-dimethoxyheptane, 4-ethyl-3,5-dimethoxyheptane, 4-propyl-3,5-dimethoxyheptane, 4-isopropyl-3,5-dimethoxyheptane, 9,9-dimethoxymethylfluorene, 9,9-dimethoxymethyl-4-tert-butylfluorene, 9,9-dimethoxymethyl-4-propylfluorene, 9,9-dimethoxymethyl-1,2,3,4-tetrahydrofluorene, 9,9-dimethoxymethyl-1,2,3,4,5,6,7,8-octahydrofluorene, 9,9-dimethoxymethyl-2,3,6,7-diphenylpropylindene, 9,9-dimethoxymethyl-1,8-dichlorofluorene, 7,7-dimethoxymethyl-2,5-dinorbornadiene, 1,4-dimethoxybutane, 2,3-diisopropyl-1,4-dimethoxybutane, 2,3-dibutyl-1,4-dimethoxybutane, 1,2-dimethoxybenzene, 3-ethyl-1,2-dimethoxybenzene, 4-butyl-1,2-dimethoxybenzene, 1,8-dimethoxynaphthalene, 2-ethyl-1,8-dimethoxynaphthalene, 2-propyl-1,8-dimethoxynaphthalene, 2-butyl-1,8-dimethoxynaphthalene, 4-butyl-1,8-dimethoxynaphthalene, 4-isobutyl-1,8-dimethoxynaphthalene, 4-isopropyl-1,8-dimethoxynaphthalene, and 4-propyl-1,8-dimethoxynaphthalene.

11. The catalyst component according to claim 7, wherein the additional compound is a diol ester compound as shown in Formula IV,

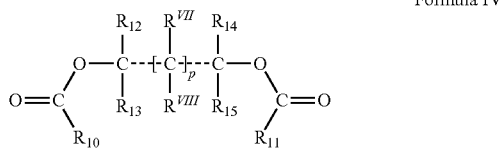

Formula IV wherein, in Formula IV, $R_{10}$ and $R_{11}$ may be identical to or different from each other, and are independently selected from halogen substituted or unsubstituted straight, branched, or cyclic $C_1$-$C_{20}$ hydrocarbyl; $R_{12}$-$R_{15}$ may be identical to or different from each other, and are independently selected from hydrogen, halogen atoms, hydroxyl, alkoxy, $C_1$-$C_{12}$ alkyl, $C_2$-$C_{12}$ alkenyl, or $C_6$-$C_{20}$ aryl, wherein each of the $C_1$-$C_{12}$ alkyl, the $C_2$-$C_{12}$ alkenyl, and the $C_6$-$C_{20}$ aryl contains or does not contain a substituent group, and two or more groups of $R_{12}$-$R_{15}$, $R^{VII}$ and $R^{VIII}$ may be bonded together to form an alicyclic ring or aromatic ring; $R^{VII}$ and $R^{VIII}$ may be identical to or different from each other, and are independently selected from hydrogen, or straight, branched or cyclic $C_1$-$C_{20}$ hydrocarbyl; p is an integer ranging from 0 to 100.

12. The catalyst component according to claim 11, wherein the diol ester compound is one or more selected from the group consisting of 2-isopropyl-1,3-dibenzoyloxypropane, 2-butyl-1,3-dibenzoyloxypropane, 2-cyclohexyl-1,3-dibenzoyloxypropane, 2-benzyl-1,3-dibenzoyloxypropane, 2-phenyl-1,3-dibenzoyloxypropane, 2-(1-naphthyl)-1,3-dibenzoyloxypropane, 2-isopropyl-1,3-diacetoxylpropane, 2-isopropyl-2-isopentyl-1,3-dibenzoyloxypropane, 2-isopropyl-2-isobutyl-1,3-dibenzoyloxypropane, 2-isopropyl-2-isopentyl-1,3-dipropionyloxypropane, 2-isopropyl-2-butyl-1,3-dibenzoyloxypropane, 2-isopropyl-2-isopentyl-1-benzoyloxy-3-butyryloxypropane, 2-isopropyl-2-isopentyl-1-benzoyloxy-3-cinnamoyloxylpropane, 2-isopropyl-2-isopentyl-1-benzoyloxy-3-acetoxylpropane, 2,2-dicyclopentyl-1,3-dibenzoyloxypropane, 2,2-dicyclohexyl-1,3-dibenzoyloxypropane, 2,2-dibutyl-1,3-dibenzoyloxypropane, 2,2-diisobutyl-1,3-dibenzoyloxypropane, 2,2-diisopropyl-1,3-dibenzoyloxypropane, 2,2-diethyl-1,3-dibenzoyloxypropane, 2-ethyl-2-butyl-1,3-dibenzoyloxypropane, 2,4-dibenzoyloxypentane, 3-ethyl-2,4-dibenzoyloxypentane, 3-methyl-2,4-dibenzoyloxypentane, 3-propyl-2,4-dibenzoyloxypentane, 3-isopropyl-2,4-dibenzoyloxypentane, 2,4-di(2-propylbenzoyloxy)pentane, 2,4-di(4-propylbenzoyloxy)pentane, 2,4-di(2,4-dimethylbenzoyloxy)pentane, 2,4-di(2,4-dichlorobenzoyloxy)pentane, 2,4-di(4-chlorobenzoyloxy)pentane, 2,4-di(4-isopropylbenzoyloxy)pentane, 2,4-di(4-butylbenzoyloxy)pentane, 2,4-di(4-isobutylbenzoyloxy)pentane, 3,5-dibenzoyloxyheptane, 4-ethyl-3,5-dibenzoyloxyheptane, 4-propyl-3,5-dibenzoyloxyheptane, 4-isopropyl-3,5-dibenzoyloxyheptane, 3,5-di(4-propylbenzoyloxy)heptane, 3,5-di(4-isopropylbenzoyloxy)heptane, 3,5-di(4-isobutylbenzoyloxy)heptane, 3,5-di(4-butylbenzoyloxy)heptane, 2-benzoyloxy-4-(4-isobutylbenzoyloxy)pentane, 2-benzoyloxy-4-(4-butylbenzoyloxy)pentane, 2-benzoyloxy-4-(4-propylbenzoyloxy)pentane, 3-benzoyloxy-5-(4-isobutylbenzoyloxy)heptane, 3-benzoyloxy-5-(4-butylbenzoyloxy)heptane, 3-benzoyloxy-5-(4-propylbenzoyloxy)heptane, 9,9-dibenzoyloxymethylfluorene, 9,9-dipropionyloxymethylfluorene, 9,9-diisobutyryloxymethylfluorene, 9,9-dibutyryloxymethylfluorene, 9,9-dibenzoyloxymethyl-4-tert-butylfluorene, 9,9-dibenzoyloxymethyl-4-propylfluorene, 9,9-dibenzoyloxymethyl-1,2,3,4-tetrahydrofluorene, 9,9-dibenzoyloxymethyl-1,2,3,4,5,6,7,8-octahydrofluorene, 9,9-dibenzoyloxymethyl-2,3,6,7-diphenylpropylindene, 9,9-dibenzoyloxymethyl-1,8-dichlorofluorene, 7,7-dibenzoyloxymethyl-2,5-norbornadiene, 1,4-dibenzoyloxybutane, 2,3-diisopropyl-1,4-dibenzoyloxybutane, 2,3-dibutyl-1,4-dibenzoyloxybutane, 1,2-dibenzoyloxybenzene, 1,2-di(n-butylbenzoyloxy)benzene, 1,2-di(isopropylbenzoyloxy)benzene, 3-n-propyl-1,2-dibenzoyloxybenzene, 3-isopropyl-1,2-dibenzoyloxybenzene, 3-isobutyl-1,2-dibenzoyloxybenzene, 3-n-propyl-1,2-di(n-propylbenzoyloxy)benzene, 3-propyl-1,2-di(n-butylbenzoyloxy)benzene, 3-isopropyl-1,2-di(n-propylbenzoyloxy)benzene, 3-isopropyl-1,2-di(n-butylbenzoyloxy)benzene, 3-isopropyl-1,2-di(isopropylbenzoyloxy)benzene, 3-isobutyl-1,2-di(n-propylbenzoyloxy)benzene, 3-isobutyl-1,2-di(n-butylbenzoyloxy)benzene, 3-isobutyl-1,2-di(isopropylbenzoyloxy)benzene, 3-propyl-1,2-di(n-propylbenzoyloxy)benzene, 3-ethyl-1,2-dibenzoyloxybenzene, 4-butyl-1,2-dibenzoyloxybenzene, 1,8-dibenzoyloxynaphthalene2-ethyl-1,8-dibenzoyloxynaphthalene, 2-propyl-1,8-dibenzoyloxynaphthalene, 2-butyl-1,8-dibenzoyloxynaphthalene, 4-butyl-1,8-dibenzoyloxynaphthalene, 4-isobutyl-1,8-dibenzoyloxynaphthalene, 4-isopropyl-1,8-dibenzoyloxynaphthalene, and 4-propyl-1,8-dibenzoyloxynaphthalene.

13. The catalyst component according to claim 7, wherein the additional compound is a diester compound as shown in Formula V,

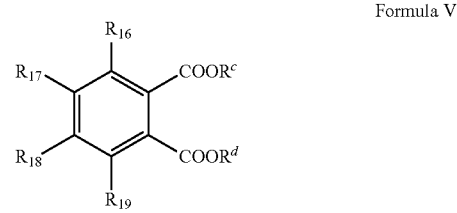

Formula V wherein, $R^c$ and $R^d$ may be identical to or different from each other, and are independently selected from straight, branched, or cyclic $C_1$-$C_{20}$ hydrocarbyl, which contains or does not contain a substituent group being selected from hydroxyl or halogen; $R_{16}$-$R_{19}$ may be identical to or different from each other, and are independently selected from hydrogen, halogen atoms, hydroxyl, alkoxy, $C_1$-$C_{12}$ alkyl, $C_2$-$C_{12}$ alkenyl, or $C_6$-$C_{20}$ aryl, wherein each of the $C_1$-$C_{12}$ alkyl, the $C_2$-$C_{12}$ alkenyl, and the $C_6$-$C_{20}$ aryl contains or does not contain a substituent group.

14. The catalyst component according to claim 13, wherein the diester compound is one or more selected from the group consisting of diethyl phthalate, dipropyl phthalate, diisobutyl phthalate, di-n-butyl phthalate, di-n-pentyl phthalate, diisopentyl phthalate, dineopentyl phthalate, dihexyl phthalate, diheptyl phthalate, dioctyl phthalate, dinonyl phthalate, diisobutyl 2-methylphthalate, di-n-butyl 2-methylphthalate, diisobutyl 2-propylphthalate, di-n-butyl 2-propylphthalate, diisobutyl 2-butylphthalate, di-n-butyl 2-butylphthalate, diisobutyl 2-propylphthalate, di-n-butyl 2-propylphthalate, di-isobutyl 4-propylphthalate, di-n-butyl 4-butylphthalate, di-n-butyl 2-chlorophthalate, di-n-butyl 2-chlorophthalate, di-isobutyl 4-chlorophthalate, di-n-butyl 4-chlorophthalate, and di-n-butyl 4-methoxyphthalate.

15. The catalyst component according to claim 7, wherein the internal electron donor comprises a compound as shown in Formula II and the additional compound,

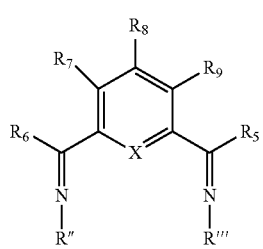

Formula II wherein, in Formula II, R″ and R‴ may be identical to or different from each other, and are selected from $C_1$-$C_2$ alkyl, $C_2$-$C_{20}$ alkenyl, or $C_6$-$C_{20}$ aryl with or without a heteroatom, each of which contains a substituent group or does not contain a substituent group which is selected from hydrocarbyl, hydroxyl, or halogen, the heteroatom being N;

$R_5$-$R_9$ may be identical to or different from each other, and are selected from hydrogen, halogen atoms, hydroxyl, alkoxy, $C_1$-$C_{12}$ alkyl, $C_2$-$C_{12}$ alkenyl, or $C_6$-$C_{20}$ aryl, wherein each of the $C_1$-$C_{12}$ alkyl, the $C_2$-$C_{12}$ alkenyl, and the $C_6$-$C_{20}$ aryl contains or does not contain a substituent group;

X is CH or N, the weight content of the compound as shown in Formula II in the catalyst component is in a range from 0.01% to 20%; the weight content of the additional compound in the catalyst component is in a range from 0.01% to 20%.

16. The catalyst component according to claim 15, wherein the weight content of the compound as shown in Formula II in the catalyst component is in a range from 1% to 15%; the weight content of the additional compound in the catalyst component is in a range from 1% to 15%.

17. The catalyst component according to claim 15, wherein the weight content of the compound as shown in Formula II in the catalyst component is in a range from 2% to 10%; the weight content of the additional compound in the catalyst component is in a range from 1% to 15%.

18. A preparation method of the catalyst component according to claim 1, comprising steps of:
1) reacting a magnesium compound with an alcohol compound to form an alcohol adduct;
2) treating the alcohol adduct with a titanium compound, to obtain the catalyst component;
wherein an internal electron donor is added in step 1) or 2).

19. The method according to claim 18, wherein the alcohol compound is selected from $C_2$-$C_8$ monohydric alcohols.

20. A preparation method of catalyst component according to claim 1, comprising steps of:
1) dissolving a magnesium compound into a solvent consisting of an organic compound and an organic phosphorus compound, wherein the organic compound is selected from the group consisting of epoxide compounds and inner ethers, and optionally adding an inert solvent, to form a mixture; and
2) adding a titanium compound to treat the mixture obtained in step 1), to obtain the catalyst component;
wherein, an internal electron donor is added in step 1) or 2).

21. The method according to claim 20, wherein the organic compound is at least one selected from oxides of $C_2$-$C_8$ aliphatic olefins or dialkenes, oxides of halogenated aliphatic olefins or dialkenes, glycidyl ethers, or inner ethers;

the organic phosphorus compound is at least one selected from the group consisting of trimethyl orthophosphate, triethyl orthophosphate, tributyl orthophosphate, triphenyl orthophosphate, trimethyl phosphite, triethyl phosphite, tributyl phosphite, and triphenylmethyl phosphate.

22. The method according to claim 21, wherein, the organic compound is at least one selected from ethylene oxide, propylene oxide, butylenes oxide, butadiene oxide, butadiene dioxide, epoxy chloropropane, methyl glycidyl ether, diglycidyl ether, and tetrahydrofuran.

23. The method according to claim 18 or 20, wherein the magnesium compound is at least one selected from the group consisting of magnesium dihalide, alkoxy magnesium, alkyl magnesium, hydrate or alcohol adduct of magnesium dihalide, or a derivative formed by replacing a halogen atom of a magnesium dihalide with an alkoxy or haloalkoxy group, or a mixture thereof;

the titanium compound is represented by the formula $TiB_q(OR_{20})_{4-q}$, wherein $R_{20}$ is $C_1$-$C_{20}$ hydrocarbyl group, B is halogen, and q=0-4.

24. The method according to claim 23, wherein the titanium compound is at least one selected from the group consisting of titanium tetrachloride, titanium tetrabromide, titanium tetraiodide, tetrabutoxy titanium, tetraethoxy titanium, triethoxy titanium chloride, diethoxy titanium dichloride and ethoxy titanium trichloride.

25. A catalyst used for olefin polymerization, comprising a reactant of the following components:
a). the catalyst component according to claim 1;
b). a cocatalyst organoaluminium compound; and
c). optionally, an external electron donor.

26. A method of olefin polymerization, comprising contacting an olefin with the catalyst according to claim 25 under olefin polymerization conditions.

27. The catalyst according to claim 25, wherein the external electron donor is an organosilicon compound.

28. A catalyst component for olefin polymerization, comprising magnesium, titanium, halogen and an internal electron donor, wherein said internal electron donor comprises an imine compound as shown in Formula I,

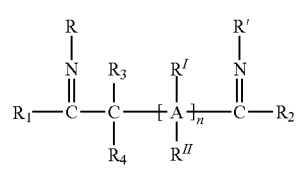

Formula I wherein n is an integer ranging from 0 to 10;
A is carbon or a heteroatom selected from the group consisting of oxygen, sulfur, nitrogen, boron, and silicon;

R and R' may be identical to or different from each other, each independently selected from hydroxyl, halogen atom substituted or unsubstituted $C_1$-$C_{20}$ alkyl, $C_2$-$C_{20}$ alkenyl, $C_6$-$C_{20}$ alkaryl, $C_{10}$-$C_{20}$ fused aryl, phenyl, halogenated phenyl, alkyl phenyl, or terphenyl;

$R_1$ and $R_2$ may be identical to or different from each other, each independently selected from halogen atom substituted or unsubstituted $C_1$-$C_{20}$ alkyl, $C_3$-$C_{20}$ cycloalkyl, $C_2$-$C_{20}$ alkenyl, $C_2$-$C_{20}$ ester group, $C_6$-$C_{20}$ aryl, or $C_{10}$-$C_{20}$ fused aryl; each of $R^I$, $R^{II}$, $R_3$ and $R_4$ may be independently selected from hydrogen, halogen atom substituted or unsubstituted $C_1$-$C_{20}$ alkyl, $C_3$-$C_{20}$ cycloalkyl, $C_2$-$C_{20}$ alkenyl, $C_2$-$C_{20}$ ester group, $C_6$-$C_{20}$ aryl, or $C_{10}$-$C_{20}$ fused aryl, and one or more of $R_1$-$R_4$, and $R^I$ and $R^{II}$ may be bonded together to form a ring; $R_3$-$R_4$, and $R^I$ and $R^{II}$ may optionally contain one or more heteroatoms as a substitute of a carbon or hydrogen atom or both, the heteroatom being oxygen, sulfur, nitrogen, boron, silicon, phosphorus, or halogen atom, with the provisos that when A is oxygen, or sulfur, $R^I$ and $R^{II}$ are absent; when A is nitrogen or boron, one of $R^I$ and $R^{II}$ is absent; and when n is zero, $R_3$ and $R_4$ are independently selected from halogen atom substituted $C_1$-$C_{20}$ alkyl, halogen atom substituted $C_3$-$C_{20}$ cycloalkyl, halogen atom substituted $C_2$-$C_{20}$ alkenyl, halogen atom substituted or unsubstituted $C_2$-$C_{20}$ ester group, halogen atom substituted $C_6$-$C_{20}$ aryl, or halogen atom substituted $C_{10}$-$C_{20}$ fused aryl.

29. The catalyst component according to claim 28, wherein in the imine compound as shown in Formula I, each of R and R' is independently selected from halogen atom substituted or unsubstituted $C_1$-$C_8$ alkyl, halogen atom substituted or unsubstituted $C_6$-$C_{20}$ alkaryl, or halogen atom substituted or unsubstituted $C_{10}$-$C_{20}$ fused aryl.

30. The catalyst component according to claim 29, wherein in the imine compound as shown in Formula I, each of R and R' is independently selected from methyl, ethyl, n-propyl, isopropyl, n-butyl, isobutyl, sec-butyl, tert-butyl, pentyl, hexyl, or naphthyl.

31. The catalyst component according to claim 28, wherein in the imine compound as shown in Formula I, each of $R_1$ and $R_2$ is independently selected from halogen atom substituted or unsubstituted $C_1$-$C_8$ alkyl, $C_6$-$C_{20}$ aryl, or $C_{10}$-$C_{20}$ fused aryl; each of $R^I$, $R^{II}$, $R_3$, and $R_4$ is independently selected from hydrogen, halogen atom substituted or unsubstituted $C_1$-$C_8$ alkyl, halogen atom substituted or unsubstituted $C_6$-$C_{20}$ aryl, or halogen atom substituted or unsubstituted $C_{10}$-$C_{20}$ fused aryl.

32. The catalyst component according to claim 28, wherein the internal electron donor further comprises an additional compound, which is one or more selected from the group consisting of monobasic or polybasic esters, anhydrides, ketones, monoethers or polyethers, alcohols, amines, and diol ester compounds.

33. The catalyst component according to claim 32, wherein the additional compound is a diether compound as shown in Formula III,

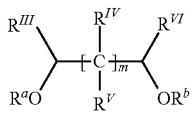

Formula III wherein, in Formula III, $R^{III}$-$R^{VI}$ may be identical to or different from each other, each of which is independently hydrogen, alkoxy, substituted amino, halogen atoms, $C_1$-$C_{20}$ hydrocarbyl, or $C_6$-$C_{20}$ aryl, and two or more of $R^{III}$-$R^{VI}$ may be bonded together to form a ring; $R^a$ and $R^b$ may be identical to or different from each other, and are $C_1$-$C_{20}$ hydrocarbyl; m is an integer ranging from 0 to 6.

34. The catalyst component according to claim 33, wherein in Formula III, $R^{IV}$ and $R^V$ are bonded together to form a ring, or $R^{III}$ and $R^{VI}$ are bonded together to form a ring.

35. The catalyst component according to claim 33, wherein the diether compound as shown in Formula III is one or more selected from the group consisting of 2-isopropyl-1,3-dimethoxypropane, 2-butyl-1,3-dimethoxypropane, 2-cyclohexyl-1,3-dimethoxypropane, 2-benzyl-1,3-dimethoxypropane, 2-phenyl-1,3-dimethoxypropane, 2-(1-naphthyl)-1,3-dimethoxypropane, 2-isopropyl-2-isopentyl-1,3-dimethoxypropane, 2-isopropyl-2-isobutyl-1,3-dimethoxypropane, 2-isopropyl-2-butyl-1,3-dimethoxypropane, 2,2-dicyclopentyl-1,3-dibenzoyloxypropane, 2,2-dicyclohexyl-1,3-dimethoxypropane, 2,2-dibutyl-1,3-dimethoxypropane, 2,2-diisobutyl-1,3-dimethoxypropane, 2,2-diisopropyl-1,3-dimethoxypropane, 2,2-diethyl-1,3-dimethoxypropane, 2-ethyl-2-butyl-1,3-dimethoxypropane, 2,4-dimethoxypentane, 3-ethyl-2,4-dimethoxypentane, 3-methyl-2,4-dimethoxypentane, 3-propyl-2,4-dimethoxypentane, 3-isopropyl-2,4-dimethoxypentane, 3,5-dimethoxyheptane, 4-ethyl-3,5-dimethoxyheptane, 4-propyl-3,5-dimethoxyheptane, 4-isopropyl-3,5-dimethoxyheptane, 9,9-dimethoxymethylfluorene, 9,9-dimethoxymethyl-4-tert-butylfluorene, 9,9-dimethoxymethyl-4-propylfluorene, 9,9-dimethoxymethyl-1,2,3,4-tetrahydrofluorene, 9,9-dimethoxymethyl-1,2,3,4,5,6,7,8-octahydrofluorene, 9,9-dimethoxymethyl-2,3,6,7-diphenylpropylindene, 9,9-dimethoxymethyl-1,8-dichlorofluorene, 7,7-dimethoxymethyl-2,5-dinorbornadiene, 1,4-dimethoxybutane, 2,3-diisopropyl-1,4-dimethoxybutane, 2,3-dibutyl-1,4-dimethoxybutane, 1,2-dimethoxybenzene, 3-ethyl-1,2-dimethoxybenzene, 4-butyl-1,2-dimethoxybenzene, 1,8-dimethoxynaphthalene, 2-ethyl-1,8-dimethoxynaphthalene, 2-propyl-1,8-dimethoxynaphthalene, 2-butyl-1,8-dimethoxynaphthalene, 4-butyl-1,8-dimethoxynaphthalene, 4-isobutyl-1,8-dimethoxynaphthalene, 4-isopropyl-1,8-dimethoxynaphthalene, and 4-propyl-1,8-dimethoxynaphthalene.

36. The catalyst component according to claim 32, wherein the additional compound is a diol ester compound as shown in Formula IV,

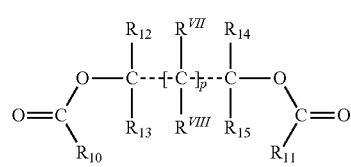

Formula IV wherein, in Formula IV, $R_{10}$ and $R_{11}$ may be identical to or different from each other, and are independently selected from halogen substituted or unsubstituted straight, branched, or cyclic $C_1$-$C_{20}$ hydrocarbyl; $R_{12}$-$R_{15}$ may be identical to or different from each other, and are independently selected from hydrogen, halogen atoms, hydroxyl, alkoxy, $C_1$-$C_{12}$ alkyl, $C_2$-$C_{12}$ alkenyl, or $C_6$-$C_{20}$ aryl, wherein each of the $C_1$-$C_{12}$ alkyl, the $C_2$-$C_{12}$ alkenyl, and the $C_6$-$C_{20}$ aryl contains or does not contain a substituent group, and two or more groups of $R_{12}$-$R_{15}$, $R^{VII}$ and $R^{VIII}$ may be bonded together to form an alicyclic ring or aromatic ring; $R^{VII}$ and $R^{VIII}$ may be identical to or different from each other, and are independently selected from hydrogen, or straight, branched or cyclic $C_1$-$C_{20}$ hydrocarbyl; p is an integer ranging from 0 to 100.

37. The catalyst component according to claim 36, wherein the diol ester compound is one or more selected from the group consisting of 2-isopropyl-1,3-dibenzoyloxypropane, 2-butyl-1,3-dibenzoyloxypropane, 2-cyclohexyl-1,3-dibenzoyloxypropane, 2-benzyl-1,3-dibenzoyloxypropane, 2-phenyl-1,3-dibenzoyloxypropane, 2-(1-naphthyl)-1,3-dibenzoyloxypropane, 2-isopropyl-1,3-diacetoxylpropane, 2-isopropyl-2-isopentyl-1,3-dibenzoyloxypropane, 2-isopropyl-2-isobutyl-1,3-dibenzoyloxypropane, 2-isopropyl-2-isopentyl-1,3-dipropionyloxypropane, 2-isopropyl-2-butyl-1,3-dibenzoyloxypropane, 2-isopropyl-2-isopentyl-1-benzoyloxy-3-butyryloxypropane, 2-isopropyl-2-isopentyl-1-benzoyloxy-3-cinnamoyloxylpropane, 2-isopropyl-2-isopentyl-1-benzoyloxy-3-acetoxylpropane, 2,2-dicyclopentyl-1,3-dibenzoyloxypropane, 2,2-dicyclohexyl-1,3-dibenzoyloxypropane, 2,2-dibutyl-1,3-dibenzoyloxypropane, 2,2-diisobutyl-1,3-dibenzoyloxypropane, 2,2-diisopropyl-1,3-dibenzoyloxypropane, 2,2-diethyl-1,3-dibenzoyloxypropane, 2-ethyl-2-butyl-1,3-dibenzoyloxypropane, 2,4-dibenzoyloxypentane, 3-ethyl-2,4-dibenzoyloxypentane, 3-methyl-2,4-dibenzoyloxypentane, 3-propyl-2,4-dibenzoyloxypentane, 3-isopropyl-2,4-dibenzoyloxypentane, 2,4-di(2-propylbenzoyloxy)pentane, 2,4-di(4-propylbenzoyloxy)pentane, 2,4-di(2,4-dimethylbenzoyloxy)pentane, 2,4-di(2,4-dichlorobenzoyloxy)pentane, 2,4-di(4-chlorobenzoyloxy)pentane, 2,4-di(4-isopropylbenzoyloxy)pentane, 2,4-di(4-butylbenzoyloxy)pentane, 2,4-di(4-isobutylbenzoyloxy)pentane, 3,5-dibenzoyloxyheptane, 4-ethyl-3,5-dibenzoyloxyheptane, 4-propyl-3,5-dibenzoyloxyheptane, 4-isopropyl-3,5-dibenzoyloxyheptane, 3,5-di(4-propylbenzoyloxy)heptane, 3,5-di(4-isopropylbenzoyloxy)heptane, 3,5-di(4-isobutylbenzoyloxy)heptane, 3,5-di(4-butylbenzoyloxy)heptane, 2-benzoyloxy-4-(4-isobutylbenzoyloxy)pentane, 2-benzoyloxy-4-(4-butylbenzoyloxy)pentane, 2-benzoyloxy-4-(4-propylbenzoyloxy)pentane, 3-benzoyloxy-5-(4-isobutylbenzoyloxy)heptane, 3-benzoyloxy-5-(4-butylbenzoyloxy)heptane, 3-benzoyloxy-5-(4-propylbenzoyloxy)heptane, 9,9-dibenzoyloxymethylfluorene, 9,9-dipropionyloxymethylfluorene, 9,9-diisobutyryloxymethylfluorene, 9,9-dibutyryloxymethylfluorene, 9,9-dibenzoyloxymethyl-4-tert-butylfluorene, 9,9-dibenzoyloxymethyl-4-propylfluorene, 9,9-dibenzoyloxymethyl-1,2,3,4-tetrahydrofluorene, 9,9-dibenzoyloxymethyl-1,2,3,4,5,6,7,8-octahydrofluorene, 9,9-dibenzoyloxymethyl-2,3,6,7-diphenylpropylindene, 9,9-dibenzoyloxymethyl-1,8-dichlorofluorene, 7,7-dibenzoyloxymethyl-2,5-norbornadiene, 1,4-dibenzoyloxybutane, 2,3-diisopropyl-1,4-dibenzoyloxybutane, 2,3-dibutyl-1,4-dibenzoyloxybutane, 1,2-dibenzoyloxybenzene, 1,2-di(n-butylbenzoyloxy)benzene, 1,2-di(isopropylbenzoyloxy)benzene, 3-n-propyl-1,2-dibenzoyloxybenzene, 3-isopropyl-1,2-dibenzoyloxybenzene, 3-isobutyl-1,2-dibenzoyloxybenzene, 3-n-propyl-1,2-di(n-propylbenzoyloxy)benzene, 3-propyl-1,2-di(n-butylbenzoyloxy)benzene, 3-isopropyl-1,2-di(n-propylbenzoyloxy)benzene, 3-isopropyl-1,2-di(n-butylbenzoyloxy)benzene, 3-isopropyl-1,2-di(isopropylbenzoyloxy)benzene, 3-isobutyl-1,2-di(n-propylbenzoyloxy)benzene, 3-isobutyl-1,2-di(n-butylbenzoyloxy)benzene, 3-isobutyl-1,2-di(isopropylbenzoyloxy)benzene, 3-propyl-1,2-di(n-propylbenzoyloxy)benzene, 3-ethyl-1,2-dibenzoyloxybenzene, 4-butyl-1,2-dibenzoyloxybenzene, 1,8-dibenzoyloxynaphthalene2-ethyl-1,8-dibenzoyloxynaphthalene, 2-propyl-1,8-dibenzoyloxynaphthalene, 2-butyl-1,8-dibenzoyloxynaphthalene, 4-butyl-1,8-dibenzoyloxynaphthalene, 4-isobutyl-1,8-dibenzoyloxynaphthalene, 4-isopropyl-1,8-dibenzoyloxynaphthalene, and 4-propyl-1,8-dibenzoyloxynaphthalene.

38. The catalyst component according to claim 32, wherein the additional compound is a diester compound as shown in Formula V,

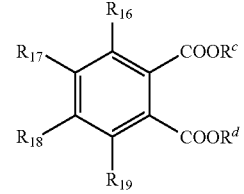

Formula V wherein, in Formula V, $R^c$ and $R^d$ may be identical to or different from each other, and are independently selected from straight, branched, or cyclic $C_1$-$C_{20}$ hydrocarbyl, which contains or does not contain a substituent group being selected from hydroxyl or halogen; $R_{16}$-$R_{19}$ may be identical to or different from each other, and are independently selected from hydrogen, halogen atoms, hydroxyl, alkoxy, $C_1$-$C_{12}$ alkyl, $C_2$-$C_{12}$ alkenyl, or $C_6$-$C_{20}$ aryl, wherein each of the $C_1$-$C_{12}$ alkyl, the $C_2$-$C_{12}$ alkenyl, and the $C_6$-$C_{20}$ aryl contains or does not contain a substituent group.

39. The catalyst component according to claim 38, wherein the diester compound is one or more selected from the group consisting of diethyl phthalate, dipropyl phthalate, diisobutyl phthalate, di-n-butyl phthalate, di-n-pentyl phthalate, diisopentyl phthalate, dineopentyl phthalate, dihexyl phthalate, diheptyl phthalate, dioctyl phthalate, dinonyl phthalate, diisobutyl 2-methylphthalate, di-n-butyl 2-methylphthalate, diisobutyl 2-propylphthalate, di-n-butyl 2-propylphthalate, diisobutyl 2-butylphthalate, di-n-butyl 2-butylphthalate, diisobutyl 2-propylphthalate, di-n-butyl 2-propylphthalate, di-isobutyl 4-propylphthalate, di-n-butyl 4-butylphthalate, di-n-butyl 2-chlorophthalate, di-n-butyl 2-chlorophthalate, di-isobutyl 4-chlorophthalate, di-n-butyl 4-chlorophthalate, and di-n-butyl 4-methoxyphthalate.

40. The catalyst component according to claim 32, wherein the internal electron donor comprises a compound as shown in Formula II and the additional compound,

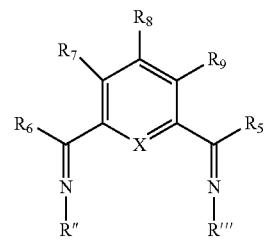

Formula II wherein, in Formula II, R″ and R‴ may be identical to or different from each other, and are selected from $C_1$-$C_{20}$ alkyl, $C_2$-$C_{20}$ alkenyl, or $C_6$-$C_{20}$ aryl with or without a heteroatom, each of which contains a substituent group or does not contain a substituent group which is selected from hydrocarbyl, hydroxyl, or halogen, the heteroatom being N;

$R_5$-$R_9$ may be identical to or different from each other, and are selected from hydrogen, halogen atoms, hydroxyl, alkoxy, $C_1$-$C_{12}$ alkyl, $C_2$-$C_{12}$ alkenyl, or $C_6$-$C_{20}$ aryl, wherein each of the $C_1$-$C_{12}$ alkyl, the $C_2$-$C_{12}$ alkenyl, and the $C_6$-$C_{20}$ aryl contains or does not contain a substituent group;

X is CH or N, the weight content of the compound as shown in Formula II in the catalyst component is in a range from 0.01% to 20%; the weight content of the additional compound in the catalyst component is in a range from 0.01% to 20%.

41. The catalyst component according to claim 40, wherein the weight content of the compound as shown in Formula II in the catalyst component is in a range from 1% to 15%; the weight content of the additional compound in the catalyst component is in a range from 1% to 15%.

42. The catalyst component according to claim 40, wherein the weight content of the compound as shown in Formula II in the catalyst component is in a range from 2% to 10%; the weight content of the additional compound in the catalyst component is in a range from 1% to 15%.

43. A preparation method of the catalyst component according to claim 28, comprising steps of:
    1) reacting a magnesium compound with an alcohol compound to form an alcohol adduct;
    2) treating the alcohol adduct with a titanium compound, to obtain the catalyst component;
    wherein an internal electron donor is added in step 1) or 2).

44. The method according to claim 43, wherein the alcohol compound is selected from $C_2$-$C_8$ monohydric alcohols.

45. A preparation method of catalyst component according to claim 28,
    comprising steps of:
    1) dissolving a magnesium compound into a solvent consisting of an organic compound and an organic phosphorus compound, wherein the organic compound is selected from a group consisting of epoxide compounds and inner ethers, and optionally adding an inert solvent, to form a mixture; and
    2) adding a titanium compound to treat the mixture obtained in step 1), to obtain the catalyst component;
    wherein an internal electron donor is added in step 1) or 2).

46. The method according to claim 45, wherein the organic compound is at least one selected from oxides of $C_2$-$C_8$ aliphatic olefin or dialkenes, oxides of halogenated aliphatic olefin or dialkenes, glycidyl ethers, or inner ethers;
    the organic phosphorus compound is at least one selected from the group consisting of trimethyl orthophosphate, triethyl orthophosphate, tributyl orthophosphate, triphenyl orthophosphate, trimethyl phosphite, triethyl phosphite, tributyl phosphite, and triphenylmethyl phosphate.

47. The method according to claim 43 or 45, wherein the magnesium compound is at least one selected from the group consisting of magnesium dihalide, alkoxy magnesium, alkyl magnesium, hydrate or alcohol adduct of magnesium dihalide, or a derivative formed by replacing a halogen atom of a magnesium dihalide with an alkoxy or haloalkoxy group, or a mixture thereof;
    the titanium compound is represented by the formula $TiB_q(OR_{20})_{4-q}$, in which $R_{20}$ is $C_1$-$C_{20}$ hydrocarbyl group, B is halogen, and q=0-4.

48. A catalyst used for olefin polymerization, comprising a reaction product of the following components:
    a). the catalyst component according to claim 28;
    b). a cocatalyst organoaluminium compound; and
    c). optionally, an external electron donor.

49. A method of olefin polymerization, comprising contacting an olefin with the catalyst according to claim 48 under olefin polymerization conditions.

50. A catalyst component for olefin polymerization, comprising magnesium, titanium, halogen and an internal electron donor, wherein the internal electron donor comprises one or more imine compounds selected from the group consisting of 2-[1-(2,6-diisopropylphenylimino)ethyl]-1-(2, 6-diisopropylphenylimino)cyclohexane, 2-[1-(2,6-dimethylphenylimino)ethyl]-1-(2,6-dimethylphenylimino)cyclohexane, 2-[1-(2,6-dichlorophenylimino)ethyl]-1-(2,6-diisopropylphenylimino)cyclohexane, 2-[1-(2,6-dimethylphenylimino)ethyl]-1-(2,6-diisopropylphenylimino)cyclohexane, 2-[1-(phenylimino)ethyl]-1-(2,6-diisopropylphenylimino)cyclohexane, 2-[1-(phenylimino)ethyl]-1-(2,6-dimethylphenylimino)cyclohexane, 2,4-diphenyliminopentane, 2,4-di(2,6-diisopropylphenylimino)pentane, 2,4-dinaphthyliminopentane, 2,4-di(2,6-dimethylphenylimino)pentane, 2,4-dibutyliminopentane, 2,4-di(2,4-dichlorophenylimino)pentane, 2,4-di(4-trifluoromethylphenylimino)pentane, 3,5-diphenyliminoheptane, 3,5-di(2,6-diisopropylphenylimino)heptane, 3,5-di(2,6-dimethylphenylimino)heptane, 3,5-dibutyliminoheptane, 2,4-di(8-quinolylimino)pentane, 2,4-di(4-quinolylimino)pentane, 2,4-di(3-quinolylimino)pentane, 2,4-di(2-chloro-6-hydroxylphenylimino)pentane, 2,4-di(2,4, 6-trimethylphenylimino)pentane, 1,1,1-trifluoro-2,4-di(2,6-diisopropylphenylimino)pentane, 1,1,1-trifluoro-2,4-di(2,6-dimethylphenylimino)pentane, 1,3-diphenyl-1,3-di(2,6-diisopropylphenylimino)propane, 1,3-diphenyl-1,3-di(2,6-dimethylphenylimino)propane, 1-phenyl-1,3-di(2,6-diisopropylphenylimino)butane, 1-phenyl-1,3-di(2,6-dimethylphenylimino)butane, 3-methyl-2,4-di(2,6-dimethylphenylimino)pentane, 3-ethyl-2,4-di(2,6-dimethylphenylimino)pentane, 3,5-diphenylimino-4-ethylheptane, 3,5-di(2,6-diisopropylphenylimino)-4-methylheptane, 3-ethyl-3,5-di(2,6-diisopropylphenylimino)heptane, 3-methyl-3,5-di(2,6-dimethylphenylimino)heptane, 3-ethyl-3,5-di(2,6-dimethylphenylimino)heptane, 2,4-di(p-chlorophenylimino)pentane, 2-phenylimino-4-(2,6-diisopropylphenylimino)pentane, 1-(2-furyl)-1,3-di(2,6-diisopropylphenylimino)-4,4,4-trifluorobutane, 1-(2-furyl)-1, 3-di(8-quinolylimino)-4,4,4-trifluorobutane, 1-(2-furyl)-1, 3-di(3-quinolylimino)-4,4,4-trifluorobutane, 1-(2-furyl)-1, 3-di(2,6-dimethylphenylimino)-4,4,4-trifluorobutane, 2-phenylimino-4-(2,6-dimethylphenylimino)pentane, 2-phenylimino-4-p-chlorophenyliminopentane, 2,2,4,4,6,6-hexamethyl-2,4-di(2,6-diisopropylphenylimino)pentane, 2-p-chlorophenylimino-4-(2,6-diisopropylphenylimino) pentane, 2,2,4,4,6,6-hexamethyl-2,4-di(2,6-dimethylphenylimino)pentane, 2,2,4,4,6,6-hexamethyl-2,4-diphenyliminopentane, 2,2,4,4,6,6-hexamethyl-2,4-di(p-chlorophenylimino)pentane, 2,2,4,4,6,6-hexamethyl-2,4-di(3-quinolylimino)pentane, 2,2,4,4,6,6-hexamethyl-2,4-di(8-quinolylimino)pentane, 2-p-chlorophenylimino-4-(2,6- dimethylphenylimino)pentane, 1,3-diphenyl-1-phenylimino-3-(2,6-dimethylphenylimino)propane, and 1,3-diphenyl-1-phenylimino-3-(2,6-diisopropylphenylimino)propane.

51. The catalyst component according to claim 50, wherein the internal electron donor further comprises an additional compound, which is one or more selected from the group consisting of monobasic or polybasic esters, anhydrides, ketones, monoethers or polyethers, alcohols, amines, and diol ester compounds.

52. The catalyst component according to claim 51, wherein the additional compound is a diether compound as shown in Formula III,

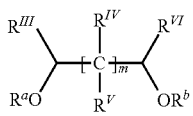

Formula III wherein, in Formula III, $R^{III}$-$R^{VI}$ may be identical to or different from each other, each of which is independently hydrogen, alkoxy, substituted amino, halogen atoms, $C_1$-$C_{20}$ hydrocarbyl, or $C_6$-$C_{20}$ aryl, and two or more of $R^{III}$-$R^{VI}$ may be bonded together to form a ring; $R^a$ and $R^b$ may be identical to or different from each other, and are $C_1$-$C_{20}$ hydrocarbyl; m is an integer ranging from 0 to 6.

53. The catalyst component according to claim 52, wherein in Formula III, $R^{IV}$ and $R^V$ are bonded together to form a ring, or $R^{III}$ and $R^{VI}$ are bonded together to form a ring.

54. The catalyst component according to claim 52, wherein the diether compound as shown in Formula III is one or more selected from the group consisting of 2-isopropyl-1,3-dimethoxypropane, 2-butyl-1,3-dimethoxypropane, 2-cyclohexyl-1,3-dimethoxypropane, 2-benzyl-1,3-dimethoxypropane, 2-phenyl-1,3-dimethoxypropane, 2-(1-naphthyl)-1,3-dimethoxypropane, 2-isopropyl-2-isopentyl-1,3-dimethoxypropane, 2-isopropyl-2-isobutyl-1,3-dimethoxypropane, 2-isopropyl-2-butyl-1,3-dimethoxypropane, 2,2-dicyclopentyl-1,3-dibenzoyloxypropane, 2,2-dicyclohexyl-1,3-dimethoxypropane, 2,2-dibutyl-1,3-dimethoxypropane, 2,2-diisobutyl-1,3-dimethoxypropane, 2,2-diisopropyl-1,3-dimethoxypropane, 2,2-diethyl-1,3-dimethoxypropane, 2-ethyl-2-butyl-1,3-dimethoxypropane, 2,4-dimethoxypentane, 3-ethyl-2,4-dimethoxypentane, 3-methyl-2,4-dimethoxypentane, 3-propyl-2,4-dimethoxypentane, 3-isopropyl-2,4-dimethoxypentane, 3,5-dimethoxyheptane, 4-ethyl-3,5-dimethoxyheptane, 4-propyl-3,5-dimethoxyheptane, 4-isopropyl-3,5-dimethoxyheptane, 9,9-dimethoxymethylfluorene, 9,9-dimethoxymethyl-4-tert-butylfluorene, 9,9-dimethoxymethyl-4-propylfluorene, 9,9-dimethoxymethyl-1,2,3,4-tetrahydrofluorene, 9,9-dimethoxymethyl-1,2,3,4,5,6,7,8-octahydrofluorene, 9,9-dimethoxymethyl-2,3,6,7-diphenylpropylindene, 9,9-dimethoxymethyl-1,8-dichlorofluorene, 7,7-dimethoxymethyl-2,5-dinorbornadiene, 1,4-dimethoxybutane, 2,3-diisopropyl-1,4-dimethoxybutane, 2,3-dibutyl-1,4-dimethoxybutane, 1,2-dimethoxybenzene, 3-ethyl-1,2-dimethoxybenzene, 4-butyl-1,2-dimethoxybenzene, 1,8-dimethoxynaphthalene, 2-ethyl-1,8-dimethoxynaphthalene, 2-propyl-1,8-dimethoxynaphthalene, 2-butyl-1,8-dimethoxynaphthalene, 4-butyl-1,8-dimethoxynaphthalene, 4-isobutyl-1,8-dimethoxynaphthalene, 4-isopropyl-1,8-dimethoxynaphthalene, and 4-propyl-1,8-dimethoxynaphthalene.

55. The catalyst component according to claim 51, wherein the additional compound is a diol ester compound as shown in Formula IV,

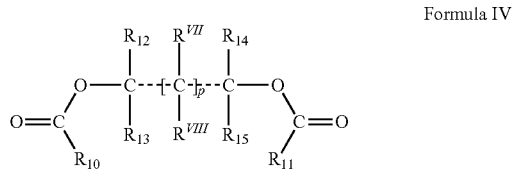

Formula IV wherein, in Formula IV, $R_{10}$ and $R_{11}$ may be identical to or different from each other, and are independently selected from halogen substituted or unsubstituted straight, branched, or cyclic $C_1$-$C_{20}$ hydrocarbyl; $R_{12}$-$R_{15}$ may be identical to or different from each other, and are independently selected from hydrogen, halogen atoms, hydroxyl, alkoxy, $C_1$-$C_{12}$ alkyl, $C_2$-$C_{12}$ alkenyl, or $C_6$-$C_{20}$ aryl, wherein each of the $C_1$-$C_{12}$ alkyl, the $C_2$-$C_{12}$ alkenyl, and the $C_6$-$C_{20}$ aryl contains or does not contain a substituent group, and two or more groups of $R_{12}$-$R_{15}$, $R^{VII}$ and $R^{VIII}$ may be bonded together to form an alicyclic ring or aromatic ring; $R^{VII}$ and $R^{VIII}$ may be identical to or different from each other, and are independently selected from hydrogen, or straight, branched or cyclic $C_1$-$C_{20}$ hydrocarbyl; p is an integer ranging from 0 to 100.

56. The catalyst component according to claim 55, wherein the diol ester compound is one or more selected from the group consisting of 2-isopropyl-1,3-dibenzoyloxypropane, 2-butyl-1,3-dibenzoyloxypropane, 2-cyclohexyl-1,3-dibenzoyloxypropane, 2-benzyl-1,3-dibenzoyloxypropane, 2-phenyl-1,3-dibenzoyloxypropane, 2-(1-naphthyl)-1,3-dibenzoyloxypropane, 2-isopropyl-1,3-diacetoxypropane, 2-isopropyl-2-isopentyl-1,3-dibenzoyloxypropane, 2-isopropyl-2-isobutyl-1,3-dibenzoyloxypropane, 2-isopropyl-2-isopentyl-1,3-dipropionyloxypropane, 2-isopropyl-2-butyl-1,3-dibenzoyloxypropane, 2-isopropyl-2-isopentyl-1-benzoyloxy-3-butyryloxypropane, 2-isopropyl-2-isopentyl-1-benzoyloxy-3-cinnamoyloxylpropane, 2-isopropyl-2-isopentyl-1-benzoyloxy-3-acetoxylpropane, 2,2-dicyclopentyl-1,3-dibenzoyloxypropane, 2,2-dicyclohexyl-1,3-dibenzoyloxypropane, 2,2-dibutyl-1,3-dibenzoyloxypropane, 2,2-diisobutyl-1,3-dibenzoyloxypropane, 2,2-diisopropyl-1,3-dibenzoyloxypropane, 2,2-diethyl-1,3-dibenzoyloxypropane, 2-ethyl-2-butyl-1,3-dibenzoyloxypropane, 2,4-dibenzoyloxypentane, 3-ethyl-2,4-dibenzoyloxypentane, 3-methyl-2,4-dibenzoyloxypentane, 3-propyl-2,4-dibenzoyloxypentane, 3-isopropyl-2,4-dibenzoyloxypentane, 2,4-di(2-propylbenzoyloxy)pentane, 2,4-di(4-propylbenzoyloxy)pentane, 2,4-di(2,4-dimethylbenzoyloxy)pentane, 2,4-di(2,4-dichlorobenzoyloxy)pentane, 2,4-di(4-chlorobenzoyloxy)pentane, 2,4-di(4-isopropylbenzoyloxy)pentane, 2,4-di(4-butylbenzoyloxy)pentane, 2,4-di(4-isobutylbenzoyloxy)pentane, 3,5-dibenzoyloxyheptane, 4-ethyl-3,5-dibenzoyloxyheptane, 4-propyl-3,5-dibenzoyloxyheptane, 4-isopropyl-3,5-dibenzoyloxyheptane, 3,5-di(4-propylbenzoyloxy)heptane, 3,5-di(4-isopropylbenzoyloxy)heptane, 3,5-di(4-isobutylbenzoyloxy)heptane, 3,5-di(4-butylbenzoyloxy)heptane, 2-benzoyloxy-4-(4-isobutylbenzoyloxy)pentane, 2-benzoyloxy-4-(4-butylbenzoyloxy)pentane, 2-benzoyloxy-4-(4-propylbenzoyloxy)pentane, 3-benzoyloxy-5-(4-isobutylbenzoyloxy)heptane, 3-benzoyloxy-5-(4-butylbenzoyloxy)heptane, 3-benzoyloxy-5-(4-propylbenzoyloxy)heptane, 9,9-dibenzoyloxymethylfluorene, 9,9-dipropionyloxymethylfluorene, 9,9-diisobutyryloxymethylfluorene, 9,9-dibutyryloxymethylfluorene, 9,9-dibenzoyloxymethyl-4-tert-butylfluorene, 9,9-dibenzoyloxymethyl-4-propylfluorene, 9,9-dibenzoyloxymethyl-1,2,3,4-tetrahydrofluorene, 9,9-dibenzoyloxymethyl-1,2,3,4,5,6,7,8-octahydrofluorene, 9,9-dibenzoyloxymethyl-2,3,6,7-diphenylpropylindene, 9,9-dibenzoyloxymethyl-1,8-dichlorofluorene, 7,7-dibenzoyloxymethyl-2,5-norbornadiene, 1,4-dibenzoyloxybutane, 2,3-diisopropyl-1,4-dibenzoyloxybutane, 2,3-dibutyl-1,4-dibenzoyloxybutane, 1,2-dibenzoyloxybenzene, 1,2-di(n-butylbenzoyloxy)benzene, 1,2-di(isopropylbenzoyloxy)benzene, 3-n-propyl-1,2-dibenzoyloxybenzene, 3-isopropyl-1,2-dibenzoyloxybenzene, 3-isobutyl-1,2-dibenzoyloxybenzene, 3-n-propyl-1,2-di(n-propylbenzoyloxy)benzene, 3-propyl-1,2-di(n-butylbenzoyloxy)benzene, 3-isopropyl-1,2-di(n-propylbenzoyloxy)benzene, 3-isopropyl-1,2-di(n-butylbenzoyloxy)benzene, 3-isopropyl-1,2-di(isopropylbenzoyloxy)benzene, 3-isobutyl-1,2-di(n-propylbenzoyloxy)benzene, 3-isobutyl-1,2-di(n-butylbenzoyloxy)benzene, 3-isobutyl-1,2-di(isopropylbenzoyloxy)benzene, 3-propyl-1,2-di(n-propylbenzoyloxy)benzene, 3-ethyl-1,2-dibenzoyloxybenzene, 4-butyl-1,2-dibenzoyloxybenzene, 1,8-dibenzoyloxynaphthalene2-ethyl-1,8-dibenzoyloxynaphthalene, 2-propyl-1,8-dibenzoyloxynaphthalene, 2-butyl-1,8-dibenzoyloxynaphthalene, 4-butyl-1,8-dibenzoyloxynaphthalene, 4-isobutyl-1,8-dibenzoyloxynaphthalene, 4-isopropyl-1,8-dibenzoyloxynaphthalene, and 4-propyl-1,8-dibenzoyloxynaphthalene.

57. The catalyst component according to claim 51, wherein the additional compound is a diester compound as shown in Formula V,

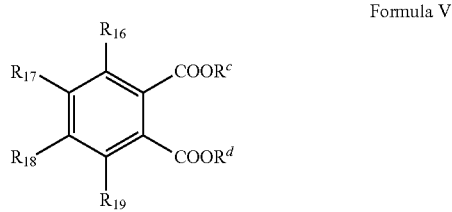

Formula V wherein, in Formula V, $R^c$ and $R^d$ may be identical to or different from each other, and are independently selected from straight, branched, or cyclic $C_1$-$C_{20}$ hydrocarbyl, which contains or does not contain a substituent group being selected from hydroxyl or halogen; $R_{16}$-$R_{19}$ may be identical to or different from each other, and are independently selected from hydrogen, halogen atoms, hydroxyl, alkoxy, $C_1$-$C_{12}$ alkyl, $C_2$-$C_{12}$ alkenyl, or $C_6$-$C_{20}$ aryl, wherein each of the $C_1$-$C_{12}$ alkyl, the $C_2$-$C_{12}$ alkenyl, and the $C_6$-$C_{20}$ aryl contains or does not contain a substituent group.

58. The catalyst component according to claim 57, wherein the diester compound is one or more selected from the group consisting of diethyl phthalate, dipropyl phthalate, diisobutyl phthalate, di-n-butyl phthalate, di-n-pentyl phthalate, diisopentyl phthalate, dineopentyl phthalate, dihexyl phthalate, diheptyl phthalate, dioctyl phthalate, dinonyl phthalate, diisobutyl 2-methylphthalate, di-n-butyl 2-methylphthalate, diisobutyl 2-propylphthalate, di-n-butyl 2-propylphthalate, diisobutyl 2-butylphthalate, di-n-butyl 2-butylphthalate, diisobutyl 2-propylphthalate, di-n-butyl 2-propylphthalate, di-isobutyl 4-propylphthalate, di-n-butyl 4-butylphthalate, di-n-butyl 2-chlorophthalate, di-n-butyl 2-chlorophthalate, di-isobutyl 4-chlorophthalate, di-n-butyl 4-chlorophthalate, and di-n-butyl 4-methoxyphthalate.

59. The catalyst component according to claim 50, wherein the internal electron donor further comprises an additional compound, which is one or more selected from the group consisting of monobasic or polybasic esters, anhydrides, ketones, monoethers or polyethers, alcohols, amines, and diol ester compounds.

60. The catalyst component according to claim 59, wherein the weight content of the one or more imine compounds in the catalyst component is in a range from 1% to 15%; the weight content of the additional compound in the catalyst component is in a range from 1% to 15%.

61. The catalyst component according to claim 59, wherein the weight content of the one or more imine compounds in the catalyst component is in a range from 2% to 10%; the weight content of the additional compound in the catalyst component is in a range from 1% to 15%.

62. A preparation method of the catalyst component according to claim 50, comprising steps of:
1) reacting a magnesium compound with an alcohol compound to form an alcohol adduct;
2) treating the alcohol adduct with a titanium compound, to obtain the catalyst component;
wherein an internal electron donor is added in step 1) or 2).

63. The method according to claim 62, wherein the alcohol compound is selected from $C_2$-$C_8$ monohydric alcohols.

64. A preparation method of catalyst component according to claim 50, comprising steps of:
1) dissolving a magnesium compound into a solvent consisting of an organic compound and an organic phosphorus compound, wherein the organic compound is selected from a group consisting of epoxide compounds and inner ethers, and optionally adding an inert solvent, to form a mixture; and
2) adding a titanium compound to treat the mixture obtained in step 1), to obtain the catalyst component;
wherein, an internal electron donor is added in step 1) or 2).

65. The method according to claim 64, wherein the organic compound is at least one selected from oxides of $C_2$-$C_8$ aliphatic olefin or dialkenes, oxides of halogenated aliphatic olefin or dialkenes, glycidyl ethers, or inner ethers; the organic phosphorus compound is at least one selected from the group consisting of trimethyl orthophosphate, triethyl orthophosphate, tributyl orthophosphate, triphenyl orthophosphate, trimethyl phosphite, triethyl phosphite, tributyl phosphite, and triphenylmethyl phosphate.

66. The method according to claim 62 or 64, wherein the magnesium compound is at least one selected from the group consisting of magnesium dihalide, alkoxy magnesium, alkyl magnesium, hydrate or alcohol adduct of magnesium dihalide, or a derivative formed by replacing a halogen atom of a magnesium dihalide with an alkoxy or haloalkoxy group, or a mixture thereof;
the titanium compound is represented by the formula $TiB_q(OR_{20})_{4-q}$, in which $R_{20}$ is $C_1$-$C_{20}$ hydrocarbyl group, B is halogen, and q=0-4.

67. A catalyst used for olefin polymerization, comprising a reaction product of the following components:
  a). the catalyst component according to claim 50;
  b). a cocatalyst organoaluminium compound; and
  c). optionally, an external electron donor.

68. A method of olefin polymerization, comprising performing olefin polymerization with an olefin in the presence of the catalyst according to claim 67.

* * * * *

UNITED STATES PATENT AND TRADEMARK OFFICE
CERTIFICATE OF CORRECTION

PATENT NO. : 10,208,145 B2  
APPLICATION NO. : 15/306255  
DATED : February 19, 2019  
INVENTOR(S) : Mingzhi Gao et al.

Page 1 of 1

It is certified that error appears in the above-identified patent and that said Letters Patent is hereby corrected as shown below:

On the Title page

Item (30), under Foreign Application Priority Data:  
"Apr. 24, 2014 (CN) ......... 2014 1 0168507  
Apr. 24, 2014 (CN) .......... 2014 1 0168586  
Apr. 24, 2014 (CN) .......... 2014 1 0168633  
Apr. 24, 2014 (CN) .......... 2014 1 0169052  
Apr. 24, 2014 (CN) .......... 2014 1 0169176  
Apr. 24, 2014 (CN) .......... 2014 1 0169910"  
Should read:  
-- Apr. 24, 2014 (CN) ......... 2014 1 0168507.8  
Apr. 24, 2014 (CN) .......... 2014 1 0168586.2  
Apr. 24, 2014 (CN) .......... 2014 1 0168633.3  
Apr. 24, 2014 (CN) .......... 2014 1 0169052.1  
Apr. 24, 2014 (CN) .......... 2014 1 0169176.X  
Apr. 24, 2014 (CN) .......... 2014 1 0169910.2 --.

In the Claims

Claim 15, Column 53, Lines 24-25:  
"are selected from C1-C2 alkyl,"  
Should read:  
-- are selected from C1-C20 alkyl, --.

Signed and Sealed this  
Thirtieth Day of July, 2019

Andrei Iancu  
*Director of the United States Patent and Trademark Office*